United States Patent
Shintani

(10) Patent No.: US 8,167,507 B2
(45) Date of Patent: May 1, 2012

(54) FOCAL PLANE SHUTTER DEVICE AND IMAGING DEVICE

(75) Inventor: Dai Shintani, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/973,911

(22) Filed: Dec. 21, 2010

(65) Prior Publication Data
US 2011/0164871 A1   Jul. 7, 2011

(30) Foreign Application Priority Data

Jan. 6, 2010 (JP) .................................. 2010-000958
Dec. 15, 2010 (JP) .................................. 2010-279842

(51) Int. Cl.
G03B 9/66 (2006.01)

(52) U.S. Cl. ........................................ 396/443; 396/484

(58) Field of Classification Search .................. 396/443, 396/484
See application file for complete search history.

(56) References Cited

U.S. PATENT DOCUMENTS

| | | | |
|---|---|---|---|
| 4,975,722 A | 12/1990 | Suzuki et al. | |
| 6,390,691 B1 | 5/2002 | Nakagawa | |
| 6,749,348 B2 * | 6/2004 | Seita | 396/443 |
| 7,708,480 B2 | 5/2010 | Yoshida et al. | |
| 7,980,772 B2 * | 7/2011 | Tanaka et al. | 396/443 |
| 2010/0026881 A1 * | 2/2010 | Kim | 348/362 |
| 2010/0027987 A1 * | 2/2010 | Tanaka et al. | 396/465 |
| 2010/0067897 A1 * | 3/2010 | Sakai | 396/484 |
| 2011/0164871 A1 * | 7/2011 | Shintani | 396/484 |
| 2011/0176799 A1 * | 7/2011 | Shintani | 396/484 |

FOREIGN PATENT DOCUMENTS

| | | |
|---|---|---|
| JP | 2001-311979 A | 11/2001 |
| JP | 2004-61865 A | 2/2004 |
| JP | 2007-316503 A | 12/2007 |
| JP | 2009-88825 A | 4/2009 |
| JP | 2010-34818 A | 2/2010 |
| JP | 2010-72077 A | 4/2010 |

OTHER PUBLICATIONS

Shintani, "Focal Plane Shutter Device and Imaging Device", filed Jan. 12, 2011, U.S. Appl. No. 13/005,517.
Office Action (mailed Feb. 29, 2012) issued in co-pending U.S. Appl. No. 13/005,517.

* cited by examiner

Primary Examiner — W. B. Perkey
(74) Attorney, Agent, or Firm — Shinjyu Global IP

(57) ABSTRACT

A focal plane shutter device is disclosed that includes a shutter base plate, a front curtain, a first urging member, a rear curtain, a second urging member, and a charge mechanism. The shutter base plate defines an opening. The front curtain is moved between different positions by the first urging member to cover and uncover the opening. The rear curtain is moved between different positions by the second urging member to cover and uncover the opening. The charge mechanism applies a first force to resist an urging force by the first urging member and a second force to resist an urging force by the second urging member. The first force applied by the charge mechanism terminates at a different time than the second force applied by the charge mechanism.

24 Claims, 32 Drawing Sheets

FOCAL PLANE SHUTTER DEVICE AND IMAGING DEVICE

CROSS-REFERENCE TO RELATED APPLICATIONS

This application claims priority under 35 U.S.C. §119 to Japanese Patent Application No. 2010-000958, filed on Jan. 6, 2010, and Japanese Patent Application No. 2010-279842, filed on Dec. 15, 2010. The entire disclosure of Japanese Patent Applications No. 2010-000958 and Japanese Patent Application No. 2010-279842 are hereby incorporated herein by reference.

BACKGROUND

1. Technical Field

The technology disclosed herein generally relates to a focal plane shutter device. More specifically, the technology disclosed herein relates to a focal plane shutter device used in an imaging device.

2. Background Information

Japanese Patent Laid-Open Publication JP2004-061865 discloses a focal plane shutter device having a so-called normally open function.

Japanese Patent Laid-Open Publication JP2007-316503 discloses a focal plane shutter device corresponding to electronic front curtain photography. This focal plane shutter device utilizes an electronic shutter function of an imaging element to realize a function of the front curtain, and thus, it is possible to take pictures by merely running the rear curtain without using the front curtain.

In the focal plane shutter device disclosed in JP2004-061865, if taking pictures is made to correspond to electronic front curtain photography, it is necessary that the front curtain runs once at a charge position (i.e., in a state where an aperture is closed), but this raises a problem in that the live view, for example, needs to be stopped.

Further, in the focal plane shutter device disclosed in JP2004-061865, the front curtain and the rear curtain are simultaneously charged, and as a result, a load of a motor becomes to large at the time of charging.

Moreover, the focal plane shutter device disclosed in JP2007-316503 does not include the front curtain, and it is therefore not possible to perform a slit exposure using the front curtain and the rear curtain.

SUMMARY

One object of the technology discussed herein is to provide a focal plane shutter device capable of performing slit exposure photography using a front curtain and a rear curtain, and also capable of reducing a load of a drive source at the time of charging the front curtain and the rear curtain.

Another object of the technology disclosed herein is to provide a focal plane shutter device capable of performing slit exposure photography using a front curtain and a rear curtain, and also capable of maintaining an aperture in an open state at the time of charging the front curtain and the rear curtain.

To achieve these objectives, a focal plane shutter device is provided with a shutter base plate, a front curtain, a first urging member, a rear curtain, a second urging member, and a charge mechanism. The shutter base plate defines an opening. The front curtain is configured to move between a first front curtain position to cover the opening and a second front curtain position to uncover the opening. The first urging member is configured to apply an urging force to the front curtain to move the front curtain from the first front curtain position to the second front curtain position. The rear curtain is configured to move between a first rear curtain position to cover the opening and a second rear curtain position to uncover the opening. The second urging member is configured to apply an urging force to the rear curtain to move the rear curtain from the second rear curtain position to the first rear curtain position. The charge mechanism is configured to apply a first biasing force to resist the urging force of the first urging member and a second biasing force to resist the urging force of the second urging member. The first biasing force applied by charge mechanism terminates at a different time than the second biasing force applied by charge mechanism.

These and other objects, features, aspects and advantages of the present invention will become apparent to those skilled in the art from the following detailed description, which, taken in conjunction with the annexed drawings, discloses embodiments of the present invention.

BRIEF DESCRIPTION OF DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

1: Digital Camera

By using drawings, an overview of a digital camera 1 on which a focal plane shutter device 190 is mounted will be explained. It is noted that the focal plane shutter device 190 can be mounted on cameras other than the digital camera 1 of the embodiments.

Figure 1:
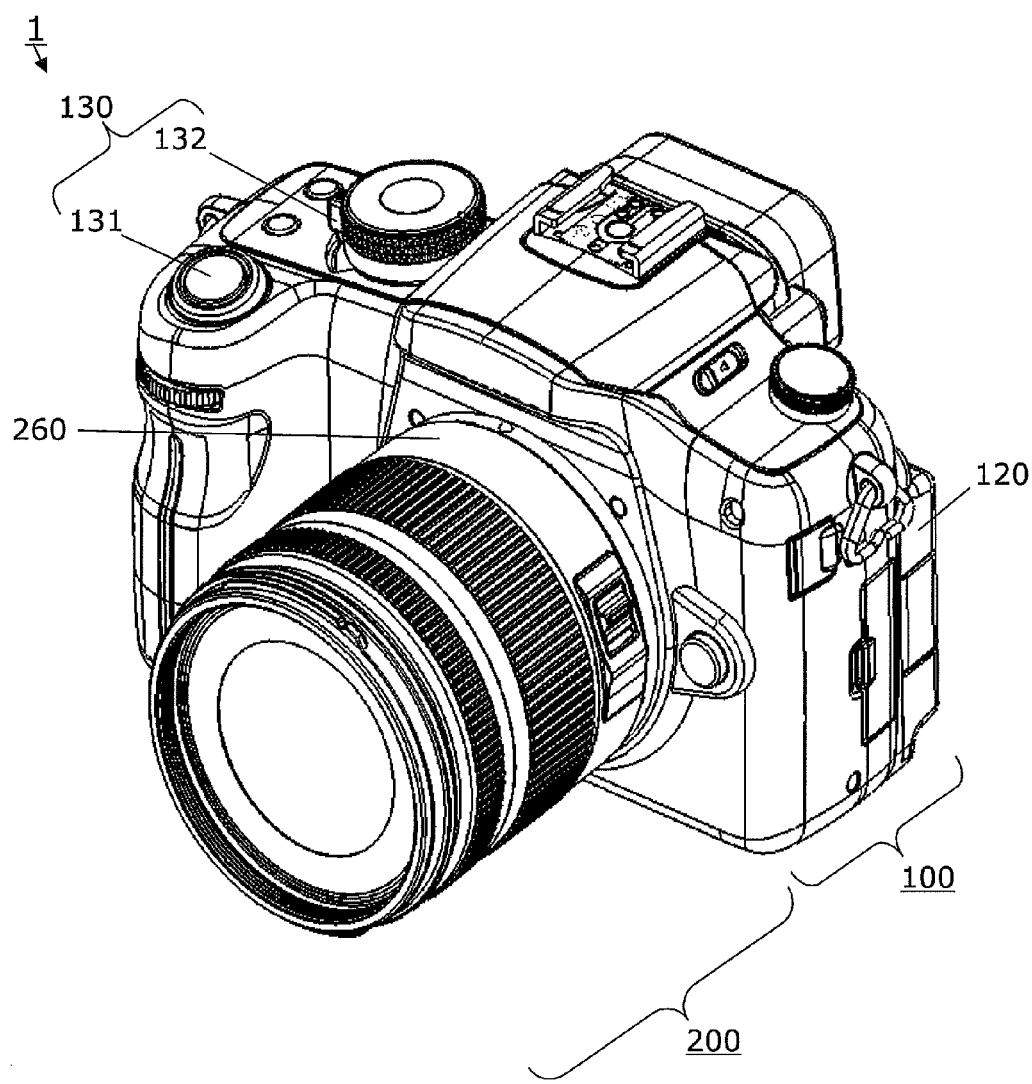
FIG. 1 is a perspective view of a digital camera 1.
Figure 2:
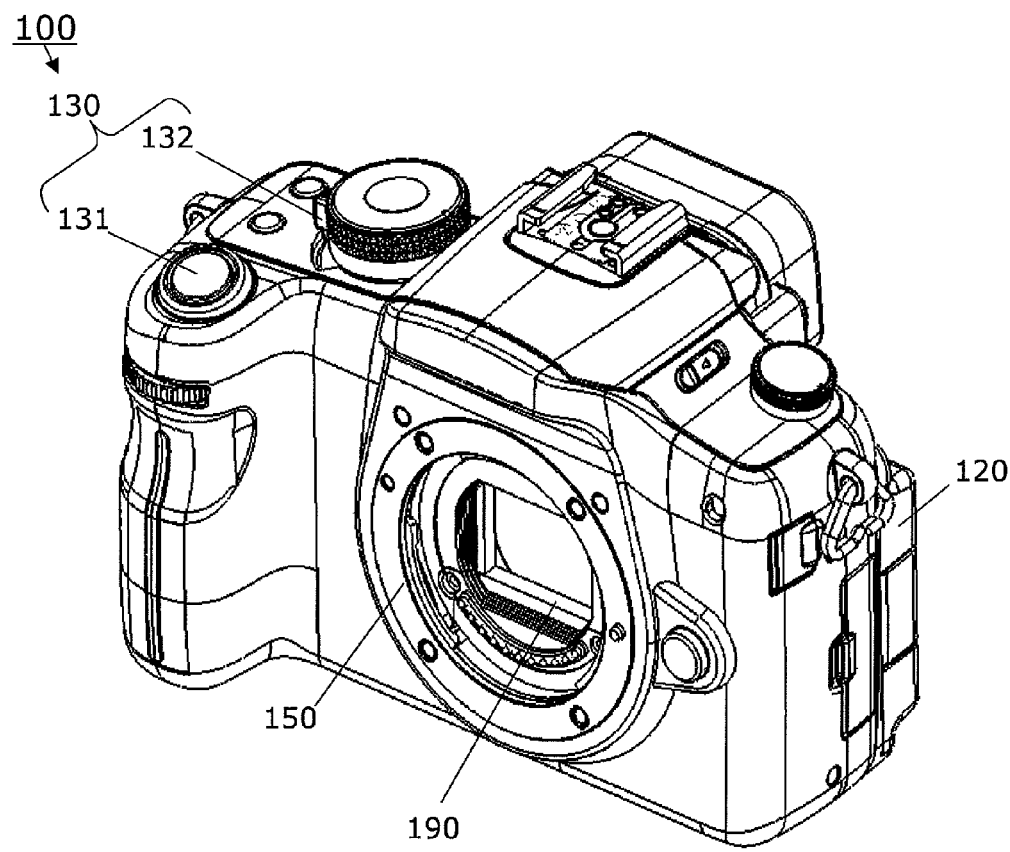
FIG. 2 is a perspective view of a camera body 100.
Figure 3:
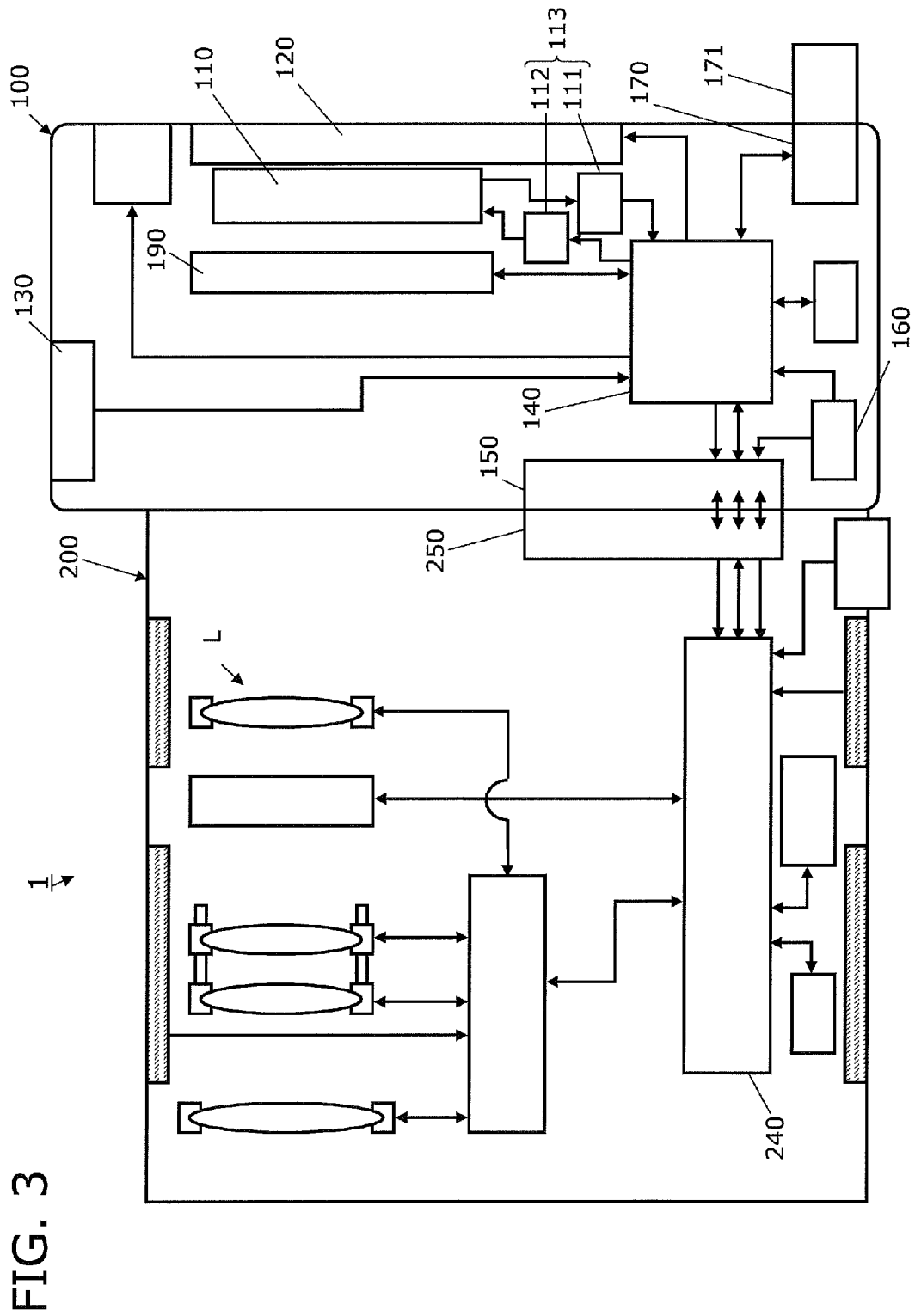
FIG. 3 is a block diagram of the digital camera 1.

FIG. 1 is a perspective view of the digital camera 1 according to the first embodiment. FIG. 2 is a perspective view of a camera body 100. FIG. 3 is a functional block diagram of the digital camera 1.

The digital camera 1 is an interchangeable-lens-type digital camera that includes the camera body 100 and a lens unit 200 attachable to the camera body 100.

Figure 4:
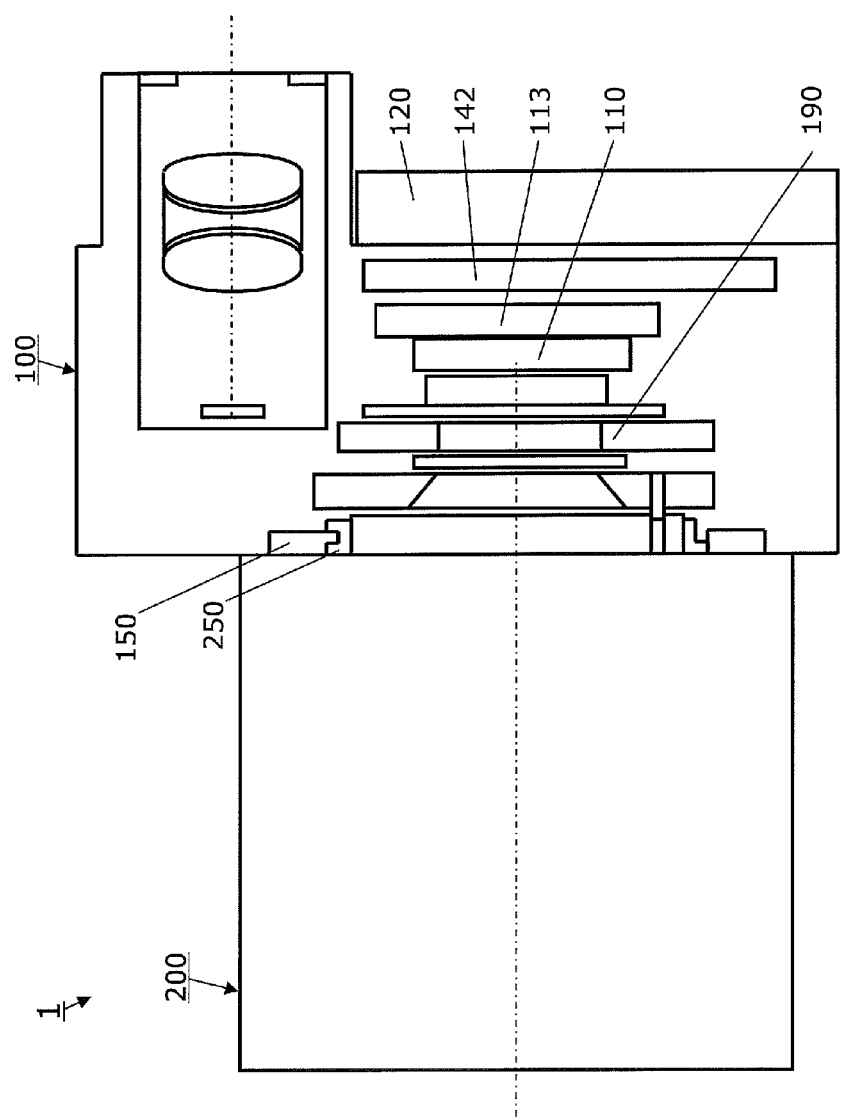
FIG. 4 is a simplified cross section of the digital camera 1.
Figure 5:
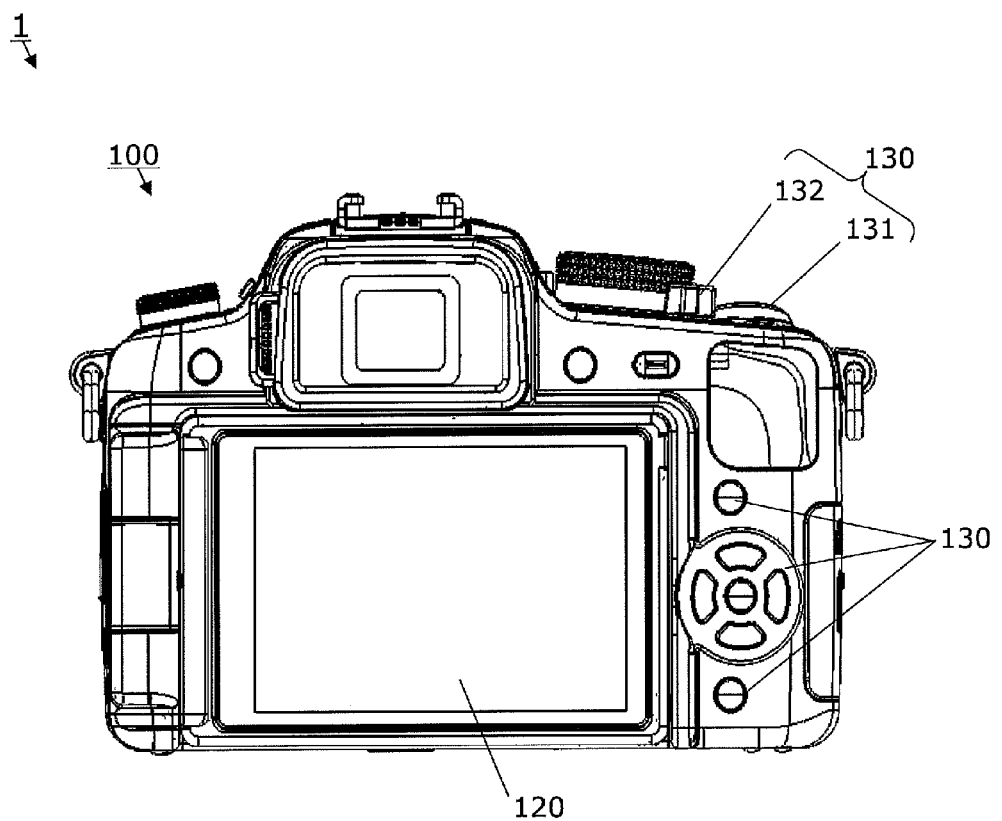
FIG. 5 is a rear view of the camera body 100.

FIG. 4 is a simplified cross section of the digital camera 1. FIG. 5 is a rear view of the camera body 100. The camera body 100 mainly includes: a Complementary Metal Oxide Semiconductor (CMOS) image sensor 110, a CMOS circuit board 113, a camera monitor 120, an operation part 130, a main circuit board 142 including a camera controller 140, a body mount 150; a power supply 160, a card slot 170, and a focal plane shutter device 190.

The CMOS image sensor 110 (an example of an imaging element) converts an optical image of a subject (hereinafter, may also be referred to as a subject image) incident via the lens unit 200, into image data. The produced image data is digitalized by an AD converter 111 of the CMOS circuit board 113. The image data digitalized by the AD converter 111 is subjected to various imaging processing in the camera controller 140. The various imaging processing referred to here include, for example, gamma correction processing, white balance correction processing, scratch correction processing, YC conversion processing, electronic zoom processing, and JPEG compression processing.

The CMOS image sensor 110 operates based on a timing signal generated by a timing generator 112. The CMOS image sensor 110 can obtain still picture data and moving picture data under control by the CMOS circuit board 113. The obtained moving picture data is also used for displaying through-images. It is noted that the still picture data and the moving picture data are examples of the image data.

A "through-image" here is an image out of the moving picture data that is not recorded on a memory card 171. Primarily, the through-image is a moving picture, and is displayed on the camera monitor 120 to decide the composition of a moving or a still picture.

The CMOS image sensor 110 can obtain a low-resolution moving picture used as the through-image and can obtain a high-resolution moving picture used for recording. The high-resolution moving picture may include a moving picture of an HD size (High-Definition size: 1920×1080 pixels), for example. It is noted that the CMOS image sensor 110 is an example of the imaging element for converting the optical image of the subject into an electric image signal. The imaging element is a concept encompassing not only the CMOS image sensor 110 but also an opto-electrical conversion element such as a CCD image sensor.

The CMOS image sensor 110 has an electronic front curtain function for sequentially resetting a pixel in a running direction R (see FIG. 6) of a front curtain 21 described later.

The CMOS circuit board 113 is a circuit board for controlling the CMOS image sensor 110. The CMOS circuit board 113 is a circuit board for performing predetermined processing on the image data outputted from the CMOS image sensor 110, and includes the timing generator 112 and the AD converter 111. The CMOS circuit board 113 is an example of an imaging element circuit board for controlling the drive of the imaging element and performing predetermined processing such as AD conversion on the image data outputted from the imaging element.

The camera monitor 120 is, for example, a liquid crystal display and displays, for example, an image represented by display-use image data. The display-use image data is produced by the camera controller 140. The display-use image data is data for displaying image data which undergoes imaging processing, a photography condition of the digital camera 1, and an operation menu, as an image, for example. The camera monitor 120 is capable of selectively displaying the moving picture and the still picture.

The camera monitor 120 is provided to the camera body 100. In the first embodiment, the camera monitor 120 is disposed on the rear face of the camera body 100, however, the camera monitor 120 may also be disposed on anywhere of the camera body 100.

It is noted that the camera monitor 120 is an example of a display part provided to the camera body 100. Other examples of the display part include means capable of displaying an image such as an organic electroluminescence, an inorganic electroluminescence, and a plasma display panel. Moreover, the display part need not be provided on the rear face of the camera body 100, and may be provided on a side face, a top face, or another such place.

Figure 6:
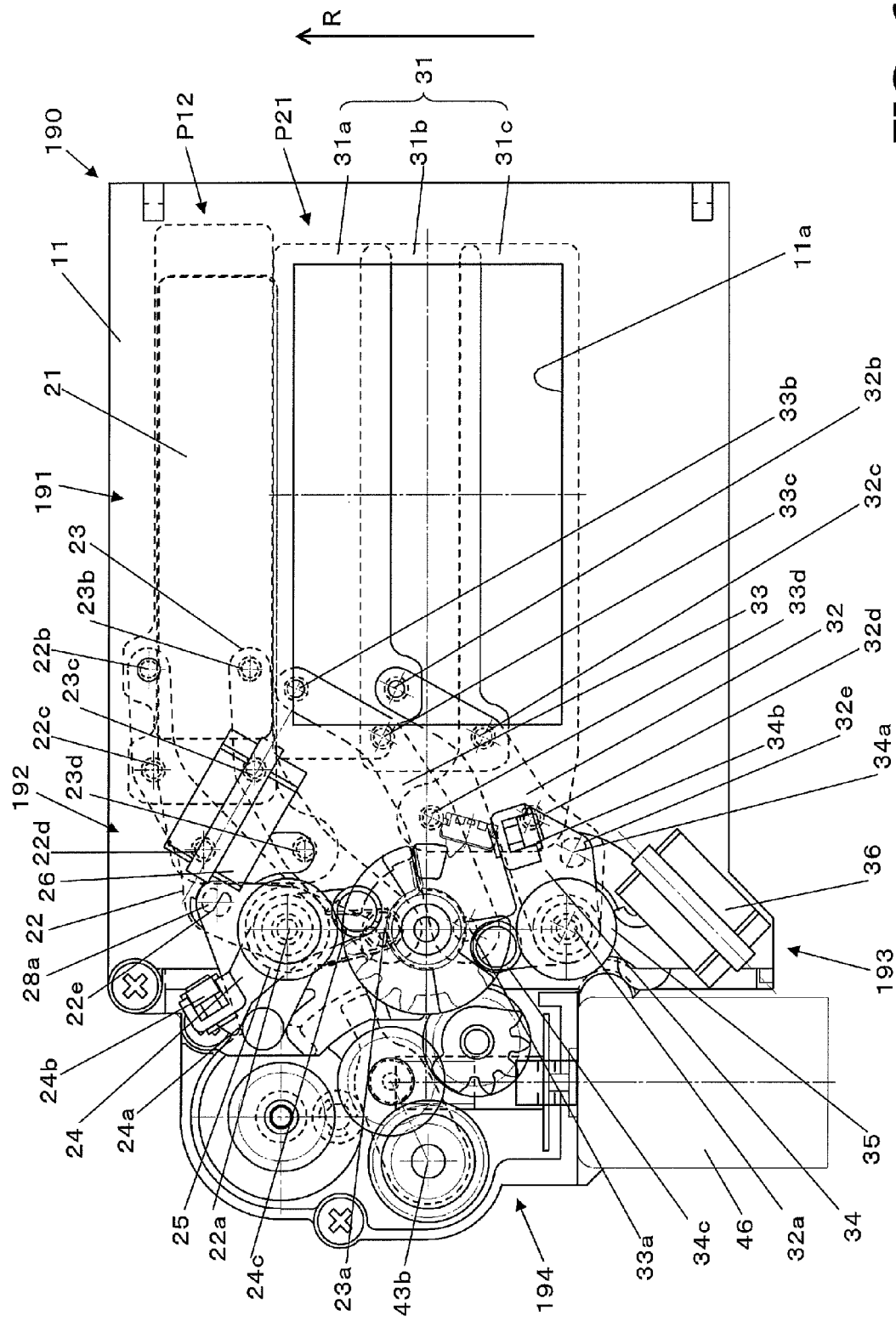
FIG. 6 is a state diagram of a focal plane shutter device 190 in a state where a rear curtain completes running.
Figure 7:
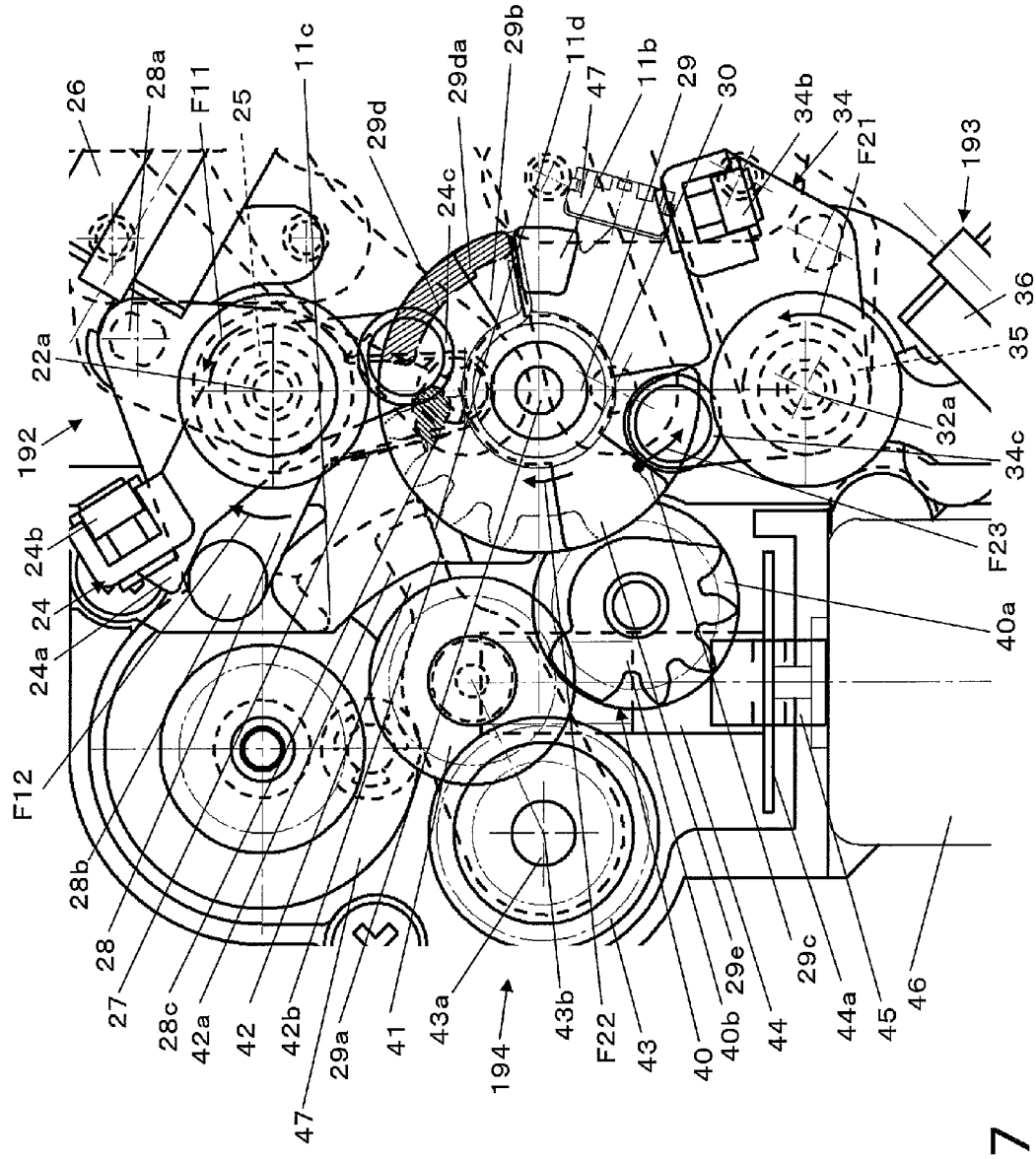
FIG. 7 is a detailed view of main parts in FIG. 6.

The operation part 130 receives operations by a user. Specifically, as shown in FIGS. 6 and 7, the operation part 130 includes a release button 131 for receiving a focal plane shutter operation by the user, and a power switch 132 that is a rotary dial switch provided on the top face of the camera body 100. The operation part 130 may suffice if it is possible to receive the operations by the user, and includes a button, a lever, a dial, a touch panel, etc.

The camera controller 140 (an example of a controller) controls each part of the camera body 100. The camera controller 140 receives commands from the operation part 130. The camera controller 140 transmits a signal used for controlling the lens unit 200 to a lens controller 240 via the body mount 150 and a lens mount 250, and indirectly controls each part of the lens unit 200. That is, the camera controller 140 controls the entire digital camera 1.

The camera controller 140 controls the CMOS circuit board 113. Specifically, the camera controller 140 transmits a control signal to the CMOS circuit board 113, and the CMOS circuit board 113 controls the CMOS image sensor 110 based on the received control signal. That is, the camera controller 140 controls the CMOS image sensor 110. Moreover, the camera controller 140 obtains the image data which is produced by the CMOS image sensor 110 and on which the predetermined processing such as AD conversion has been performed by the CMOS circuit board 113, and further performs processing on the obtained image data. For example, the camera controller 140 produces display-use image data, recording-use moving picture data, etc., from the image data processed by the CMOS circuit board 113.

Further, the camera controller 140 controls the focal plane shutter device 190 described later. Specifically, when photographing by using an electronic front curtain photography function, the camera controller 140 controls the motor 46 so that a charge lever 29 stops at a second charge completion position. The camera controller 140 establishes an electronic front curtain photography standby state of the focal plane shutter device 190 when a charge mechanism 194 completes imparting a rear-curtain running spring 35 with a second bias force F23 (see FIG. 7) and the charge mechanism 194 does not complete the imparting a front-curtain running spring 25 with a first biasing force F13 (see FIG. 13).

The memory card 171 is attachable to a card slot 170. The card slot 170 controls the memory card 171 based on the control signal transmitted from the camera controller 140. Specifically, the card slot 170 stores the image data on the memory card 171. The card slot 170 outputs the image data from the memory card 171. Moreover, the card slot 170 stores the moving picture data on the memory card 171. The card slot 170 outputs the moving picture data from the memory card 171.

The memory card 171 is capable of storing the image data that is produced through imaging processing by the camera controller 140. For example, the memory card 171 is capable of storing a non-compressed RAW image file, a compressed JPEG image file, etc. Moreover, the memory card 171 is also capable of outputting via the card slot 170 image data or image file that has been previously stored inside the memory card 171. The image data or the image file outputted from the memory card 171 is subjected to imaging processing by the camera controller 140. For example, the camera controller 140 decompresses the image data or the image file obtained from the memory card 171 so as to produce the display-use image data.

The memory card 171 is further capable of storing the moving picture data that is produced through imaging processing by the camera controller 140. For example, the memory card 171 is capable of storing the moving picture file compressed according to H.264/AVC that is a moving picture compression standard. Moreover, the memory card 171 is capable of outputting via the card slot 170 the moving picture data or moving picture file that has been previously stored inside the memory card 171. The moving picture data or the moving picture file outputted from the memory card 171 is subjected to imaging processing in the camera controller 140. For example, the camera controller 140 decompresses the moving picture data or the moving picture file obtained from the memory card 171 so as to produce the display-use image data.

It is noted that the memory card 171 is an example of a storage part. The storage part may be attachable to the camera body 100, as in the case of the memory card 171, and may also be fixed to the digital camera 1.

The power supply 160 supplies each part with power used in the digital camera 1. The power supply 160 may be a dry battery and a rechargeable battery, for example. Moreover, the power supply 160 may also be a unit that receives power from an external power supply via a power supply cord, etc., so as to supply the digital camera 1 with the power.

The body mount 150 engages with the lens mount 250. The body mount 150 supports the lens unit 200. Moreover, the body mount 150 and the lens mount 250 can be electrically connected. The camera body 100 can transmit and receive at least one of the data and the control signal to and from the lens unit 200 via the body mount 150 and the lens mount 250.

The focal plane shutter device 190 (an example of a focal plane shutter device) is disposed in front of the CMOS image sensor 110 (on a subject side), and controls an exposure time of the CMOS image sensor 110. In the focal plane shutter device 190, there are a state in which light toward the CMOS image sensor 110 from an optical system L is shielded (close state), and a state in which the light toward the CMOS image sensor 110 from the optical system L is transmitted (open state). The focal plane shutter device 190 will be explained in detail later.

The lens unit 200 may be attached to the camera body 100, and forms an optical image of the subject. Specifically, the lens unit 200 includes: the optical system L; a drive part 215; the lens mount 250; the lens controller 240; and a lens barrel 260.

The optical system L forms the optical image of the subject, on a light-receiving face of the CMOS image sensor 110.

The lens controller 240 controls the entire lens unit 200 based on the control signal transmitted from the camera controller 140.

2: Configuration of the Focal Plane Shutter Device

By using FIGS. 6 to 11, the focal plane shutter device 190 according to the first embodiment will be explained.

The focal plane shutter device 190 includes: an opening-part opening/closing mechanism 191; a front-curtain drive mechanism 192; a rear-curtain drive mechanism 193; and the charge mechanism 194.

2.1: Opening-Part Opening/Closing Mechanism 191

As shown in FIG. 6, the opening-part opening/closing mechanism 191 includes: a shutter base plate 11; a front curtain 21; a front-curtain drive arm 22; a front-curtain driven arm 23; a rear curtain 31; a rear-curtain drive arm 32; and a rear-curtain driven arm 33. The shutter base plate 11 has two plates. Between the two plates, there is formed a gap that is sufficient for the front curtain 21 and the rear curtain 31 to run. The shutter base plate 11 has an opening part (also referred to as an aperture) 11a for guiding the subject light from the optical system L to the CMOS image sensor 110.

Figure 10:
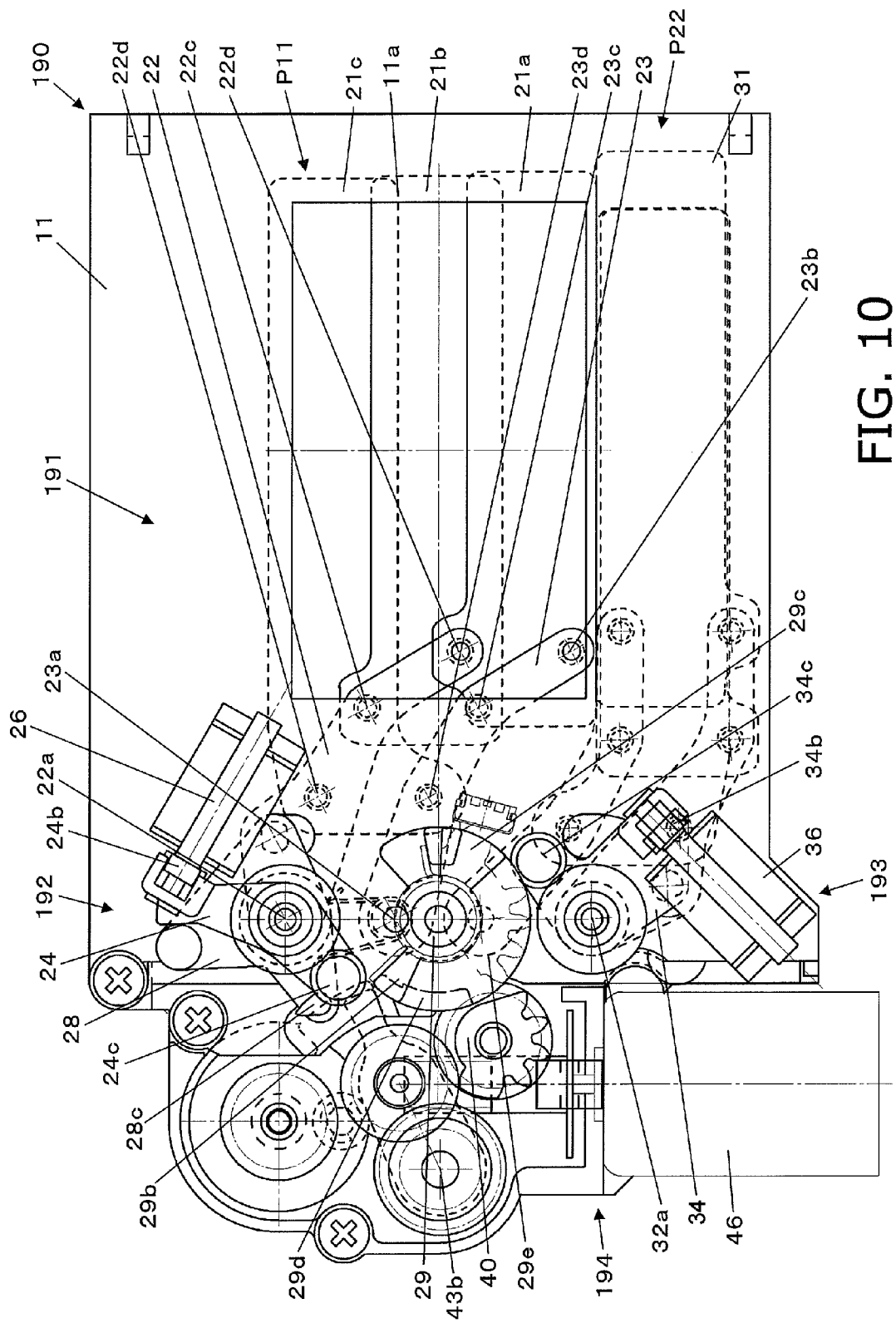
FIG. 10 is a state diagram of the focal plane shutter device 190 in a slit exposure standby state.

As shown in FIGS. 6 and 10, the front curtain 21 (an example of a front curtain) is disposed to be movable between a first front curtain position P11 (an example of a first front curtain position) and a second front curtain position P12 (an example of a second front curtain position). At the first front curtain position P11, the front curtain 21 covers the opening part 11a. As shown in FIG. 6, at the second front curtain position P12, the front curtain 21 is retracted from the opening part 11a. A state where the front curtain 21 covers the opening part 11a is also referred to as a photography standby state of the front curtain 21. As shown in FIG. 6, a state where the front curtain 21 is retracted from the opening part 11a is also referred to as a running completion state of the front curtain 21. By the front-curtain drive arm 22 and the front-curtain driven arm 23, the front curtain 21 is supported to be movable between the first front curtain position P11 and the second front curtain position P12.

The front-curtain drive arm 22 is rotatably disposed relative to the shutter base plate 11. As shown in FIG. 10, the front-curtain drive arm 22 includes a rotating shaft 22a, a shaft 22b, a shaft 22c, and a shaft 22d. The front curtain 21 includes a first front curtain blade 21a, a second front curtain blade 21b, and a third front curtain blade 21c. The front-curtain drive arm 22 is rotatably supported around the rotating shaft 22a by the shutter base plate 11. By the front-curtain drive arm 22, the first front curtain blade 21a is rotatably supported around the shaft 22b, the second front curtain blade 21b is rotatably supported around the shaft 22c, and the third front curtain blade 21c is rotatably supported around the shaft 22d, respectively.

Moreover, the front-curtain driven arm 23 is rotatably disposed relative to the shutter base plate 11. Specifically, the front-curtain driven arm 23 includes a rotating shaft 23a, a shaft 23b, a shaft 23c, and a shaft 23d. The front-curtain driven arm 23 is rotatably supported around the rotating shaft 23a by the shutter base plate 11. By the front-curtain driven arm 23, the first front curtain blade 21a is rotatably supported around the shaft 23b, the second front curtain blade 21b is rotatably supported around the shaft 23c, and the third front curtain blade 21c is rotatably supported around the shaft 23d, respectively.

In this way, the front curtain 21, the front-curtain drive arm 22, and the front-curtain driven arm 23 configure a so-called parallel link mechanism. Along with the rotation of the front-curtain drive arm 22 and the front-curtain driven arm 23, the first front curtain blade 21a, the second front curtain blade 21b, and the third front curtain blade 21c sequentially move in a shorter side direction of the opening part 11a while keeping a parallel state with respect to a longer side of the opening part 11a.

Figure 8:
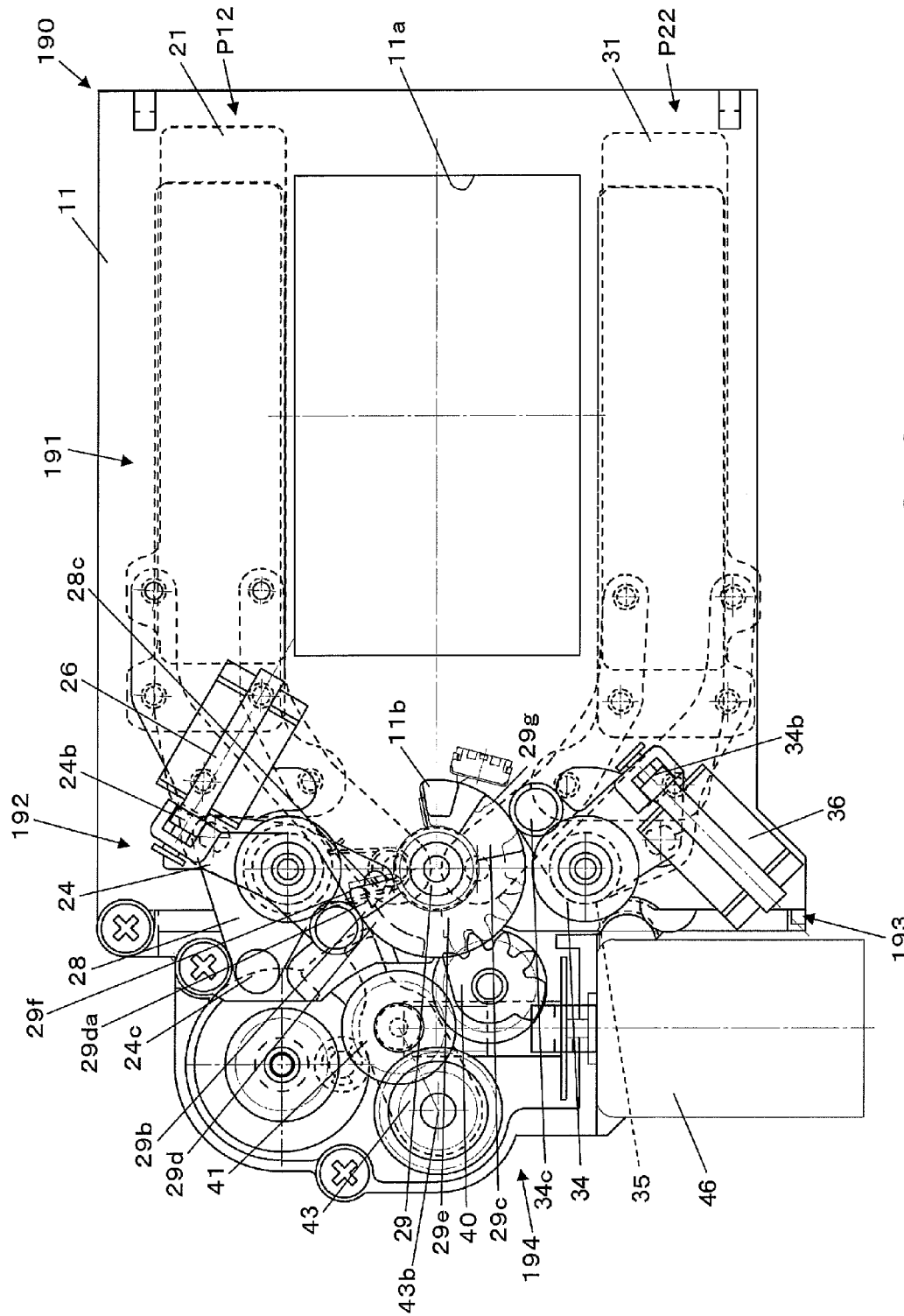
FIG. 8 is a state diagram of the focal plane shutter device 190 in a charge completion state.

As shown in FIGS. 6, 8 and 10, the rear curtain 31 (an example of a rear curtain) is disposed to be movable between a first rear curtain position P21 (an example of a first rear curtain position) and a second rear curtain position P22 (an example of a second rear curtain position). At the first rear curtain position P21, the rear curtain 31 covers the opening part 11a. As shown in FIG. 8, at the second rear curtain position P22, the rear curtain 31 is retracted from the opening part 11a. A state where the rear curtain 31 covers the opening part 11a is also referred to as a running completion state of the rear curtain 31. As shown in FIG. 10, a state where the rear curtain 31 is retracted from the opening part 11a is also referred to as a photography standby state of the rear curtain 31. The rear curtain 31 is supported to be movable between the first rear curtain position P21 and the second rear curtain position P22 by the rear-curtain drive arm 32 and the rear-curtain driven arm 33.

The rear-curtain drive arm 32 is rotatably disposed relative to the shutter base plate 11. As shown in FIG. 6, the rear-curtain drive arm 32 includes a rotating shaft 32a, a shaft 32b, a shaft 32c, and a shaft 32d. The rear curtain 31 includes a first rear curtain blade 31a, a second rear curtain blade 31b, and a third rear curtain blade 31c. The rear-curtain drive arm 32 is rotatably supported around the rotating shaft 32a by the shutter base plate 11. By the rear-curtain drive arm 32, the first rear curtain blade 31a is rotatably supported around the shaft 32b, the second rear curtain blade 31b is rotatably supported around the shaft 32c, and the third rear curtain blade 31c is rotatably supported around the shaft 32d, respectively.

Moreover, the rear-curtain driven arm 33 is rotatably disposed relative to the shutter base plate 11. Specifically, the rear-curtain driven arm 33 includes a rotating shaft 33a, a shaft 33b, a shaft 33c, and a shaft 33d. The rear-curtain driven arm 33 is rotatably supported around the rotating shaft 33a by the shutter base plate 11. By the rear-curtain driven arm 33, the first rear curtain blade 31a is rotatably supported around the shaft 33b, the second rear curtain blade 31b is rotatably supported around the shaft 33c, and the third rear curtain blade 31c is rotatably supported around the shaft 33d, respectively.

In this way, the rear curtain 31, the rear-curtain drive arm 32, and the rear-curtain driven arm 33 configure a so-called parallel link mechanism. Along with the rotation of the rear-curtain drive arm 32 and the rear-curtain driven arm 33, the first rear curtain blade 31a, the second rear curtain blade 31b, and the third rear curtain blade 31c sequentially move in the shorter side direction of the opening part 11a while keeping a parallel state with respect to the longer side of the opening part 11a.

2.2: Front-Curtain Drive Mechanism 192

Subsequently, the front-curtain drive mechanism 192 for driving the front curtain 21 will be explained.

As shown in FIGS. 6 and 7, the front-curtain drive mechanism 192 includes: a front-curtain drive lever 28; a front-curtain set spring 27; a charge lever 29; a front-curtain set lever 24; a front-curtain running spring 25; and a front-curtain electromagnet 26.

Figure 16B:
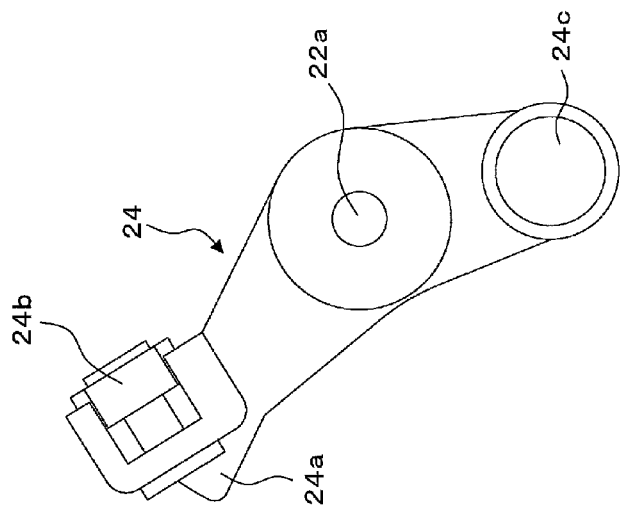
FIG. 16A is a plan view of a front-curtain drive lever 28 and FIG. 16B is a plan view of a front-curtain set lever 24.
Figure 16A:
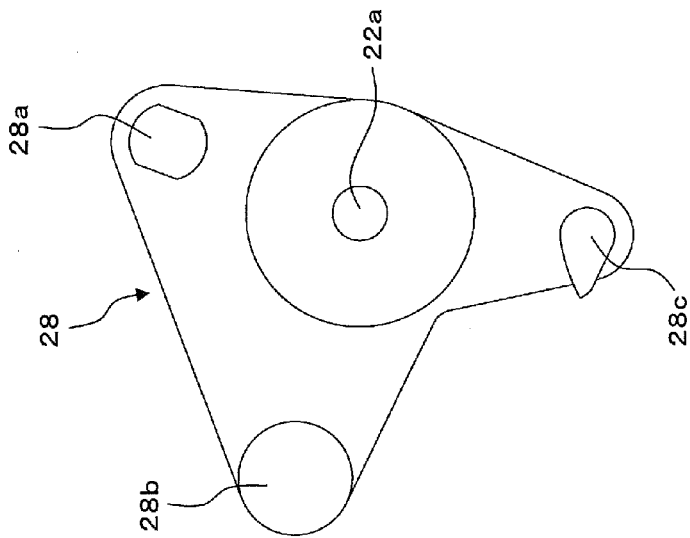

The front-curtain drive lever 28 (an example of a front curtain drive member) couples the front curtain 21 to the shutter base plate 11 to be movable between the first front curtain position P11 and the second front curtain position P12. As shown in FIG. 16A, the front-curtain drive lever 28 includes a drive coupling pin 28a and a claw 28c. As shown in FIG. 6, the front-curtain drive arm 22 includes a coupling hole 22e. The drive coupling pin 28a is inserted into the coupling hole 22e. Similarly to the front-curtain drive arm 22, the front-curtain drive lever 28 is rotatably supported by the rotating shaft 22a around the rotating shaft 22a. The front-curtain drive arm 22 and the front-curtain drive lever 28 can rotate integrally around the rotating shaft 22a.

The front-curtain set spring 27 (one example of a third urging member) biases the front-curtain drive lever 28 in a direction where the front curtain 21 covers the opening part 11a. Specifically, as shown in FIG. 7, the front-curtain set spring 27 imparts an elastic force F12 to the front curtain 21 so that the front curtain 21 moves from the first front curtain position P11 to the second front curtain position P12 in the running direction R (see FIG. 6). The elastic force F12 of the front-curtain set spring 27 is smaller than the elastic force F11 of the front-curtain running spring 25. The front-curtain set spring 27 is hooked onto the front-curtain driven arm 23, and thus, the elastic force F12 of the front-curtain set spring 27 acts upon the front-curtain drive arm 22. In the first embodiment, the front-curtain set spring 27 applies a clockwise rotation force to the front-curtain drive lever 28.

As shown in FIG. 16A, the front-curtain drive lever 28 includes a front-curtain-drive-lever contacting portion 28b. As shown in FIG. 16B, the front-curtain set lever 24 includes a front-curtain-set-lever contacting portion 24a. As shown in FIG. 7, the front-curtain-drive-lever contacting portion 28b abuts the front-curtain-set-lever contacting portion 24a. Similarly to the front-curtain drive lever 28, the front-curtain set lever 24 is rotatably supported by the rotating shaft 22a around the rotating shaft 22a. When the front-curtain set lever 24 rotates counterclockwise, the front-curtain-drive-lever contacting portion 28b is pushed by the front-curtain-set-lever contacting portion 24a, which in turn rotates the front-curtain drive lever 28 counterclockwise. When the front curtain 21 moves from the first front curtain position P11 to the second front curtain position P12, the front-curtain set lever 24 transmits the elastic force F11 of the front-curtain running spring 25 to the front curtain 21 via the front-curtain drive lever 28. That is, at the time of imparting the front-curtain running spring 25 with the first biasing force F13, the charge mechanism 194 imparts the front-curtain running spring 25 with the first biasing force F13 via the front-curtain set lever 24.

Moreover, by the elastic force F12 of the front-curtain set spring 27, the front-curtain drive lever 28 is imparted with clockwise rotation force. This brings the front-curtain-set-lever contacting portion 24*a* and the front-curtain-drive-lever contacting portion 28*b* to contact each other. The counter-clockwise rotation of the front-curtain set lever 24 is restricted by a stopper (not shown) at a position shown in FIG. 6. Thus, when the front-curtain set lever 24 and the front-curtain drive lever 28 integrally rotate counterclockwise, the front-curtain set lever 24 and the front-curtain drive lever 28 stop at the position shown in FIG. 6. By the elastic force F11 of the front-curtain running spring 25, the front-curtain set lever 24 and the front-curtain drive lever 28 are kept at a position shown in FIG. 6. That is, the elastic force F11 of the front-curtain running spring 25 can be transmitted to the front curtain 21 by the front-curtain drive lever 28 via the front-curtain set lever 24.

On the other hand, even when the front-curtain set lever 24 rotates clockwise, the front-curtain-set-lever contacting portion 24*a* does not contact the front-curtain-drive-lever contacting portion 28*b*, and thus, when the front-curtain set lever 24 rotates clockwise, the front-curtain set lever 24 rotates independently of the front-curtain drive lever 28. Therefore, when the charge mechanism 194 imparts the front-curtain running spring 25 with the first biasing force F13, the front-curtain set lever 24 imparts the front-curtain running spring 25 with the first biasing force F13 without intervention of the front-curtain drive lever 28.

As shown in FIG. 7, the front-curtain running spring 25 (one example of a first urging member) always imparts the front-curtain set lever 24 with the strong counterclockwise elastic force F11. Specifically, the front-curtain running spring 25 imparts the front curtain 21 with the elastic force F11 so that the front curtain 21 moves from the first front curtain position P11 to the second front curtain position P12. By the elastic force F11 of the front-curtain running spring 25, the counterclockwise rotation force is acted upon the front-curtain set lever 24. The front-curtain set lever 24 is arranged to transmit the elastic force F11 of the front-curtain running spring 25 to the front-curtain drive lever 28. Therefore, in a state where the front-curtain-set-lever contacting portion 24*a* contacts the front-curtain-drive-lever contacting portion 28*b*, as shown in FIG. 7, for example, the elastic force F11 of the front-curtain running spring 25 is transmitted to the front-curtain drive lever 28. That is, when the front curtain 21 is disposed at the first front curtain position P11, the front-curtain running spring 25 imparts the front-curtain drive lever 28 with the strong counterclockwise elastic force F11. The elastic force F11 of the front-curtain running spring 25 also is transmitted to the front-curtain drive arm 22 and the front curtain 21 via the front-curtain drive lever 28. Therefore, the front-curtain running spring 25 biases the front curtain 21 in a direction where the front curtain 21 is retracted from the opening part 11*a*.

The counterclockwise elastic force F11 applied by the front-curtain running spring 25 to the front-curtain drive lever 28 is larger than the clockwise elastic force F12 applied by the front-curtain set spring 27 to the front-curtain drive lever 28. Therefore, even when the elastic force F12 of the front-curtain set spring 27 is acted upon the front curtain 21, the front curtain 21 can be run toward the direction where the front curtain 21 is retracted from the opening part 11*a* by the elastic force F11 of the front-curtain running spring 25. The force achieved when the front curtain 21 runs is equivalent to a total force of the elastic force F11 of the front-curtain running spring 25 and the elastic force F12 of the front-curtain set spring 27.

Further, as shown in FIG. 7, to the end of the front-curtain set lever 24, a front-curtain attracting piece 24*b* is fixed. The front-curtain attracting piece 24*b* is arranged to be attracted to the front-curtain electromagnet 26. When the front-curtain electromagnet 26 is supplied with power, the front-curtain electromagnet 26 generates a magnetic force. Thus, if the front-curtain electromagnet 26 is supplied with power when the front-curtain attracting piece 24*b* is in contact with the front-curtain electromagnet 26, then the front-curtain attracting piece 24*b* is attracted to the front-curtain electromagnet 26 by the magnetic force of the front-curtain electromagnet 26. The attracting force between the front-curtain attracting piece 24*b* and the front-curtain electromagnet 26 has a sufficient power to counteract the elastic force F11 of the front-curtain running spring 25. Therefore, when the front-curtain attracting piece 24*b* is attracted to the front-curtain electromagnet 26, the position of the front-curtain set lever 24 is kept at a charge position shown in FIG. 9 even when the elastic force F11 of the front-curtain running spring 25 acts upon the front-curtain set lever 24.

Figures 18A, 18B:
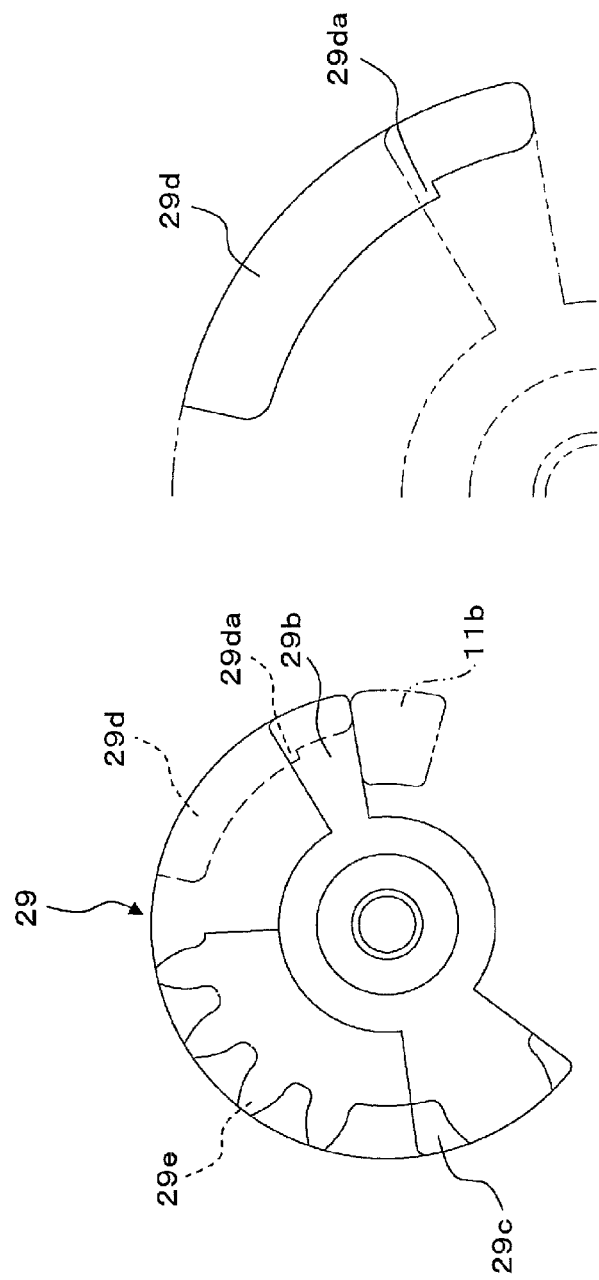
FIG. 18A is a plan view of a charge lever 29 and FIG. 18B is an enlarged partial view of the charge lever 29.

As shown in FIGS. 7 and 16B, the front-curtain set lever 24 rotatably supports a front-curtain set lever roller 24*c*. As shown in FIGS. 7 and 18A, the charge lever 29 includes a front-curtain set cam 29*b* (an example of a front-curtain cam part). As shown in FIG. 7, the front-curtain set lever roller 24*c* is arranged to be contactable with the front-curtain set cam 29*b*.

2.3: Rear-Curtain Drive Mechanism 193

Subsequently, the rear-curtain drive mechanism 193 for driving the rear curtain 31 will be explained.

As shown in FIGS. 6 and 7, the rear-curtain drive mechanism 193 includes a rear-curtain drive lever 38, a rear-curtain set lever 34, and a rear-curtain running spring 35.

The rear-curtain drive lever 38 couples the rear curtain 31 to the shutter base plate 11 to be movable between the first rear curtain position P21 and the second rear curtain position P22.

Figure 17:
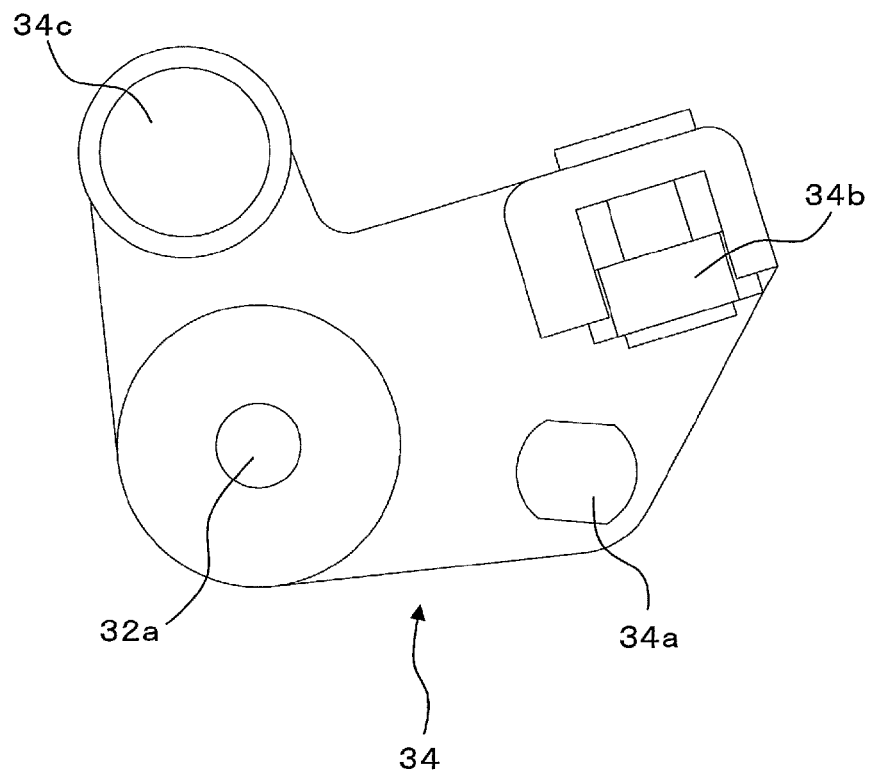
FIG. 17 is a plan view of a rear-curtain set lever 34.

As shown in FIGS. 7 and 17, the rear-curtain set lever 34 includes a rear-curtain set lever coupling pin 34*a*. The rear-curtain drive arm 32 includes a rear-curtain drive arm coupling hole 32*e*. The rear-curtain set lever coupling pin 34*a* is inserted into the rear-curtain drive arm coupling hole 32*e*.

Moreover, similarly to the rear-curtain drive arm 32, the rear-curtain set lever 34 is rotatably supported by the rotating shaft 32*a* around the rotating shaft 32*a*. The rear-curtain drive arm 32 and the rear-curtain set lever 34 can integrally rotate around the rotating shaft 32*a*.

The rear-curtain running spring 35 (one example of a second urging member) biases the rear curtain 31 in a direction where the rear curtain 31 covers the opening part 11*a*. Specifically, as shown in FIG. 7, the rear-curtain running spring 35 imparts the rear curtain 31 with an elastic force F21 via the rear-curtain drive arm 32 so that the rear curtain 31 moves from the second rear curtain position P22 to the first rear curtain position P21. The rear-curtain running spring 35 imparts the rear-curtain set lever 34 with the strong counterclockwise elastic force F21. The rear-curtain set lever 34 is arranged to transmit the elastic force F21 of the rear-curtain running spring 35 to the rear-curtain drive lever 38.

Further, as shown in FIG. 7, to the end of the rear-curtain set lever 34, a rear-curtain attracting piece 34*b* is fixed. The rear-curtain attracting piece 34*b* is arranged to be attracted to the rear-curtain electromagnet 36. When the rear-curtain electromagnet 36 is supplied with power, the rear-curtain electromagnet 36 generates a magnetic force. Thus, if the rear-curtain electromagnet 36 is supplied with the power when the rear-curtain attracting piece 34*b* is in contact with the rear-curtain electromagnet 36, then the rear-curtain attracting piece 34*b* is attracted to the rear-curtain electromagnet 36 by the magnetic force of the rear-curtain electromagnet 36. The attracting force between the rear-curtain attracting piece 34b and the rear-curtain electromagnet 36 has a sufficient power to counteract the elastic force F21 of the rear-curtain running spring 35. Therefore, when the rear-curtain attracting piece 34b is attracted to the rear-curtain electromagnet 36, the position of the rear-curtain set lever 34 is kept at a charge position shown in FIGS. 8 and 9 even when the elastic force F21 of the rear-curtain running spring 35 acts upon the rear-curtain set lever 34.

As shown in FIGS. 7 and 17, the rear-curtain set lever 34 rotatably supports a rear-curtain set lever roller 34c. As shown in FIGS. 7 and 18A, the charge lever 29 includes a rear-curtain set cam 29c. As shown in FIG. 7, the rear-curtain set lever roller 34c is arranged to be contactable with the rear-curtain set cam 29c.

2.4: Charge Mechanism 194

Next, the charge mechanism 194 will be explained.

The charge mechanism 194 (an example of a charge mechanism) is configured to impart the front-curtain running spring 25 and the rear-curtain running spring 35 with a first biasing force F13 resisting the elastic force F11 of the front-curtain running spring 25 and a second biasing force F23 resisting the elastic force F21 of the rear-curtain running spring 35. Specifically, as shown in FIG. 7, the charge mechanism 194 includes: a charge lever 29; a partly tooth-missing gear part 29e; a charge-lever return spring 30; a partly tooth-missing gear 40; a planet gear 41; a planet carrier 42; a sun gear 43; a worm gear 44; and a charge-lever detection switch 48.

A motor 46 (an example of an actuator) generates the first biasing force F13 imparted to the front-curtain running spring 25 and the second biasing force F23 imparted to the rear-curtain running spring 35. Specifically, the motor 46 is configured to drive the charge lever 29 to a front-curtain charge start position (an example of a first charge start position) at which imparting the front-curtain running spring 25 with the first biasing force F13 is started and a rear-curtain charge start position (an example of a second charge start position) at which imparting the rear-curtain running spring 35 with the second biasing force F23 is started. Further, the motor 46 is configured to drive the charge lever 29 to a front-curtain charge completion position (an example of a first charge completion position) at which imparting the front-curtain running spring 25 with the first biasing force F13 is completed and a rear-curtain charge completion position (an example of a second charge completion position) at which imparting the rear-curtain running spring 35 with the second biasing force F23 is completed.

Figure 9:
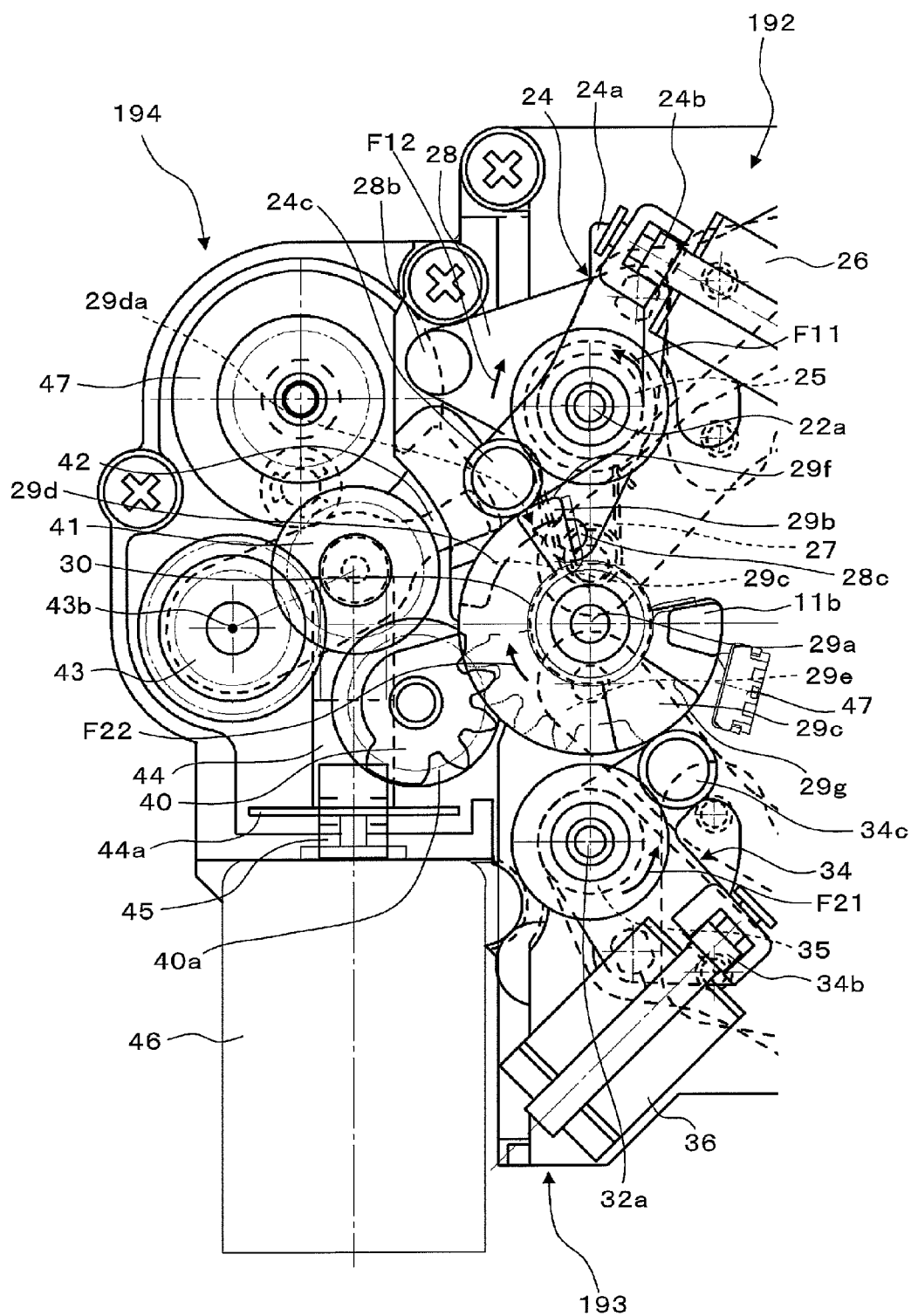
FIG. 9 is a detailed view of main parts in FIG. 8.

The rear-curtain charge completion position (a position shown in FIGS. 12 and 13) is disposed between the rear-curtain charge start position (a position shown in FIGS. 6 and 7) and the front-curtain charge completion position (a position shown in FIGS. 8 and 9). The motor 46 is configured to drive the charge lever 29 to the front-curtain charge start position (a position disposed between a position shown in FIG. 7 and a position shown in FIG. 13) and the a front-curtain running standby position (a position disposed between a position shown in FIG. 10 and a position shown in FIG. 11) relative to the front-curtain charge completion position. Further, the motor 46 is configured to drive the charge lever 29 to a restriction position of the charge lever 29. In this embodiment, the restriction position of the charge lever 29 is the same position as the front-curtain charge completion position (a position shown in FIGS. 8 and 9). An original position where the charge lever 29 is in contact with the stopper 11b is the same position as the rear-curtain charge completion position.

The charge lever 29 (an example of a charge member) is arranged to transmit the first biasing force F13 to the front-curtain running spring 25 via the front-curtain set lever 24, and is arranged to transmit the second biasing force F23 to the rear-curtain running spring 35 via the rear-curtain set lever 34. Specifically, as shown in FIGS. 18A and 18B, the charge lever 29 is arranged to drive the front-curtain drive lever 28, the front-curtain set lever 24, and the rear-curtain set lever 34, and includes: a rotating shaft 29a; the front-curtain set cam 29b; the rear-curtain set cam 29c; a front-curtain holding part 29d; and a reverse preventive part 29da. The charge lever 29 is rotatably disposed relative to the shutter base plate 11 around the rotating shaft 29a.

As shown in FIG. 7, the front-curtain set cam 29b (an example of a front-curtain cam part) and a front-curtain set lever 24 are arranged to be contactable with each other, and drive to rotate the front-curtain set lever 24 clockwise. More particularly, the front-curtain set cam 29b is arranged to be contactable with the front-curtain set lever roller 24c of the front-curtain set lever 24. If the charge lever 29 rotates counterclockwise when the front-curtain set cam 29b abuts the front-curtain set lever roller 24c, then the front-curtain set lever 24 rotates clockwise while resisting the elastic force F11 of the front-curtain running spring 25, resulting in the front-curtain attracting piece 24b contacting the front-curtain electromagnet 26. In this way, the elastic force required for running the front curtain 21 can be charged to the front-curtain running spring 25 by the charge lever 29.

As shown in FIG. 7, when the charge lever 29 is at the rear-curtain charge start position, a gap is secured between the front-curtain set cam 29b and the front-curtain set lever 24. As shown in FIG. 9, the charge lever 29 is at the front-curtain charge completion position, the front-curtain set lever 24 is in contact with the outer peripheral face 29f, and is held at the position shown in FIG. 9 by the front-curtain set cam 29b.

Figure 13:
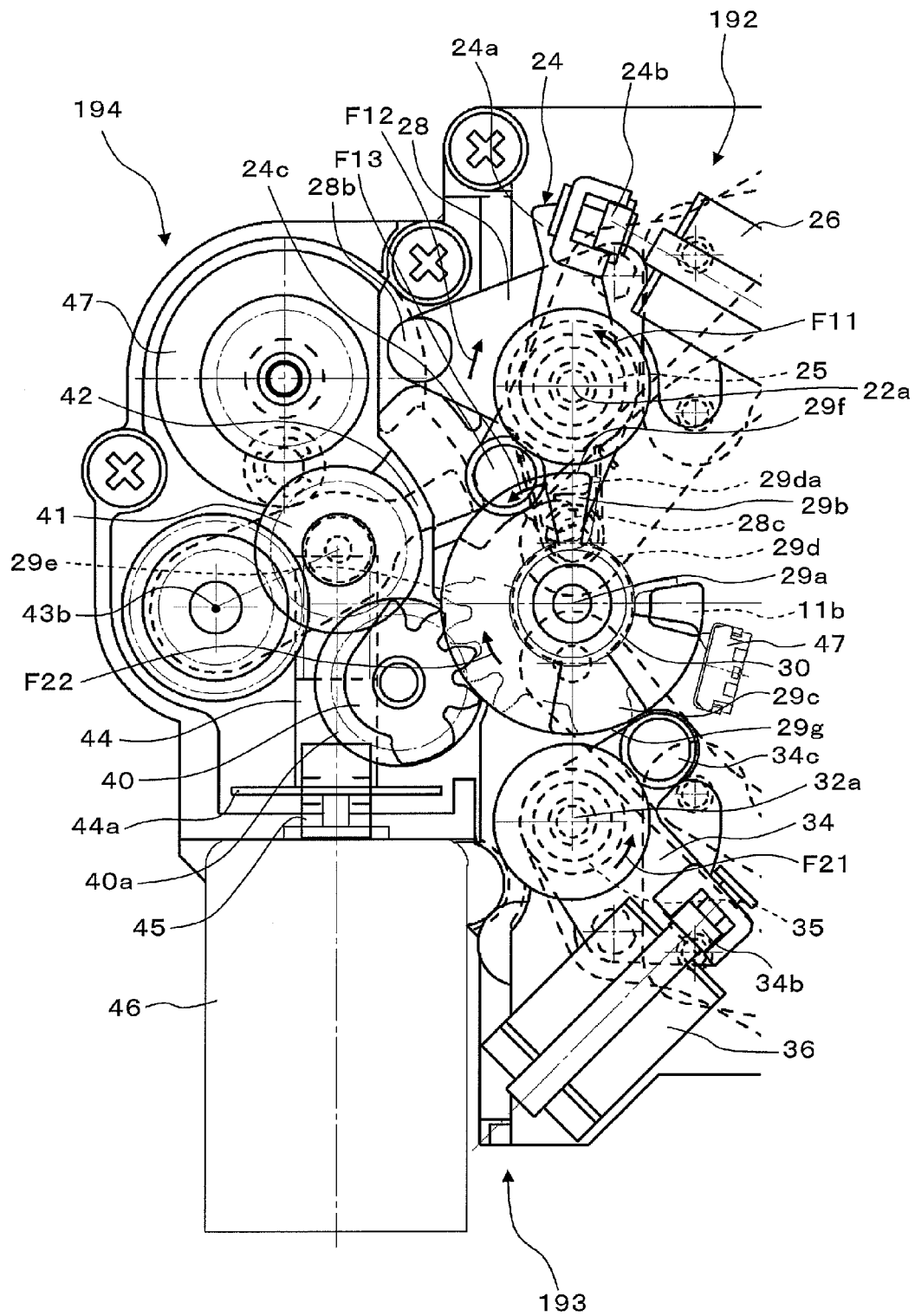
FIG. 13 is a detailed view of main parts in FIG. 12.

Moreover, the rear-curtain set cam 29c is arranged to be contactable with the rear-curtain set lever 34, and drives to rotate the rear-curtain set lever 34 clockwise. The rear-curtain set cam 29c is arranged to be contactable with the rear-curtain set lever roller 34c of the rear-curtain set lever 34. If the charge lever 29 rotates counterclockwise in a state where the rear-curtain set cam 29c abuts the rear-curtain set lever roller 34c, then the rear-curtain set lever 34 rotates clockwise while resisting the elastic force F21 of the rear-curtain running spring 35, resulting in the rear-curtain attracting piece 34b contacting the rear-curtain electromagnet 36. In this way, the biasing force required for running the rear curtain 31 can be charged to the rear-curtain running spring 35 by the charge lever 29. As shown in FIG. 13, when the charge lever 29 is positioned at the rear-curtain charge completion position, the rear-curtain set lever 34 is in contact with an outer peripheral face 29g of the rear-curtain set cam 29c, and is held at the position shown in FIG. 13 by the rear-curtain 29c.

As shown in FIG. 9, a state where the front-curtain attracting piece 24b is at the position to be attracted to the front-curtain electromagnet 26 is also referred to as "charge completion state of the front curtain 21". Moreover, a state where the rear-curtain attracting piece 34b is at the position to be attracted to the rear-curtain electromagnet 36 is also referred to as "charge completion state of the rear curtain 31". Bringing the front curtain 21 into the charge completion state is also referred to as "charging the front curtain 21". Further, bringing the rear curtain 31 into the charge completion state is also referred to as "charging the rear curtain 31".

Figure 19A:
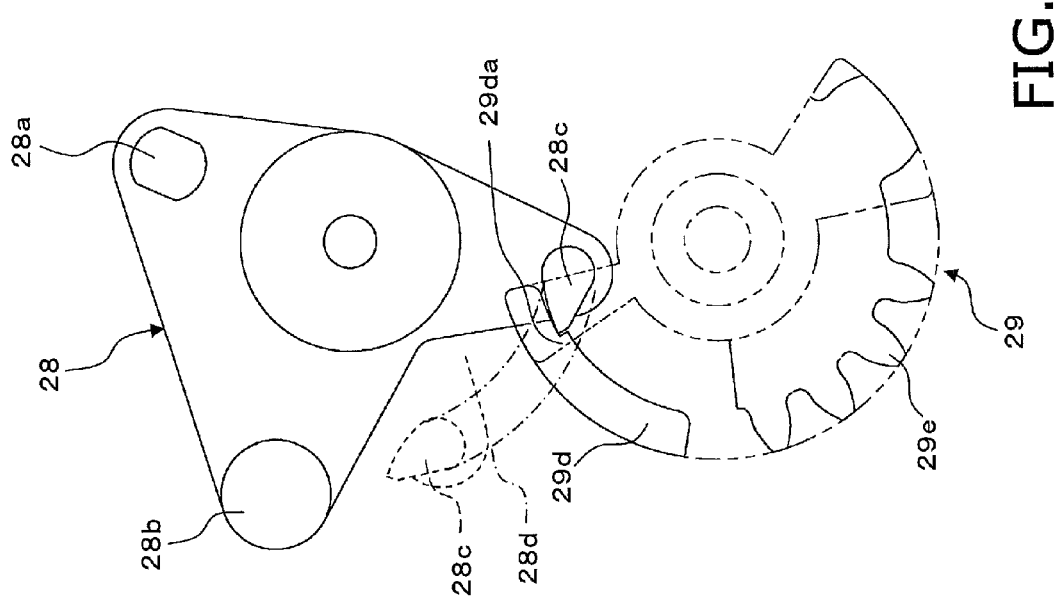
FIGS. 19A and 19B are operation diagrams of the front-curtain drive lever 28 and the charge lever 29.
Figure 19B:
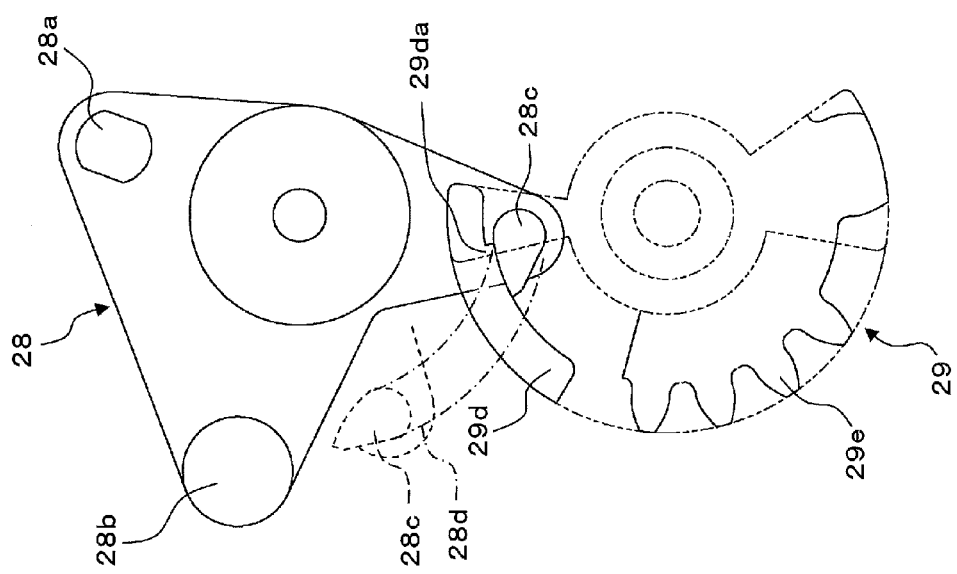

The charge lever 29 is capable of holding the front curtain 21 via the front-curtain drive lever 28 at the second front curtain position P12. When the charge lever 29 is at the front-curtain charge completion position, the charge lever 29 holds the front curtain 21 via the front-curtain drive lever 28 at the second front curtain position P12. Specifically, the front-curtain holding part 29*d* (an example of a front-curtain holding part) holds the front curtain 21 via the front-curtain drive lever 28 at the second front curtain position P12. The front-curtain drive lever 28 includes a claw 28*c* (an example of a claw) arranged to be contactable with the front-curtain holding part 29*d*. While the charge lever 29 rotates from the front-curtain charge start position to the front-curtain charge completion position, the front-curtain holding part 29*d* enters in a region 28*d* (an example of a substantially arc-shaped trajectory) where the claw 28*c* moves when the front curtain 21 moves from the second front curtain position P12 to the first front curtain position P11 (see FIGS. 19A and 19B). Therefore, during a time between the charge start and the charge completion of the front curtain 21, the front-curtain holding part 29*d* is permitted to be in contact with the claw 28*c*, and the clockwise rotation of the front-curtain drive lever 28 is restricted by the charge lever 29 (for example, see FIGS. 13 and 19A). As a result, the state where the front curtain 21 is retracted from the opening part 11*a* is maintained by the charge lever 29. That is, while the first biasing force F13 is imparted to the front-curtain running spring 25, the charge mechanism 194 can hold the front curtain 21 at the second front curtain position P12.

Figure 11:
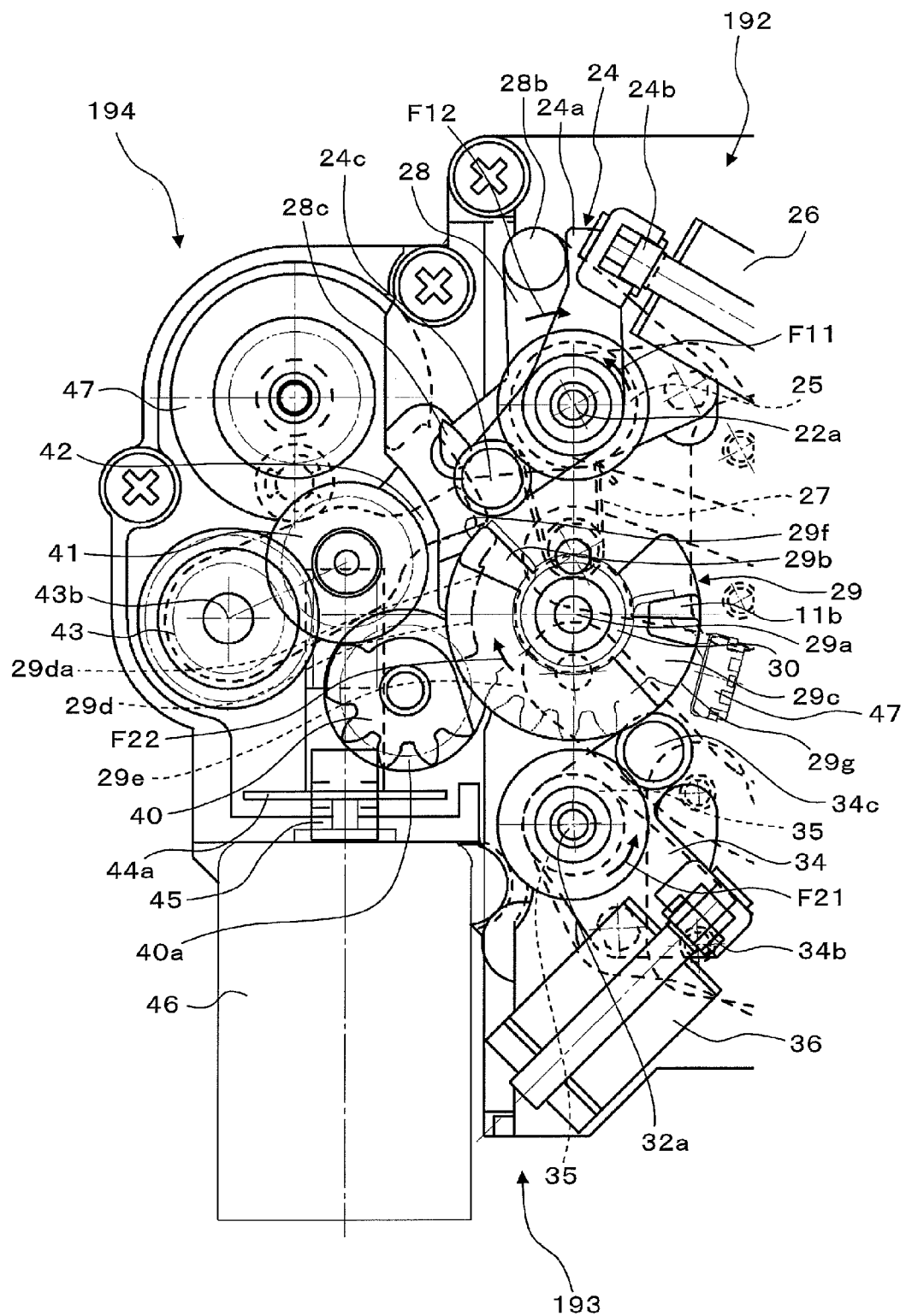
FIG. 11 is a detailed view of main parts in FIG. 10.

On the other hand, when the charge lever 29 is at the release position, the charge lever 29 cancels the holding of the front curtain 21 at the second front curtain position P12. Specifically, as shown in FIGS. 10 and 11, when the charge lever 29 is at the release position, the front-curtain holding part 29*d* is retracted from the moving region 28*d* of the claw 28*c*. In this state, the front-curtain holding part 29*d* does not abut the claw 28*c*, and thus, the clockwise rotation of the front-curtain drive lever 28 is not restricted by the front-curtain holding part 29*d*.

Moreover, when the charge lever 29 is at the restriction position (the position shown in FIGS. 8 and 9), the front-curtain drive lever 28 restricts returning of the charge lever 29 to the original position (the position shown in FIGS. 6 and 7). Specifically, the front-curtain holding part 29*d* includes the reverse preventive part 29*da*. The reverse preventive part 29*da* has a step. In a state where the distal end of the claw 28*c* is hooked onto the reverse preventive part 29*da*, the clockwise rotation of the charge lever 29 is restricted by the claw 28*c*. When the charge lever 29 is at the restriction position, the claw 28*c* comes hooked onto the reverse preventive part 29*da*.

The partly tooth-missing gear part 29*e* is rotatably arranged, together with the charge lever 29. The charge lever 29 and the partly tooth-missing gear part 29*e* are rotatably supported by the rotating shaft 29*a*. The charge lever 29 is biased clockwise by the charge-lever return spring 30. The charge-lever return spring 30 (an example of a return elastic member) imparts the charge lever 29 with the elastic force F22 so that the charge lever 29 returns to the original position obtained before imparting the first biasing force F13 and the second biasing force F23 is started. The stopper 11*b* provided on the shutter base plate 11 abuts the charge lever 29 so as to restrict the rotation of the charge lever 29 by the charge-lever return spring 30. As shown in FIGS. 6 and 7, in a state where no force other than the biasing force of the charge-lever return spring 30 acts upon the charge lever 29, the charge lever 29 is held at the original position where the charge lever 29 abuts the stopper 11*b*.

The partly tooth-missing gear part 29*e* can be meshed with the partly tooth-missing gear 40. The partly tooth-missing gear 40 is rotatably supported by the shutter base plate 11. The partly tooth-missing gear 40 is configured by a stepped gear, and includes a gear part 40*a* including teeth extending over the length. The gear part 40*a* can be meshed with the planet gear 41.

The planet gear 41 is rotatably supported by the planet carrier 42. The planet carrier 42 is rotatably supported by the shutter base plate 11 around the same shaft 43*b* as the sun gear 43. The sun gear 43 is meshed with the planet gear 41. At this time, when an appropriate rotation load is applied to the sun gear 43, the planet carrier 42 and the planet gear 41 rotate around the shaft 43*b* according to a rotation direction of the sun gear 43. When the planet gear 41 rotates around the shaft 43*b*, a gear with which the planet gear 41 is meshed can be switched to the partly tooth-missing gear 40 or a coupling gear 47.

The planet carrier 42 includes a first rotation restriction part 42*a* and a second rotation restriction part 42*b*. The first rotation restriction part 42*a* and the second rotation restriction part 42*b* abut a first stopper 11*c* and a second stopper 11*d* provided on the shutter base plate 11, respectively. Thereby, the rotation of the planet carrier 42 relative to the shutter base plate 11 is restricted within a predetermined range.

The sun gear 43 is configured by a stepped gear, and includes a worm wheel 43*a* meshed with the worm gear 44. The worm gear 44 is fixed to the rotating shaft 46*a* of the motor 46. The worm gear 44 includes an encoder vane 44*a*. As a result of the encoder vane 44*a* blocking light of a photo interrupter 45, it becomes possible to measure a rotation amount (drive amount) or a speed of the motor 46.

The charge-lever detection switch 48 is fixed to the shutter base plate 11, and detects a rotation position of the charge lever 29. More particularly, the charge-lever detection switch 48 detects whether or not the charge lever 29 is in proximity.

3: Operation of Slit Exposure Photography

Figure 20:
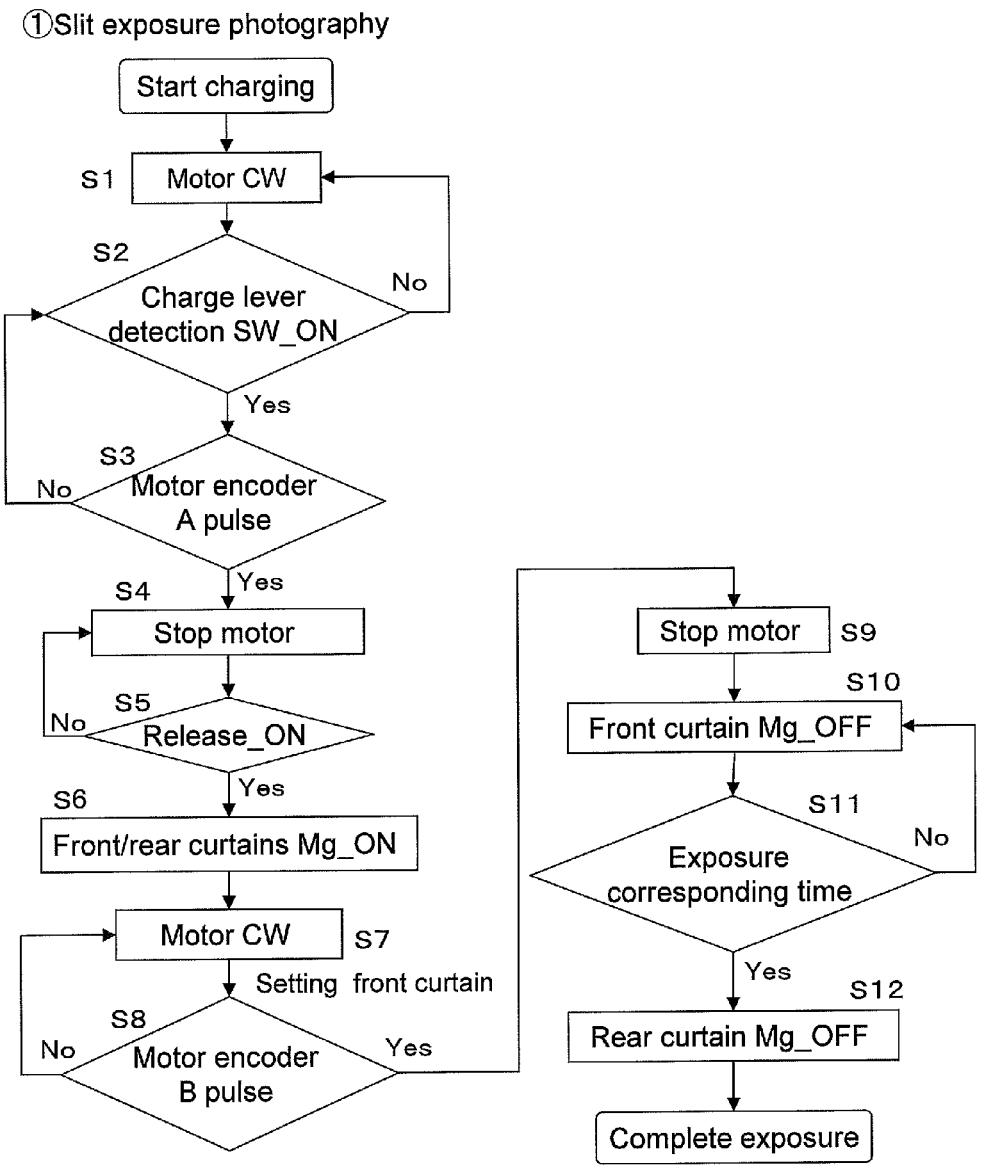
FIG. 20 is a flowchart of slit exposure photography.

Subsequently, an operation of slit exposure photography will be explained. A flowchart shown in FIG. 20 is a flowchart of the slit exposure photography.

3.1: Running Completion State

FIG. 6 shows a photography end state of the focal plane shutter device 190, i.e., a state where running of the front curtain 21 and the rear curtain 31 is completed. FIG. 7 is an enlarged view of main parts of FIG. 6.

In the running completion state shown in FIG. 6, the front curtain 21 is retracted the upper side of the opening part 11*a* by the elastic force F11 of the front-curtain running spring 25. When the front curtain 21 is disposed at the second front curtain position P12, the front-curtain set lever 24 abuts the front-curtain drive lever 28 so that the front-curtain-set-lever contacting portion 24*a* abuts the front-curtain-drive-lever contacting portion 28*b* by the elastic force F12 of the front-curtain set spring 27 and the elastic force F11 of the front-curtain running spring 25. Moreover, the rear curtain 31 keeps covering the opening part 11*a* by the elastic force F21 of the rear-curtain running spring 35. The rear-curtain set lever 34 holds the counterclockwise rotation by the biasing force of the rear-curtain running spring 35.

3.2: Charge Operation

FIG. 8 is a view showing a state when charging of the front-curtain set lever 24 and the front-curtain drive lever 28 is completed by the charge lever 29. In the running completion state shown in FIG. 6, the motor 46 is energized, and the sun gear 43 rotates clockwise by the motor 46 (step S1). As a result, the planet carrier 42 rotates clockwise by a rotation load, resulting in the second rotation restriction part 42*b* and the second stopper 11*d* contacting with each other.

Thereafter, the planet gear 41 rotates counterclockwise, which in turns rotates the partly tooth-missing gear 40. The partly tooth-missing part 40*b* provided to the partly tooth-missing gear 40 is meshed with the partly tooth-missing gear part 29e of the charge lever 29, and the partly tooth-missing gear part 29e is rotated counterclockwise. The charge lever 29 provided integrally with the partly tooth-missing gear part 29e rotates counterclockwise resisting the elastic force F22 of the charge-lever return spring 30.

At this time, at the same time that the motor 46 is energized, the charge-lever detection switch 48 starts detecting whether or not the charge lever 29 is in proximity (step S2). When the charge lever 29 is detected by the charge-lever detection switch 48 as a result of advancement of the rotation of the charge lever 29, detection of the drive amount of the motor 46 is started by using the photo interrupter 45 and the encoder vane 44a (step S3).

If the charge lever 29 rotates counterclockwise in states shown in FIGS. 6 and 7, then the rear-curtain set lever roller 34c is pressed by the rear-curtain set cam 29c, and the rear-curtain set lever 34 rotates clockwise. When the rear-curtain set lever 34 rotates clockwise, the rear curtain 31 moves from the first rear curtain position P21 toward the second rear curtain position P22, and the rear curtain 31 is retracted from the opening part 11a. When the rear-curtain set lever roller 34c reaches an outer peripheral face 29g of the rear-curtain set cam 29c, the rear curtain 31 reaches the second rear curtain position P22, and the rear-curtain attracting piece 34b is pushed against the rear-curtain electromagnet 36 (see FIGS. 8 and 9). The position of the rear-curtain set lever 34 is held by the outer peripheral face 29g of the rear-curtain set cam 29c, and thus, the elastic force F21 of the rear-curtain running spring 35 does not act, as the rotation force, upon the charge lever 29.

Similarly, when the charge lever 29 rotates counterclockwise, the front-curtain set lever roller 24c is pressed by the front-curtain set cam 29b, and the front-curtain set lever 24 rotates clockwise. When the front-curtain set lever roller 24c reaches an outer peripheral face 29f of the front-curtain set cam 29b, the front-curtain attracting piece 24b is pushed against the front-curtain electromagnet 26. The position of the front-curtain set lever 24 is held by the outer peripheral face 29f of the front-curtain set cam 29b, and thus, the elastic force F11 of the front-curtain running spring 25 does not act, as the rotation force, upon the charge lever 29.

On the other hand, when the front-curtain set lever 24 rotates clockwise, and also the front-curtain drive lever 28 attempts to rotate clockwise, together with the front-curtain set lever 24, by the elastic force F12 of the front-curtain set spring 27.

However, when the charge lever 29 rotates counterclockwise, the front-curtain holding part 29d enters into a rotation trail (an example of a moving region) of the claw 28c so that the claw 28c abuts the front-curtain holding part 29d. As a result, the clockwise rotation of the front-curtain drive lever 28 is restricted by the front-curtain holding part 29d. Therefore, when the charge lever 29 rotates counterclockwise, only the front-curtain set lever 24 rotates clockwise and the front-curtain drive lever 28 does not rotate clockwise. The front-curtain drive lever 28 does not rotate, and thus, during the above-described charge operation, the front curtain 21 is kept being held at the second front curtain position P12 and the front curtain 21 is kept being retracted from the opening part 11a.

When the drive amount of the motor 46 reaches a predetermined value, the drive of the motor 46 is stopped (step S4). At this time, the charge lever 29 stops at the position shown in FIGS. 8 and 9. The charge lever 29 stops at the position shown in FIGS. 8 and 9, and thus, even after the charge operation, the claw 28c is kept contacting the front-curtain holding part 29d and the front curtain 21 is kept being retracted from the opening part 11a.

In this way, the focal plane shutter device 190 can automatically maintain the state where the opening part 11a is opened even during the charge operation and after the charge operation. That is, the focal plane shutter device 190 has a so-called normally open function.

Figure 22:
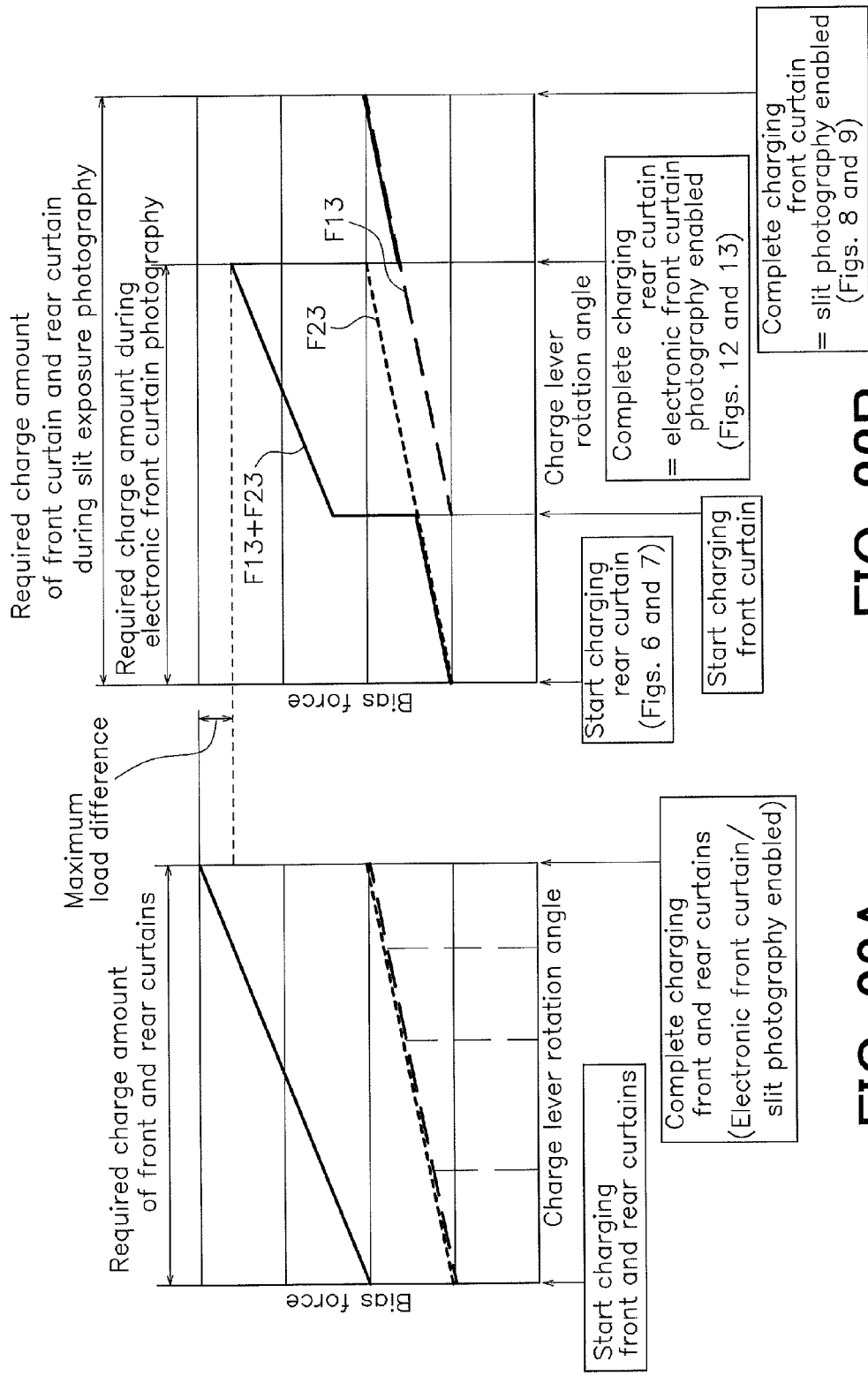
FIG. 22A shows a relation between a rotation angle of a charge gear and a bias force (reference example) and FIG. 22B shows a relation between the rotation angle of the charge gear and the bias force (first embodiment)

At this time, as shown in FIG. 22B, a timing at which the charge mechanism 194 completes charging the front-curtain running spring 25 is different from a timing at which the charge mechanism 194 completes charging the rear-curtain running spring 35. More particularly, a timing at which the charge mechanism 194 completes charging the rear-curtain running spring 35 is earlier than a timing at which the charge mechanism 194 completes charging the front-curtain running spring 25. The charge completion timing is determined by the position and the shape of the front-curtain set cam 29b and the rear-curtain set cam 29c.

At this time, the timing at which the charge mechanism 194 completes charging the front-curtain running spring 25 means a timing at which the charge mechanism 194 completes imparting the front-curtain set lever 24 with the first biasing force F13 resisting the elastic force F11 of the front-curtain running spring 25. Therefore, a timing at which the front-curtain set lever roller 24c is placed over the outer peripheral face 29f of the front-curtain set cam 29b is equivalent to the timing at which the charge mechanism 194 completes charging the front-curtain running spring 25.

Likewise, the timing at which the charge mechanism 194 completes charging the rear-curtain running spring 35 means a timing at which the charge mechanism 194 completes imparting the rear-curtain set lever 34 with the second biasing force F23 resisting the elastic force F21 of the rear-curtain running spring 35. Therefore, a timing at which the rear-curtain set lever roller 34c is placed over the outer peripheral face 29g of the rear-curtain set cam 29c is equivalent to the timing at which the charge mechanism 194 completes charging the rear-curtain running spring 35.

Moreover, a timing at which the charge mechanism 194 starts charging the front-curtain running spring 25 is different from a timing at which the charge mechanism 194 starts charging the rear-curtain running spring 35. Specifically, a timing at which the charge mechanism 194 starts imparting the rear-curtain running spring 35 with the second biasing force F23 is earlier than a timing at which the charge mechanism 194 starts imparting the front-curtain running spring 25 with the first biasing force F13. The charge start timing is determined by the position and the shape of the front-curtain set cam 29b and the rear-curtain set cam 29c.

At this time, the timing at which the charge mechanism 194 starts charging the front-curtain running spring 25 means a timing at which the charge mechanism 194 starts imparting the front-curtain set lever 24 with the first biasing force F13 resisting the elastic force F11 of the front-curtain running spring 25. Therefore, a timing at which the front-curtain set lever roller 24c abuts the front-curtain set cam 29b is equivalent to the timing at which the charge mechanism 194 starts charging the front-curtain running spring 25.

Likewise, the timing at which the charge mechanism 194 starts charging the rear-curtain running spring 35 means a timing at which the charge mechanism 194 starts imparting the rear-curtain set lever 34 with the second biasing force F23 resisting the elastic force F21 of the rear-curtain running spring 35. Therefore, a timing at which the rear-curtain set lever roller 34c abuts the rear-curtain set cam 29c is equivalent to the timing at which the charge mechanism 194 completes charging the rear-curtain running spring 35.

Further, in a state where the front-curtain set lever roller 24c is supported by the outer peripheral face 29f of the front-curtain set cam 29b, the front-curtain attracting piece 24b is pushed against the front-curtain electromagnet 26. Likewise, in a state where the rear-curtain set lever roller 34c is supported by the outer peripheral face 29g of the rear-curtain set cam 29c, the rear-curtain attracting piece 34b is pushed against the rear-curtain electromagnet 36. Therefore, contact between the rear-curtain attracting piece 34b and the rear-curtain electromagnet 36 is performed before contact between the front-curtain attracting piece 24b and the front-curtain electromagnet 26. In other words, the front-curtain set cam 29b and the rear-curtain set cam 29c are shaped so that the contact between the rear-curtain attracting piece 34b and the rear-curtain electromagnet 36 is performed before the contact between the front-curtain attracting piece 24b and the front-curtain electromagnet 26.

Thus, in the first embodiment, the timing at which the charge mechanism 194 completes charging the rear-curtain running spring 35 is earlier than the timing at which the charge mechanism 194 completes charging the front-curtain running spring 25 (see FIG. 22B, for example). Thereby, as compared to a reference example shown in FIG. 22A, for example, a force required for charging (i.e., the load of the motor 46) can be decreased. In the reference example shown in FIG. 22A, the charge completion timings are the same in the front curtain and the rear curtain.

A state shown in FIG. 8 guides light from a subject to a CMOS image sensor 110. This state is effective particularly when a user wishes to maintain a state where the CMOS image sensor 110 is exposed. For example, this state is particularly effective when by using a live view function by the camera body 100, the subject is observed, framing is performed, or moving picture photography is performed.

It is noted that the camera controller 140 comprehends the rotation position of the charge lever 29 based on the rotation amount of the motor 46. More particularly, the camera controller 140 can comprehend the rotation amount of the motor 46 by the encoder vane 44a and the photo interrupter 45, and further, can comprehend the original position of the charge lever 29 based on the detected result of the charge-lever detection switch 48. Therefore, the camera controller 140 can comprehend the rotation position (rear curtain charge completion position, restriction position, and release position) of the charge lever 29 where the original position is used as a reference.

3.3: Reverse of Motor

When the motor 46 is reversed in a state shown in FIGS. 8 and 9, the sun gear 43 rotates counterclockwise, and along therewith, the planet carrier 42 rotates counterclockwise around the shaft 43b. As a result, the first rotation restriction part 42a of the planet carrier 42 abuts the first stopper 11c. The planet gear 41 is meshed not with the partly tooth-missing gear 40 but with the coupling gear 47 at the position where the first rotation restriction part 42a abuts the first stopper 11c, and thus, the rotation of the sun gear 43 is transmitted to the coupling gear 47 via the planet gear 41. As a result of the coupling gear 47 being coupled to another member, another drive member can also be driven by taking advantage of the rotation of the coupling gear 47. Examples of the other drive member include a flash pop-up.

When the planet gear 41 is meshed with the partly tooth-missing gear 40, because of a self lock function of the worm gear 44, the sun gear 43 and the planet gear 41 do not rotate in a state where the worm gear 44 does not rotate, and the partly tooth-missing gear 40 meshed with the planet gear 41 does not rotate, either. Therefore, if the partly tooth-missing gear 40 is meshed with the partly tooth-missing gear part 29e, then the charge lever 29 does not rotate.

However, when the planet gear 41 rotates counterclockwise around the shaft 43b, the meshing between the planet gear 41 and the partly tooth-missing gear 40 is released. Therefore, the self lock function of the worm gear 44 does not act upon the partly tooth-missing gear 40 and the charge lever 29, resulting in the charge lever 29 being rotated clockwise by the elastic force F22 of the charge-lever return spring 30. When the charge lever 29 rotates clockwise, the front-curtain set lever 24 and the rear-curtain set lever 34 also rotate clockwise, and the charging of the front curtain 21 and the rear curtain 31 is also released.

Therefore, in the states shown in FIGS. 8 and 9, the distal end of the claw 28c is hooked onto the reverse preventive part 29da provided to the front-curtain holding part 29d of the charge lever 29. Thereby, the clockwise rotation of the charge lever 29 can be restricted, and it becomes possible to freely utilize the reverse rotation of the motor 46 to drive another member while maintaining the charge completion state.

3.4: Slit Exposure Standby State

When the release button 131 is operated by the user in the state shown in FIG. 8, necessary photography information such as photometry is obtained by the camera controller 140. After completing obtaining the photography information, the release operation is started.

Specifically, when the release button 131 is depressed, as shown in FIG. 20, in order to maintain the charge completion state of the front curtain 21 and the rear curtain 31, power feeding to the front-curtain electromagnet 26 and the rear-curtain electromagnet 36 is started before the motor 46 is driven (steps S5 and S6). As a result, the front-curtain attracting piece 24b is attracted to the front-curtain electromagnet 26, and the rear-curtain attracting piece 34b is attracted to the rear-curtain electromagnet 36. Therefore, even when the front-curtain set lever 24 and the rear-curtain set lever 34 are permitted to rotate counterclockwise, the front-curtain set lever 24 and the rear-curtain set lever 34 are held at the charge position.

After the power feeding to the front-curtain electromagnet 26 and the rear-curtain electromagnet 36 is started, the motor 46 is driven by a predetermined drive amount by the camera controller 140 (steps S7, S8, and S9). Specifically, when the sun gear 43 is driven to rotate clockwise by the motor 46, the charge lever 29 rotates counterclockwise. When the charge lever 29 rotates counterclockwise, the front-curtain holding part 29d of the charge lever 29 is retracted from the moving region 28d of the claw 28c of the front-curtain drive lever 28 before the meshing between the partly tooth-missing gear 40 and the partly tooth-missing gear part 29e is released, and the contacting between the front-curtain holding part 29d and the claw 28c is released. Thus, the front-curtain drive lever 28 rotates clockwise by the elastic force F12 of the front-curtain set spring 27, and the front curtain 21 runs from the second front curtain position P12 to the first front curtain position P11. When the front-curtain-drive-lever contacting portion 28b abuts the front-curtain-set-lever contacting portion 24a, the rotation of the front-curtain drive lever 28 stops and the front curtain 21 stops at the first front curtain position P11. Therefore, as shown in FIG. 10, the opening part 11a is shielded by the front curtain 21.

When the charge lever 29 further rotates counterclockwise, the meshing between the partly tooth-missing gear 40 and the partly tooth-missing gear part 29e of the charge lever 29 is released. When the meshing between the partly tooth-missing gear 40 and the partly tooth-missing gear part 29e is released, the contacting between the front-curtain set lever roller 24c and the front-curtain set cam 29b is released. When the contacting between the front-curtain set lever roller 24c and the front-curtain set cam 29b is released, the front-curtain set lever 24 is permitted to rotate counterclockwise by the elastic force F11 of the front-curtain running spring 25. Moreover, when the meshing between the partly tooth-missing gear 40 and the partly tooth-missing gear part 29e is released, the contacting between the rear-curtain set lever roller 34c and the rear-curtain set cam 29c is released. When the contacting between the rear-curtain set lever roller 34c and the rear-curtain set cam 29c is released, the rear-curtain set lever 34 is permitted to rotate counterclockwise by the elastic force F21 of the rear-curtain running spring 35.

However, as described above, the power feeding to the front-curtain electromagnet 26 and the rear-curtain electromagnet 36 is started before the driving of the motor 46 is started, and thus, even when the front-curtain set lever 24 and the rear-curtain set lever 34 are permitted to rotate counterclockwise, the front-curtain set lever 24 and the rear-curtain set lever 34 are held at the charge position. That is, it is possible to maintain the charge completion state of the front curtain 21 and the rear curtain 31.

In this way, the state of the focal plane shutter device 190 proceeds from the state shown in FIG. 8 to the slit exposure standby state shown in FIG. 10. In the state shown in FIG. 10, the opening part 11a is shielded by the front curtain 21 while the charge completion state of the front curtain 21 and the rear curtain 31 is maintained.

3.5: Slit Exposure

Thereafter, based on a release command from the camera controller 140, the power feeding to the front-curtain electromagnet 26 is stopped (step S10). Then, the front-curtain set lever 24 rotates counterclockwise by the elastic force F11 of the front-curtain running spring 25. At this time, the front-curtain-drive-lever contacting portion 28b is pushed by the front-curtain-set-lever contacting portion 24a, and thus, the front-curtain drive lever 28 rotates counterclockwise together with the front-curtain set lever 24, and the front curtain 21 runs from the first front curtain position P11 to the second front curtain position P12. As a result, light is incident upon the CMOS image sensor 110 through the opening part 11a, and exposing the CMOS image sensor 110 is started.

On the other hand, after a previously-set exposure time elapses from the stop of the power feeding to the front-curtain electromagnet 26, the power feeding to the rear-curtain electromagnet 36 is stopped (steps S11 and S12). The exposure time is set based on exposure information, etc., by the camera controller 140. Once the power feeding to the rear-curtain electromagnet 36 is stopped, the rear-curtain set lever 34 rotates counterclockwise by the elastic force F21 of the rear-curtain running spring 35, and the rear curtain 31 runs from the second rear curtain position P22 to the first rear curtain position P21. As a result, the opening part 11a is shielded by the rear curtain 31 sequentially from a lower portion of the opening part 11a. At this time, a slit is formed between the front curtain 21 and the rear curtain 31, and the slit moves from the downstream side to the upper side of the opening part 11a. Thus, the CMOS image sensor 110 is exposed by light incident through the slit. The exposure operation by such a slit is called slit exposure photography. When the front curtain 21 and the rear curtain 31 complete running, the state of the focal plane shutter device 190 is changed to the state shown in FIG. 6. When the charge operation is performed, the state of the focal plane shutter device 190 is changed to the state shown in FIG. 8, and then, the process prepares for next photography.

4: Operation of Electronic Front Curtain Photography

Figure 21:
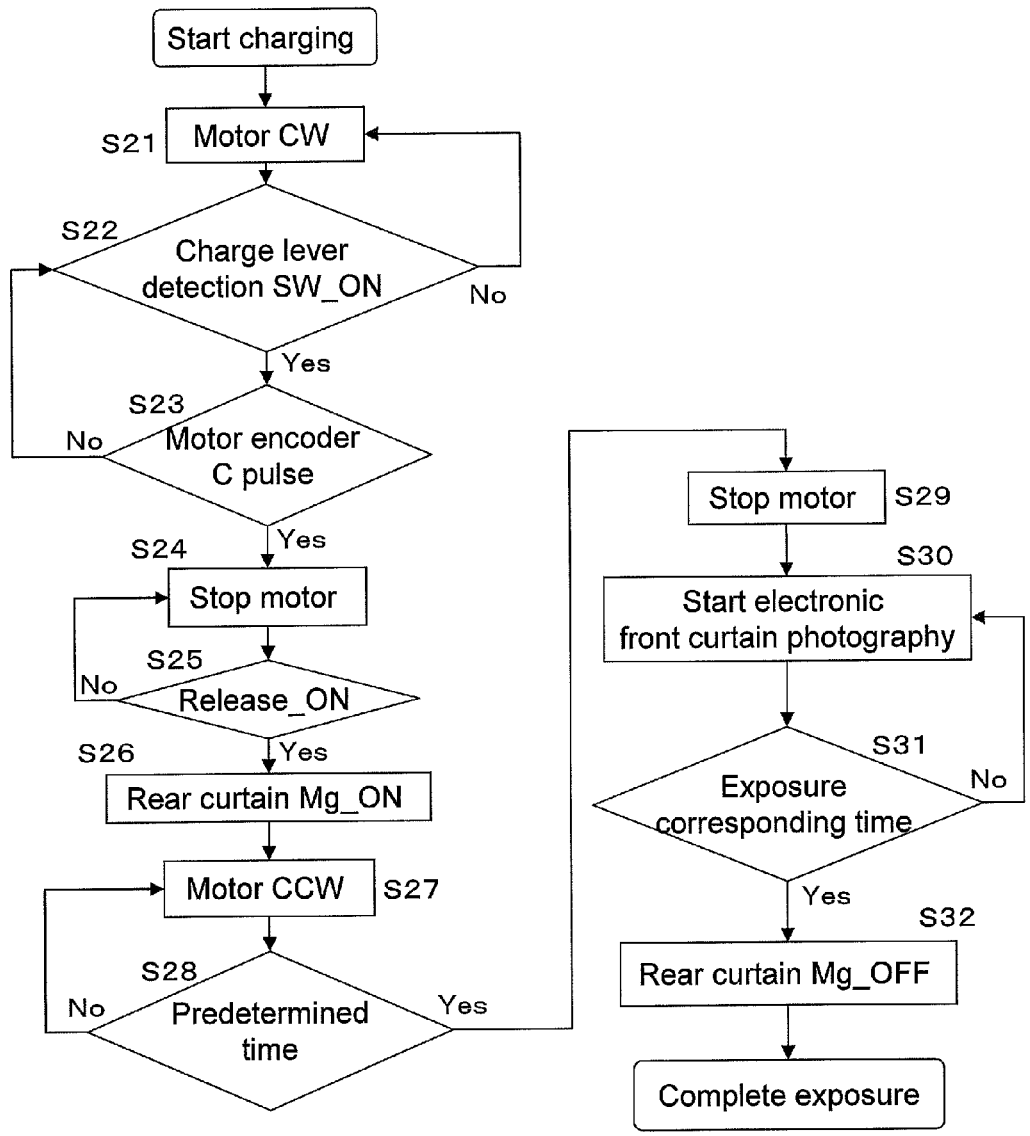
FIG. 21 is a flowchart of electronic front curtain photography.

Next, the operation of electronic front curtain photography will be explained. A flowchart shown in FIG. 21 is a flowchart of the electronic front curtain photography.

4.1: Running Completion State

An end state of the operation of the electronic front curtain photography is the same as the end state of the above-described slit exposure photography. That is, FIG. 6 shows a state where the running of the rear curtain 31 is completed by the electronic front curtain photography.

4.2: Charge Operation

Figure 14:
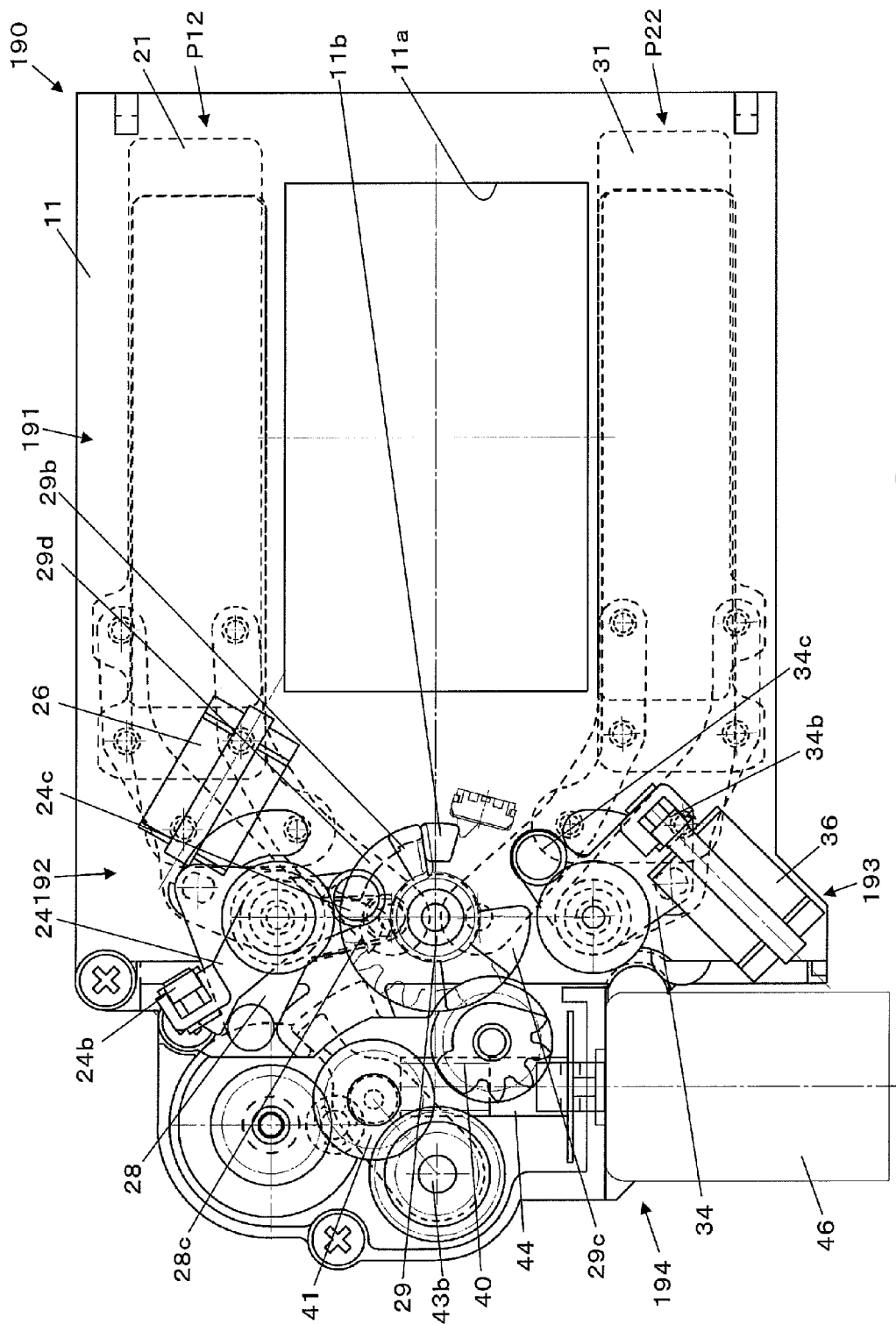
FIG. 14 is a state diagram of the focal plane shutter device 190 in an electronic front curtain photography standby state.
Figure 15:
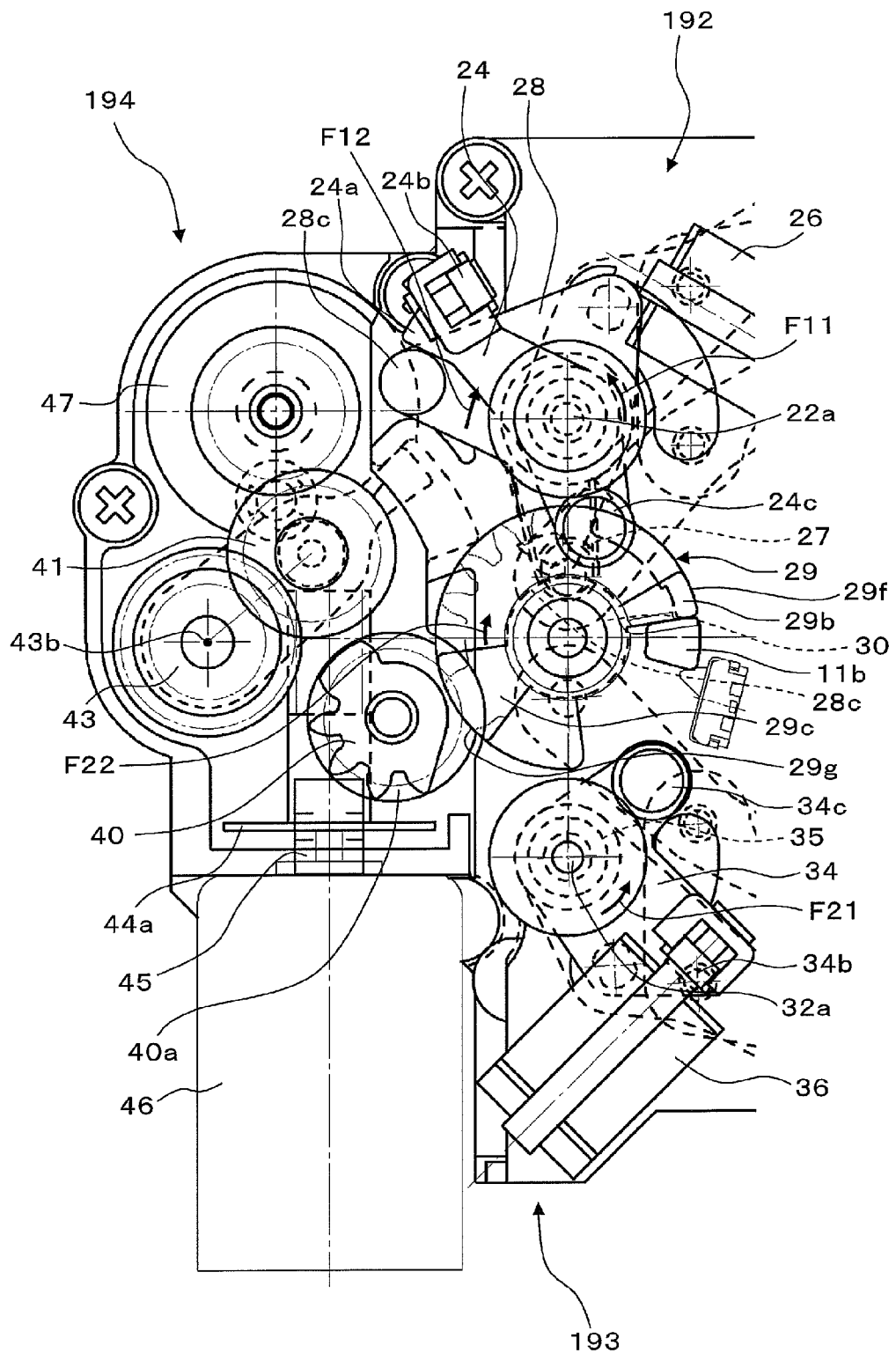
FIG. 15 is a detailed view of main parts in FIG. 14.

FIGS. 14 and 15 show a state where only the rear curtain 31 completes charging for the electronic front curtain photography. Similarly to the charge operation at the time of the slit exposure photography, the motor 46 is energized in the limning completion state of FIG. 6, and the sun gear 43 rotates clockwise (step S21). When the sun gear 43 rotates clockwise, the charge lever 29 rotates counterclockwise.

However, in the charge operation of the electronic front curtain photography, the rotation of the charge lever 29 is stopped earlier than the charge completion state of the slit exposure photography shown in FIG. 8. Specifically, whether or not the drive amount of the motor 46 reaches a predetermined value is detected by the charge-lever detection switch 48 and the encoder vane 44a, and the drive amount at this time is set smaller than the drive amount at the time of the charge for the slit exposure photography. Therefore, as shown in FIG. 10, upon completion of charging in the electronic front curtain photography, the rotation of the charge lever 29 is stopped just short of the rotation position of the charge lever 29 in the slit exposure photography. More particularly, the charge lever 29 stops at the rotation position shown in FIGS. 12 and 13.

The operation of each member along with the counterclockwise rotation of the charge lever 29 is similar to the charge operation at the time of the slit exposure photography. In the charge completion state shown in FIGS. 12 and 13, the rear-curtain set lever roller 34c reaches the outer peripheral face 29g of the rear-curtain set cam 29c. Therefore, the rear-curtain attracting piece 34b is pushed against the rear-curtain electromagnet 36.

On the other hand, the rotation of the charge lever 29 stops earlier than the charge operation for the slit exposure photography, and thus, although also the front-curtain set lever 24 slightly rotates clockwise, similarly to the rear-curtain set lever 34, the front-curtain set lever roller 24c does not reach the outer peripheral face 29f of the front-curtain set cam 29b. Therefore, the front-curtain attracting piece 24b has not rotated to a position at which the front-curtain electromagnet 26 can attract the front-curtain attracting piece 24b.

In a charge completion state shown in FIG. 10, the rear-curtain set lever 34 is coupled to the rear curtain 31, and thus, the rear curtain 31 is disposed at the second rear curtain position P22 and the rear curtain 31 is retracted downwardly from the opening part 11a. Even after the charge is completed, the rear-curtain set cam 29c abuts the rear-curtain set lever roller 34c, and thus, the state where the rear curtain 31 is retracted from the opening part 11a is maintained.

On the other hand, the front-curtain set lever 24 slightly rotates clockwise, and also the front-curtain drive lever 28 attempts to rotate clockwise by the elastic force F12 of the front-curtain set spring 27. However, when the charge lever 29 rotates counterclockwise, the front-curtain holding part 29d already enters into the rotation trail of the claw 28c and the front-curtain holding part 29d restricts the rotation of the front-curtain drive lever 28. The front-curtain drive lever 28 does not rotate during the above-described charge operation, and thus, the state where the front curtain 21 is retracted from the opening part 11a is maintained. Moreover, even after the charge operation, the claw 28c abuts the front-curtain holding part 29d, and thus, the state where the front curtain 21 is retracted from the opening part 11a is maintained.

In this way, the focal plane shutter device 190 can automatically maintain the state where the opening part 11a is opened during the charge operation and after the charge operation. That is, the focal plane shutter device 190 has a so-called normally open function.

Figure 12:
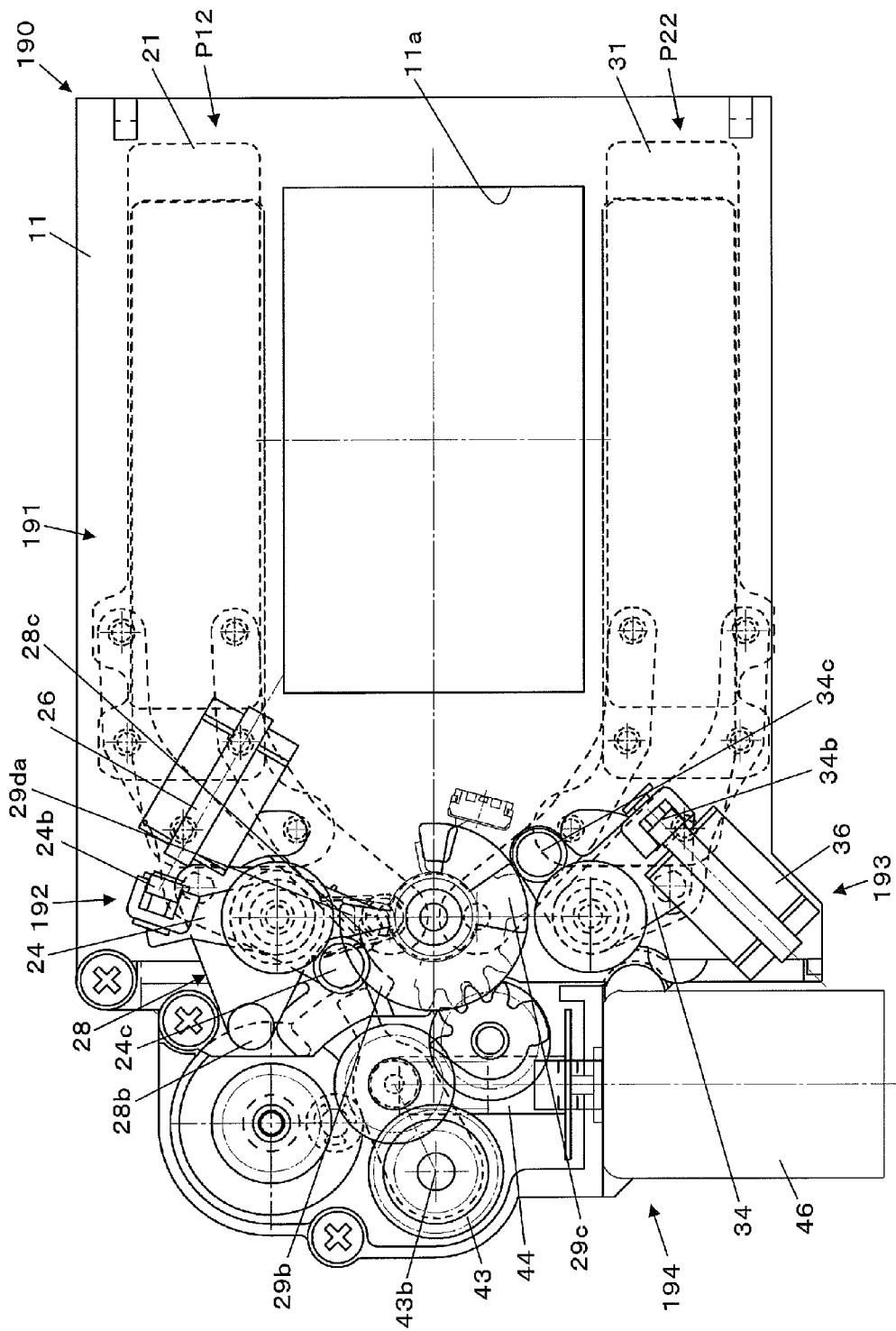
FIG. 12 is a state diagram of the focal plane shutter device 190 in a rear-curtain charge completion state.

In a state shown in FIG. 12, the light from the subject is guided to the CMOS image sensor 110. This state is effective particularly when the user wishes to maintain a state where the CMOS image sensor 110 is exposed. For example, this state is particularly effective when by using a live view function, the subject is observed, framing is performed, or moving picture photography is performed. At this time, by the self lock function of the worm gear 44, the clockwise rotation of the charge lever 29 by the elastic force F22 of the charge-lever return spring 30 is restricted.

It is noted that unlike the state shown in FIG. 8, in the state shown in FIG. 10, the distal end of the claw 28c is not hooked onto the reverse preventive part 29da provided to the front-curtain holding part 29d. That is, only by the self lock function of the worm gear 44, the clockwise rotation of the charge lever 29 is restricted.

4.3: Electronic Front Curtain Photography Standby State

When the release button 131 is operated by the user, the necessary photography information such as photometry is obtained by the camera controller 140. After completing obtaining the photography information, the release operation is started. When the release operation is started, the focal plane shutter device 190 proceeds from the state shown in FIG. 10 to the electronic front curtain photography standby state shown in FIG. 11.

Specifically, when the release button 131 is depressed, as shown in FIG. 21, in order to maintain the charge completion state of the rear curtain 31, power feeding to the rear-curtain electromagnet 36 is started before the motor 46 is driven (steps S25 and S26). As a result, the rear-curtain attracting piece 34b is attracted to the rear-curtain electromagnet 36. Therefore, even when the rear-curtain set lever 34 is permitted to rotate counterclockwise, the rear-curtain set lever 34 is held at the charge position. At this time, the power is not fed to the front-curtain electromagnet 26, and thus, when the front-curtain set lever 24 is permitted to rotate counterclockwise, the front-curtain set lever 24 rotates to the position shown in FIG. 6.

After the power feeding to the rear-curtain electromagnet 36 is started, the motor 46 is driven by a predetermined time by the camera controller 140 (steps S27, S28, and S29). Unlike the above-described slit exposure photography, the motor 46 is reversed. When the motor 46 is reversed, the meshing between the planet gear 41 and the partly tooth-missing gear 40 is released. As a result, the self lock function of the worm gear 44 does not act upon the charge lever 29. Thus, the charge lever 29 rotates clockwise until the charge lever 29 abuts the stopper 11b by the elastic force F22 of the charge-lever return spring 30. At this time, the contacting between the front-curtain holding part 29d of the charge lever 29 and the claw 28c of the front-curtain drive lever 28 is released. At this time, the contacting between the front-curtain set lever roller 24c and the front-curtain set cam 29b is also released, and thus, the front-curtain set lever 24 rotates counterclockwise by the elastic force F11 of the front-curtain running spring 25. The state where the front curtain 21 is retracted from the opening part 11a is kept.

Moreover, when the charge lever 29 rotates clockwise and abuts the stopper 11b, the contacting between the rear-curtain set lever roller 34c and the rear-curtain set cam 29c is released. However, the power feeding to the rear-curtain electromagnet 36 has been started before the contacting between the rear-curtain set lever roller 34c and the rear-curtain set cam 29c is released, and thus, the rear-curtain attracting piece 34b is attracted to the rear-curtain electromagnet 36. Therefore, the charge state of the rear-curtain set lever 34 can be maintained, and the charge completion state of the rear curtain 31 is maintained. On the other hand, in the electronic front curtain photography, the front curtain 21 is not used, and thus, it is not necessary to feed power to the front-curtain electromagnet 26, and as a result, it is possible to expect a power-saving effect.

As described above, from the charge operation to the electronic front curtain photography standby state, the front curtain 21 hardly moves while maintaining the state where the front curtain 21 is retracted from the opening part 11a. This eliminates a need such as the front curtain 21 waits for a drive time and waits for a convergence of bounds at the time of driving the front curtain 21, and as a result, at the approximately same time as feeding the power to the motor 46 and the rear-curtain electromagnet 36, the electronic front curtain photography by the CMOS image sensor 110 can be started. Thereby, it becomes possible to significantly shorten a release time lag.

4.4: Electronic Front Curtain Exposure

Thereafter, by the release command from the camera controller 140, resetting electric charges and accumulating the electric charges are started from pixels on lower lines of the CMOS image sensor 110 (step S30). The electric charges are sequentially reset from lower lines to upper lines. Subsequently, after resetting the electric charges and accumulating the electric charges are started, after a set exposure time elapses, the power feeding to the rear-curtain electromagnet 36 is stopped (steps S31 and S32). The exposure time is set based on the exposure information by the camera controller 140.

When the power feeding to the rear-curtain electromagnet 36 is stopped, the rear-curtain set lever 34 is permitted to rotate counterclockwise, and thus, the rear-curtain set lever 34 rotates counterclockwise by the elastic force F21 of the rear-curtain running spring 35, and the rear curtain 31 runs from the second rear curtain position P22 to the first rear curtain position P21. As a result, the opening part 11a is shielded from the lower portion of the opening part 11a. During a time when the electric charges are reset and the incident light is shielded by the rear curtain 31, the CMOS image sensor 110 is exposed. An exposure operation in which the CMOS image sensor 110 is thus driven in tune with the running of the rear curtain 31 so as to scan the exposure region is called the electronic front curtain photography. When the rear curtain 31 completes running, the current state returns to the state of FIG. 6 again. When the charge operation is performed again, the focal plane shutter device 190 is in a state of FIG. 12, and the process prepares for next photography.

Second Embodiment

Subsequently, a second embodiment will be explained. In the second embodiment, points different from those in the first embodiment will be mainly explained, and the explanations for the common configuration in the first and second embodiments are omitted. Moreover, the same reference numerals are assigned to the configurations having the substantially same functions as those in the first embodiment.

1: Digital Camera

The digital camera 1 according to the second embodiment employs a focal plane shutter device 290, instead of the focal plane shutter device 190, and except for this, the digital camera 1 is basically configured similarly to the first embodiment.

2: Configuration of the Focal Plane Shutter Device

By using FIGS. 23 to 32, the focal plane shutter device 290 according to the second embodiment will be explained.

Figure 23:
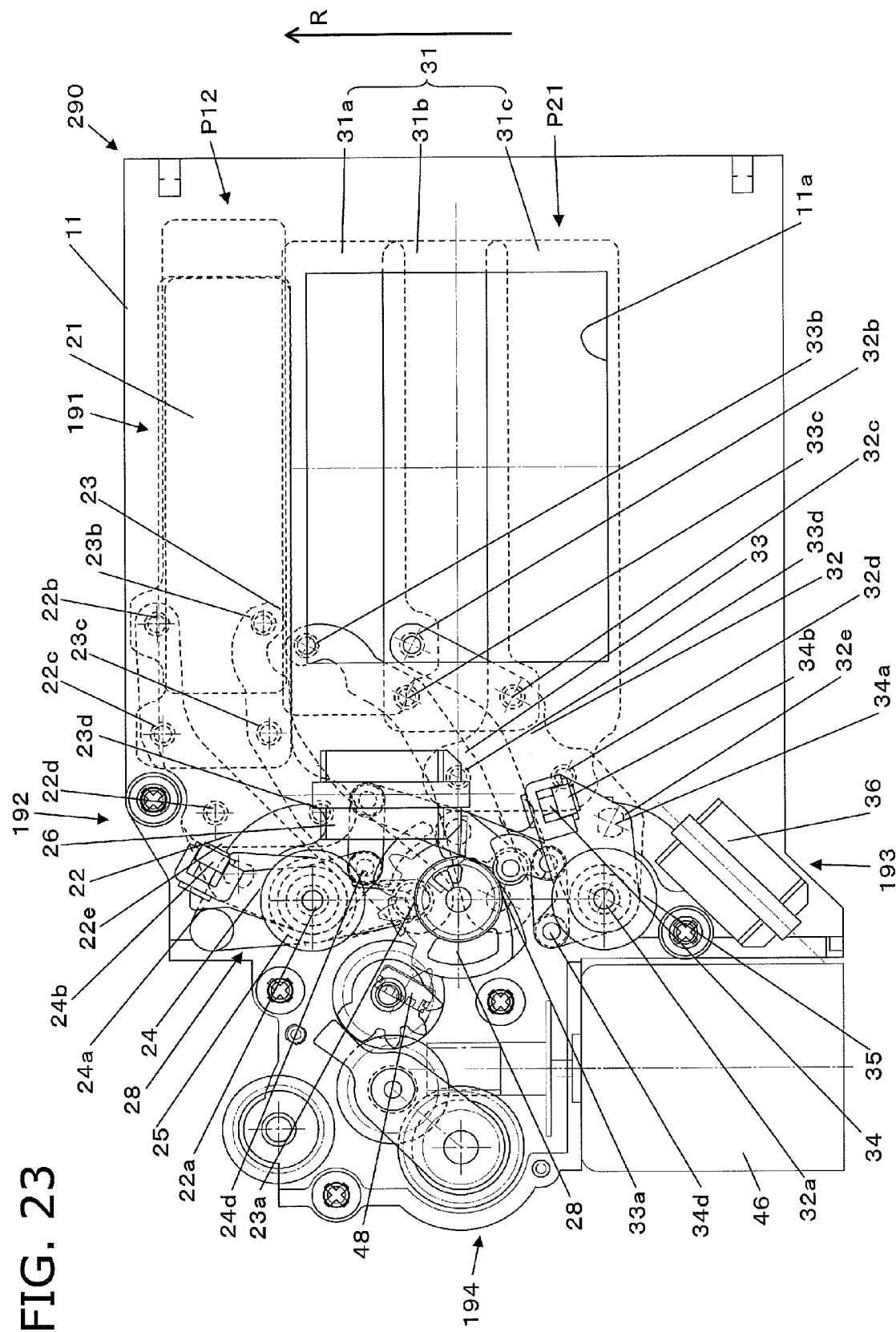
FIG. 23 is a state diagram of a focal plane shutter device 290 in a state where a rear curtain completes running.
Figure 24:
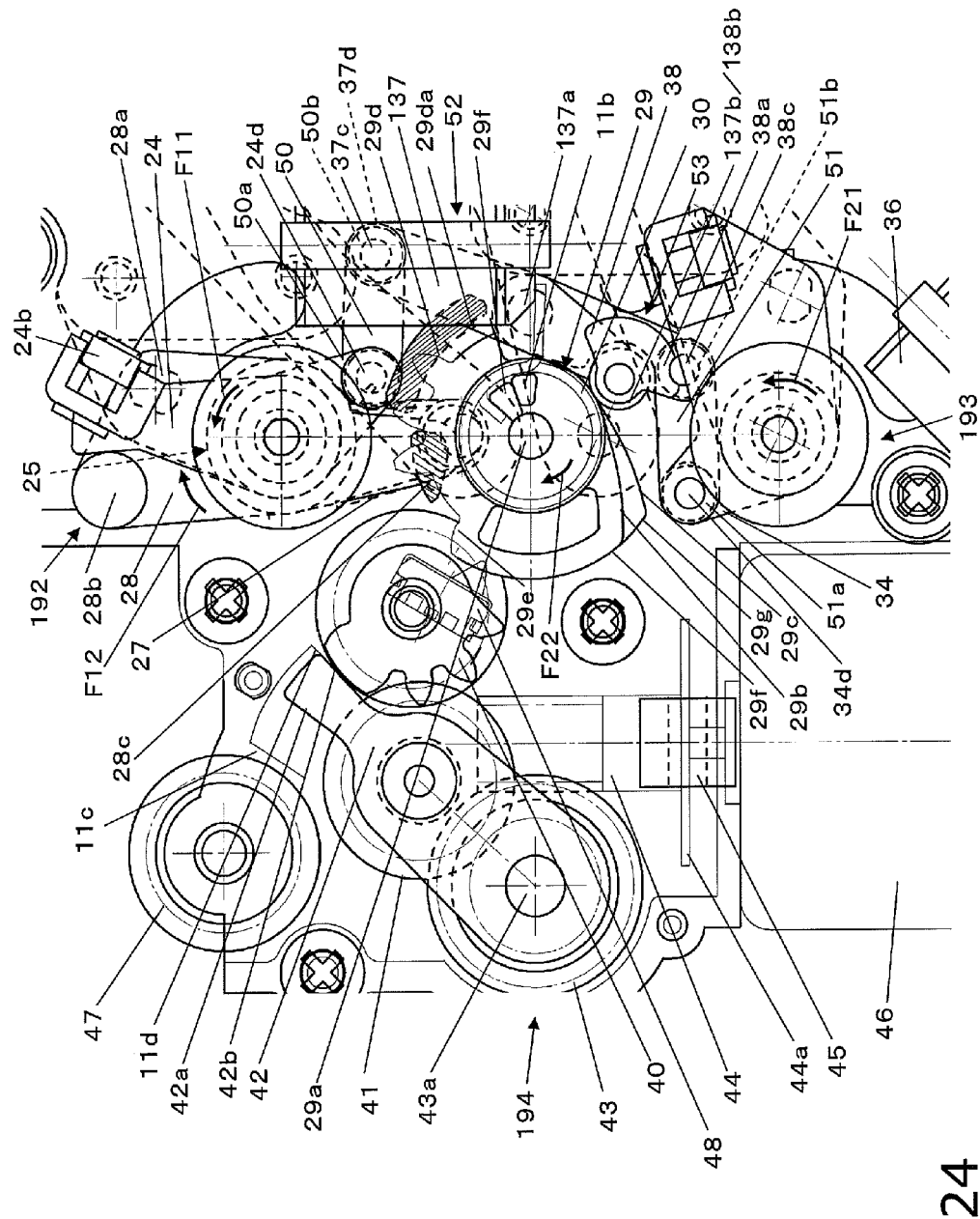
FIG. 24 is a detailed view of main parts in FIG. 23.
Figure 25:
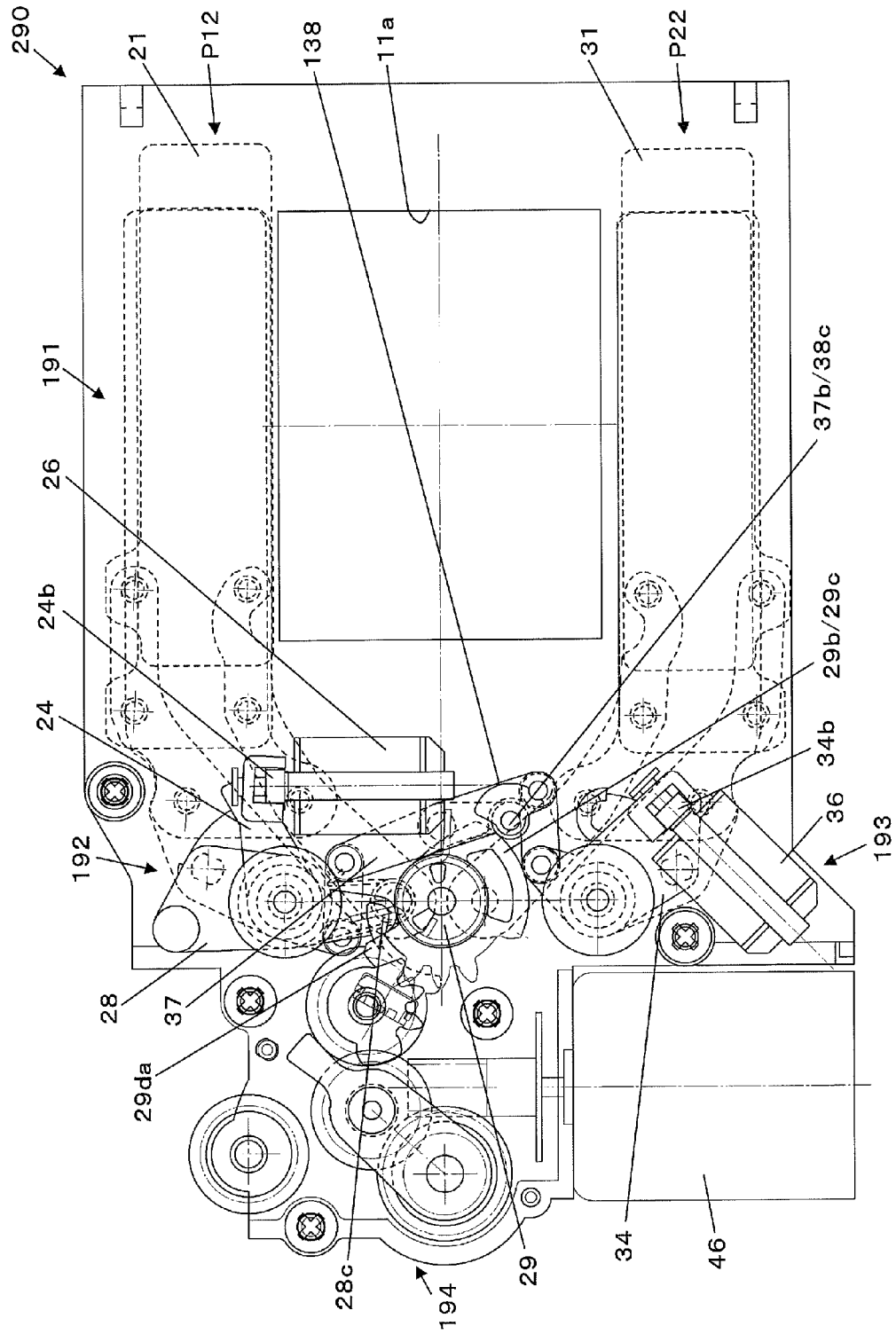
FIG. 25 is a state diagram of the focal plane shutter device 290 in a charge completion state.
Figure 26:
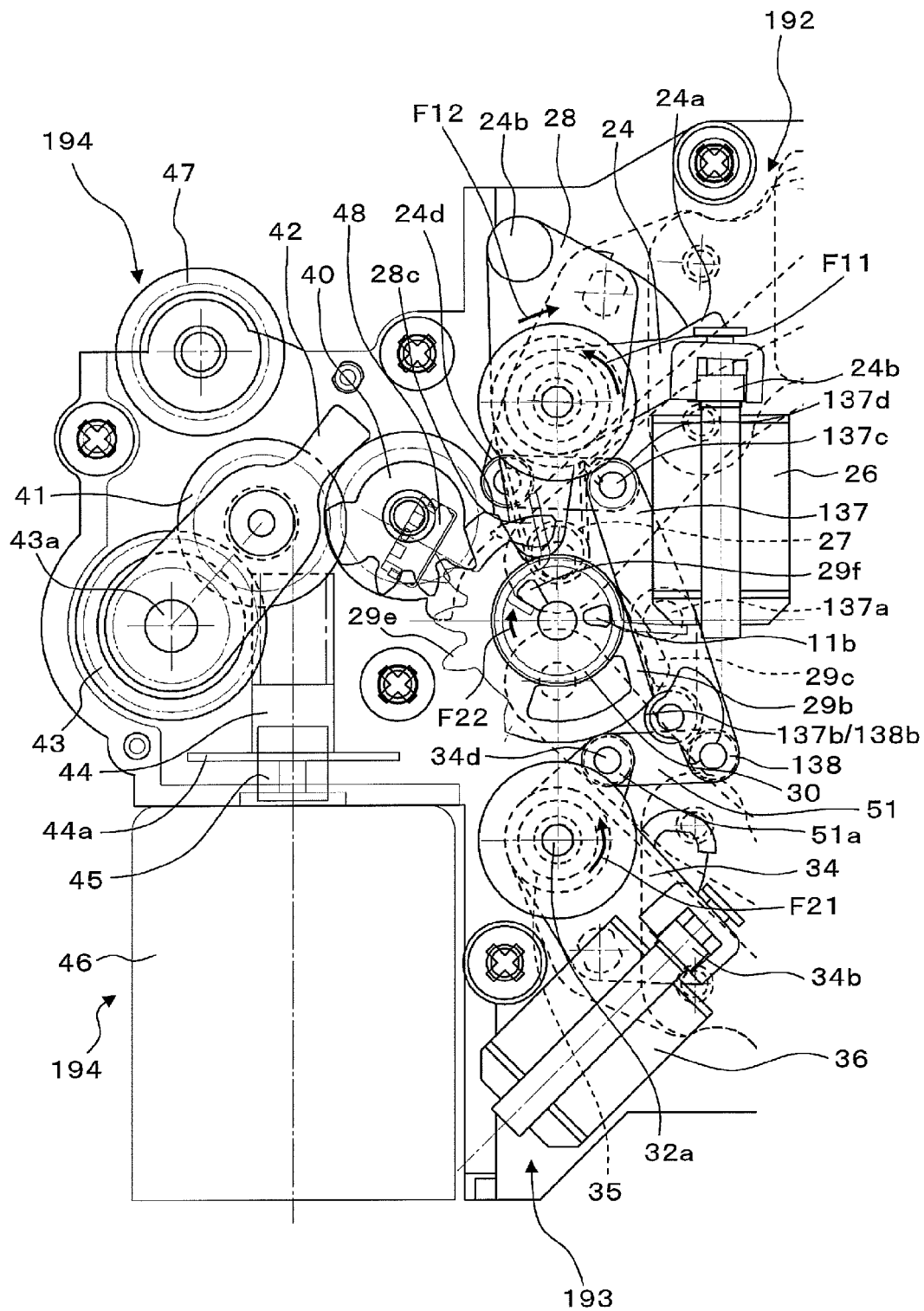
FIG. 26 is a detailed view of main parts in FIG. 25.
Figure 27:
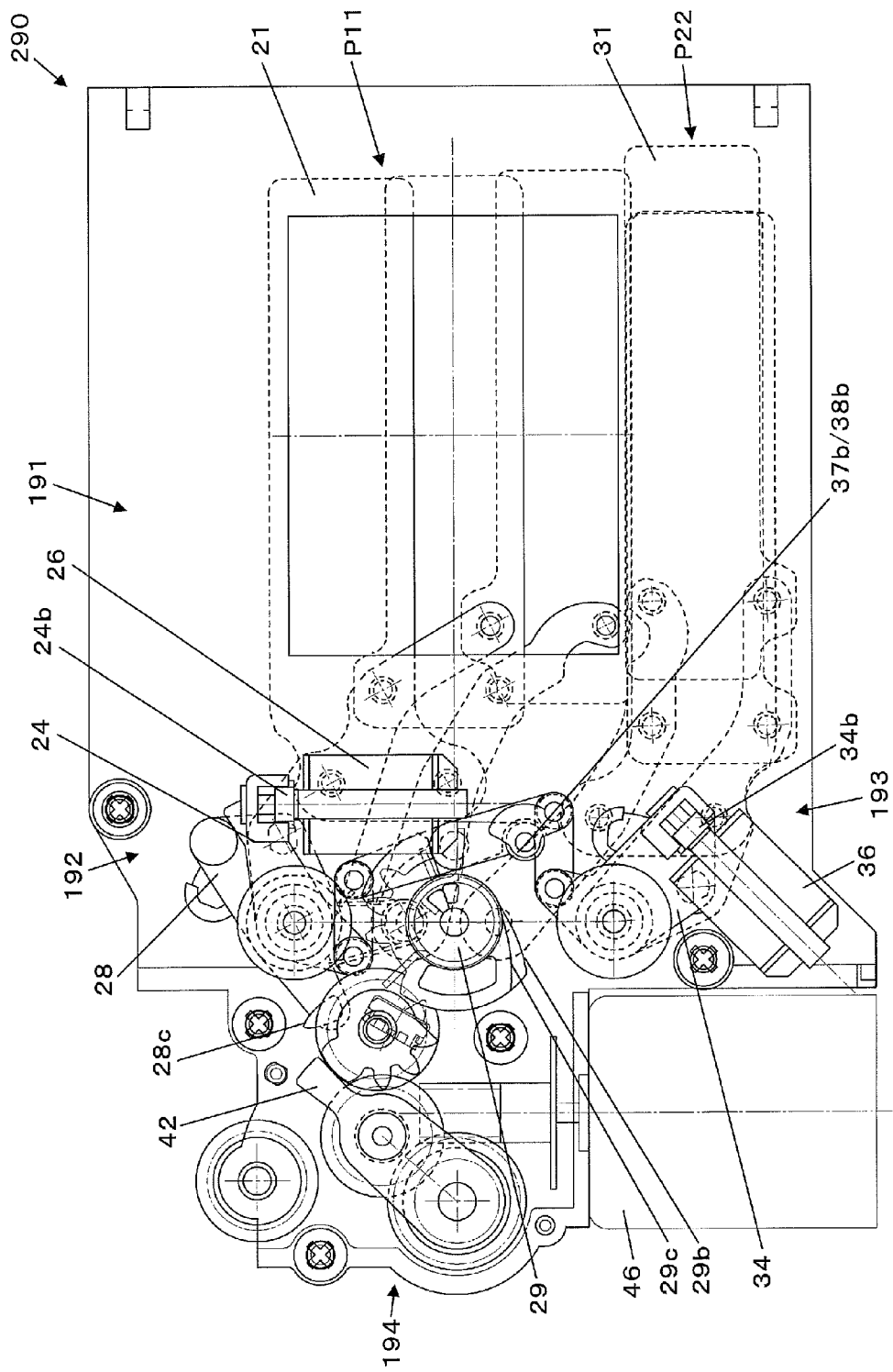
FIG. 27 is a state diagram of the focal plane shutter device 290 in a slit exposure photography standby state.
Figure 28:
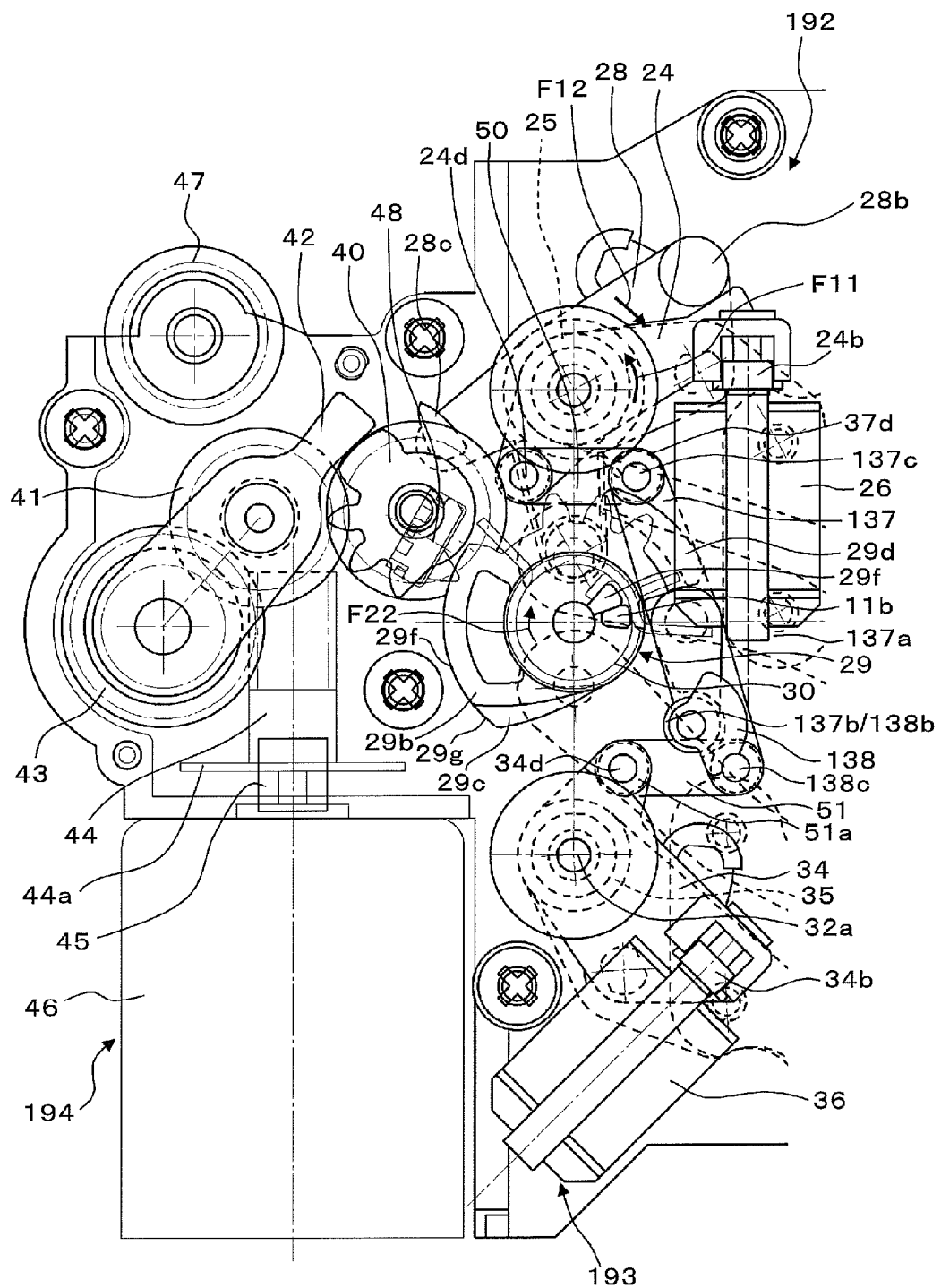
FIG. 28 is a detailed view of main parts in FIG. 27.
Figure 29:
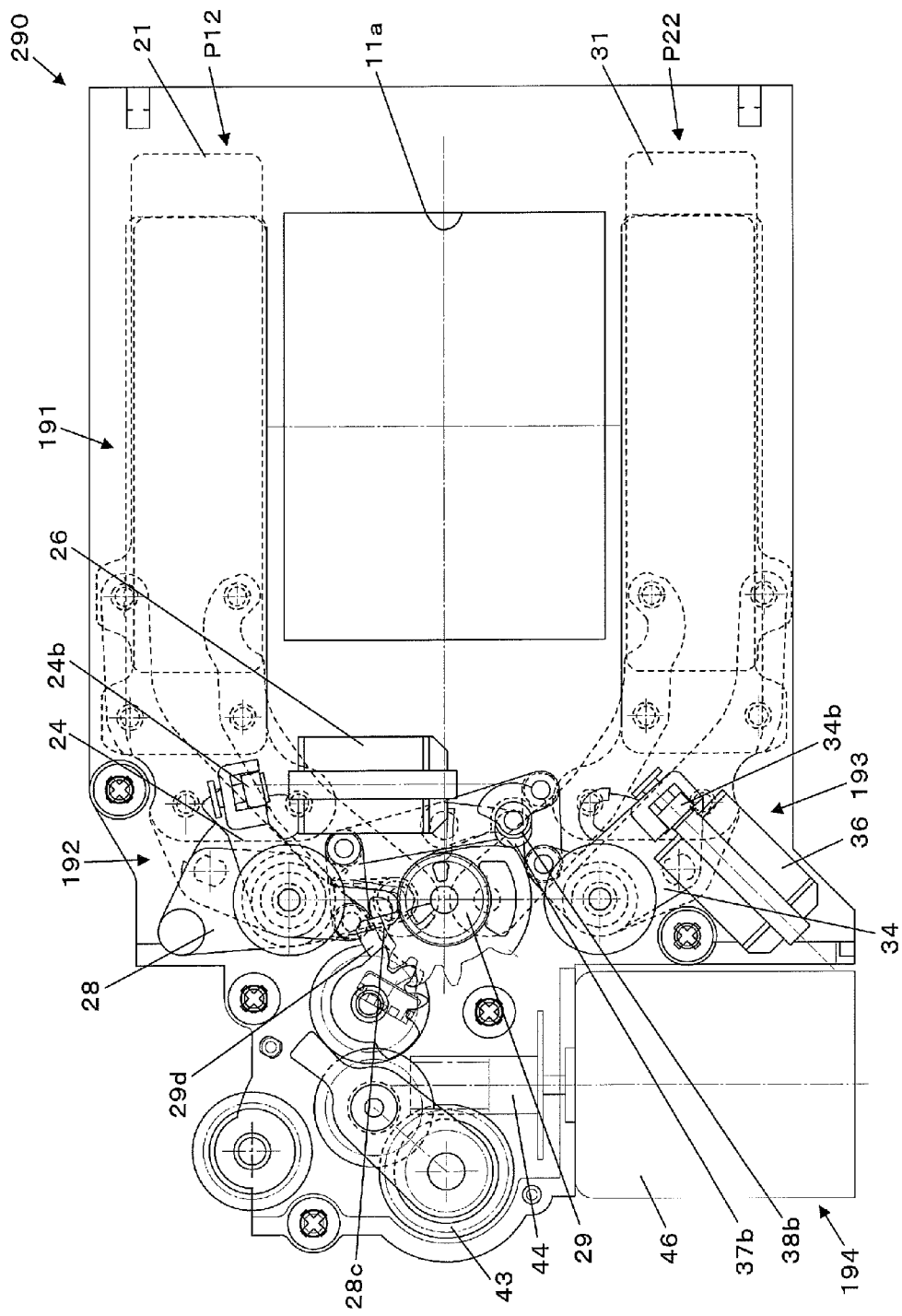
FIG. 29 is a state diagram of the focal plane shutter device 290 in a rear-curtain charge completion state.
Figure 30:
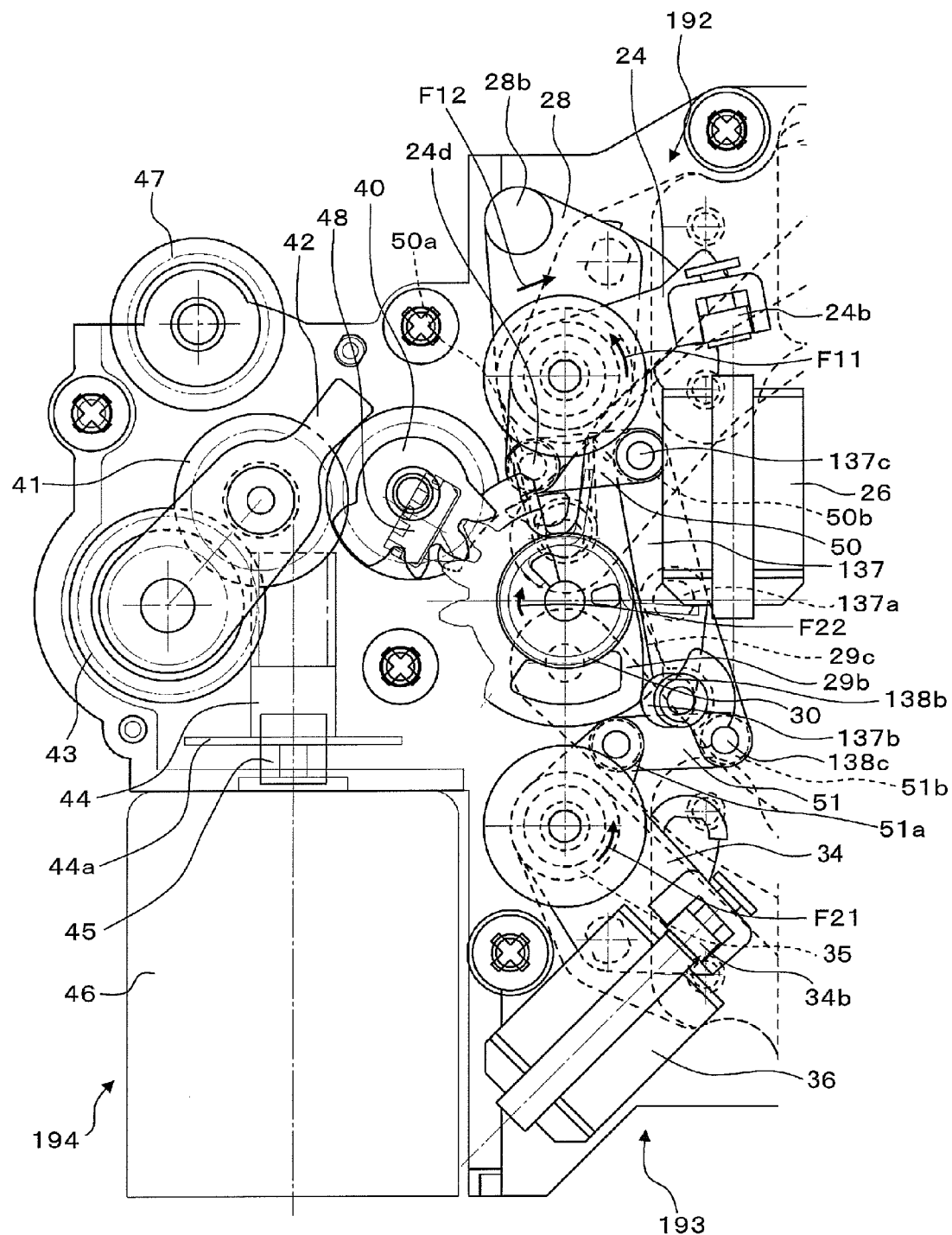
FIG. 30 is a detailed view of main parts in FIG. 29.
Figure 31:
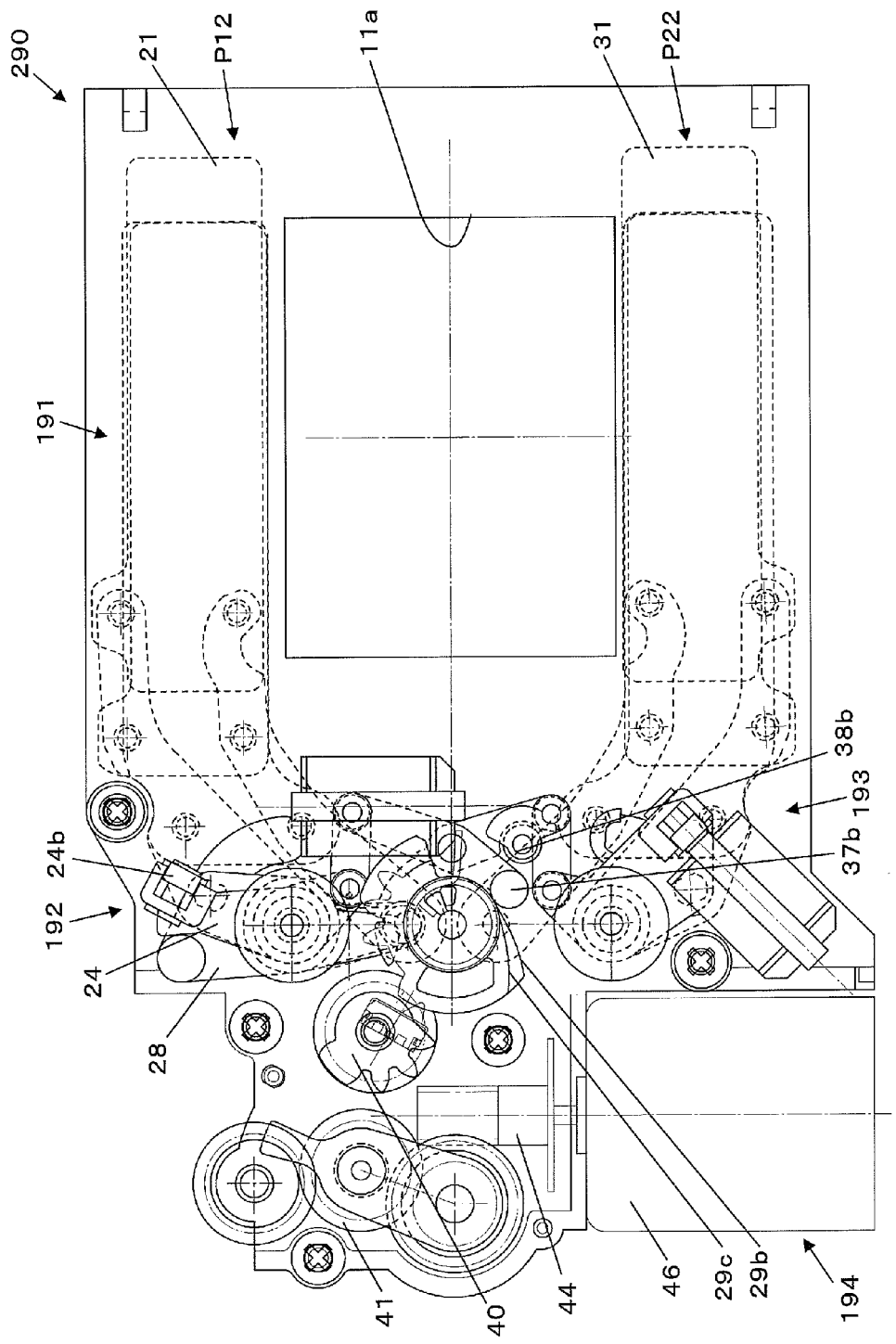
FIG. 31 is a state diagram of the focal plane shutter device 290 in an electronic front curtain photography standby state.
Figure 32:
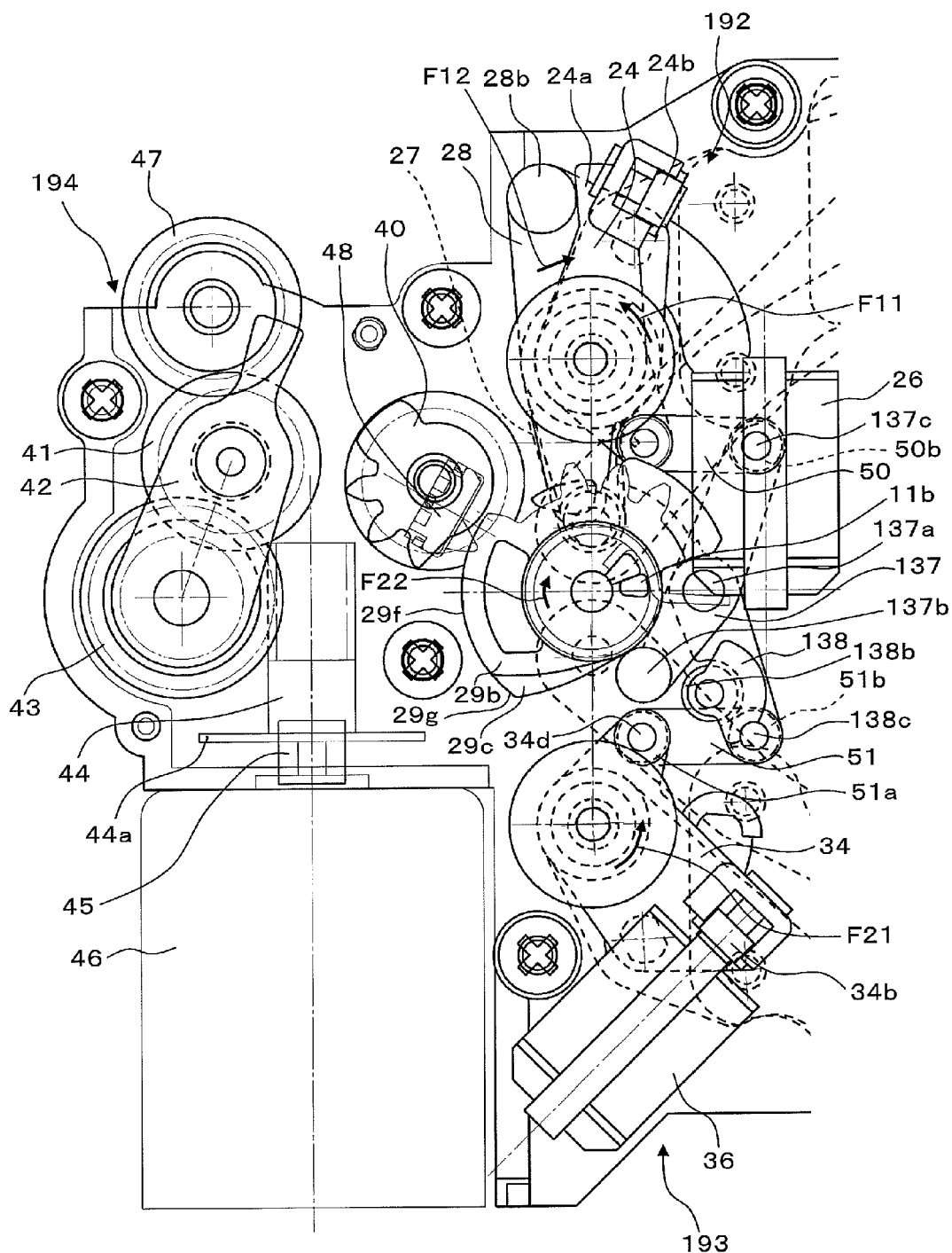
FIG. 32 is a detailed view of main parts in FIG. 31.

FIG. 23 is a state diagram of the focal plane shutter device 290 obtained when the rear curtain 31 completes running. FIG. 24 is a detailed view of main parts of FIG. 23. FIGS. 25 and 26 are state diagrams of the focal plane shutter device 290 in a state where the charge is completed. FIGS. 27 and 28 are state diagrams of the focal plane shutter device 290 in a slit exposure photography standby state. FIGS. 29 and 30 are state diagrams of the focal plane shutter device 290 in the rear-curtain charge completion state. FIGS. 31 and 32 are state diagrams of the focal plane shutter device 290 in the electronic front curtain photography standby state. During the slit exposure photography, the photography standby state is established in the order of FIGS. 23, 25 and 27. During the electronic front curtain photography, the photography standby state is established in the order of FIGS. 23, 29, and 31.

In addition to the configuration of the focal plane shutter device 190, the focal plane shutter device 290 further includes: a front-curtain link lever 137; a front-curtain coupling arm 50; a rear-curtain link lever 138; and a rear-curtain coupling arm 51.

On the other hand, unlike the focal plane shutter device 190, in the focal plane shutter device 290, the front-curtain set lever 24 does not include the front-curtain set lever roller 24*c*, and a first link mechanism 52 is coupled to the front-curtain set lever 24. Specifically, the first link mechanism 52 includes the front-curtain coupling arm 50 and the front-curtain link lever 137.

A first end 50*a* of the front-curtain coupling arm 50 is rotatably coupled to the front-curtain set lever 24 via a shaft 24*d*. The shaft 24*d* is fixed to the first end 50*a* of the front-curtain coupling arm 50 or the front-curtain set lever 24. A second end 50*b* of the front-curtain coupling arm 50 is rotatably coupled to the first end 137*d* of the front-curtain link lever 137 via a shaft 137*c*. The shaft 137*c* is fixed to the second end 50*b* of the front-curtain coupling arm 50 or the first end 137*d* of the front-curtain link lever 137. The front-curtain link lever 137 is rotatably coupled to the shutter base plate 11 via a shaft 137*a*. The shaft 137*a* is fixed to the shutter base plate 11. To the second end of the front-curtain link lever 137, a front-curtain charge lever roller 137*b* that abuts the front-curtain set cam 29*b* of the charge lever 29 is rotatably attached.

Further, in the focal plane shutter device 290, the rear-curtain set lever 34 does not include the rear-curtain set lever roller 34*c*, and a second link mechanism 53 is coupled to the rear-curtain set lever 34. Specifically, the second link mechanism 53 includes the rear-curtain coupling arm 51 and the rear-curtain link lever 138.

A first end 51*a* of the rear-curtain coupling arm 51 is rotatably coupled to the rear-curtain set lever 34 via a shaft 34*d*. The shaft 34*d* is fixed to the first end 51*a* of the rear-curtain coupling arm 51 or the rear-curtain set lever 34. A second end 51*b* of the rear-curtain coupling arm 51 is rotatably coupled to a first end 138*a* of the rear-curtain link lever 138 via a shaft 138*c*. The shaft 138*c* is fixed to the second end 51*b* of the rear-curtain coupling arm 51 or the first end 138*a* of the rear-curtain link lever 138. To a second end of the rear-curtain link lever 138, a rear-curtain charge lever roller 138*b* that abuts the rear-curtain set cam 29*c* of the charge lever 29 is rotatably attached.

The front-curtain charge lever roller 137*b* and the rear-curtain charge lever roller 138*b* are disposed in line in a direction vertical to the paper of FIG. 14, and thus, in FIG. 14, it looks as if the front-curtain charge lever roller 137*b* and the rear-curtain charge lever roller 138*b* were disposed at the substantially same location.

At this time, the front-curtain set cam 29*b* and the rear-curtain set cam 29*c* of the charge lever 29 are disposed to be deviated in a rotation direction around a rotating shaft 29*a* of the charge lever 29. Thereby, similarly to the first embodiment, the timing at which the rear curtain 31 completes charging is earlier than the timing at which the front curtain 21 completes charging. When the charge lever 29 rotates counterclockwise, the rear curtain 31 completes charging, and after that, the front curtain 21 completes charging.

Specifically, when the charge lever 29 rotates counterclockwise, the rear-curtain set cam 29*c* gradually presses the rear-curtain charge lever roller 138*b*. As a result, the rear-curtain set lever 34 rotates clockwise. When the rear-curtain charge lever roller 138*b* reaches the outer peripheral face 29*g* of the rear-curtain set cam 29*c*, the rear-curtain attracting piece 34*b* is pushed against the rear-curtain electromagnet 36.

Likewise, when the charge lever 29 rotates counterclockwise, the front-curtain set cam 29*b* gradually presses the front-curtain charge lever roller 137*b*. As a result, the front-curtain set lever 24 rotates clockwise. When the front-curtain charge lever roller 137*b* reaches the outer peripheral face 29*f* of the front-curtain set cam 29*b*, the front-curtain attracting piece 24*b* is pushed against the front-curtain electromagnet 26.

In this way, shapes of the front-curtain set cam 29*b* and the rear-curtain set cam 29*c* are formed so that the contact between the rear-curtain attracting piece 34*b* and the rear-curtain electromagnet 36 is performed before the contact between the front-curtain attracting piece 24*b* and the front-curtain electromagnet 26. Therefore, in the second embodiment, similarly to the first embodiment, the timing at which the charge mechanism 194 completes charging the rear-curtain running spring 35 is earlier than the timing at which the charge mechanism 194 completes charging the front-curtain running spring 25.

Moreover, the front-curtain set cam 29*b* and the rear-curtain set cam 29*c* of the focal plane shutter device 190 in the first embodiment are cams extending in a radial direction of the charge lever 29 from the rotating shaft 29*a* of the charge lever 29.

However, the front-curtain set cam 29*b* and the rear-curtain set cam 29*c* of the focal plane shutter device 290 in the second embodiment are spiral cams of which the diameter becomes larger according to the rotation amount of the charge lever 29. When the spiral cam is used, a wedge effect occurs in the front-curtain link lever 137 and the rear-curtain link lever 138, and a strong rotation force can be generated in the front-curtain set lever 24 and the rear-curtain set lever 34.

The rotation force generated by the front-curtain set cam 29*b* and the rear-curtain set cam 29*c* can be increased by adjusting a ratio of a distance between the shaft 137*a* and the front-curtain charge lever roller 137*b* to a distance between the shaft 137*a* and the shaft 137*c*. Moreover, the rotation force generated by the front-curtain set cam 29*b* and the rear-curtain set cam 29*c* can be increased according to a ratio of a distance between the shaft 137*a* and the rear-curtain charge lever roller 138*b* to a distance between the shaft 137*a* and the shaft 138*c*. Therefore, in the focal plane shutter device 290, the charge operation with lower load and higher-speed can be implemented as compared to the focal plane shutter device 190.

Note that a series of operations and the controls for each of the slit exposure photography and the electronic front curtain photography are the same as those in the first embodiment, and thus, the detail explanation is omitted.

Other Embodiments

The present invention is not limited to the above-described embodiments, and can be corrected and modified in various ways without departing from the gist of the present invention.

(1) The above-described embodiments show the interchangeable-lens-type digital camera in which the camera body 100 and the lens unit 200 can be separated; however, even with a digital camera in which a lens unit is fixed to a camera body and the exposure is controlled by the focal plane shutter device, the similar effect can be demonstrated.

(2) In the above-described embodiments, the timing at which the charge mechanism 194 completes charging the rear-curtain running spring 35 is earlier than the timing at which the charge mechanism 194 completes charging the front-curtain running spring 25. However, the timing at which the charge mechanism 194 completes charging the rear-curtain running spring 35 may be different from the timing at which the charge mechanism 194 completes charging the front-curtain running spring 25. For example, the timing at which the charge mechanism 194 completes charging the front-curtain running spring 25 is earlier than the timing at which the charge mechanism 194 completes charging the rear-curtain running spring 35.

(3) In the above-described embodiments, the timing at which the charge mechanism 194 starts charging the front-curtain running spring 25 is earlier than the timing at which the charge mechanism 194 starts charging the rear-curtain running spring 35. However, the timing at which the charge mechanism 194 starts charging the front-curtain running spring 25 can be the same as the timing at which the charge mechanism 194 starts charging the rear-curtain running spring 35, and the timing at which the charge mechanism 194 starts charging the rear-curtain running spring 35 can be earlier than the timing at which the charge mechanism 194 starts charging the front-curtain running spring 25.

(4) Although the charge lever 29 is explained as an example of the charge member in the above-described embodiments, the charge member is not limited to the charge lever 29. The charge member can have other shapes, if the timing of the charge of the front-curtain is different from the timing of the charge of the rear-curtain.

(5) Although a rock mechanism for holding the front curtain 21 at the second front curtain position P12 is made up of the front-curtain holding part 29*d* and the claw 28*c* in the above-described embodiments, the front curtain 21 can be held at the second front curtain position P12 using members other than the charge lever 29.

(6) Although the charge lever 29 is restricted to return to the original position by the reverse preventive part 29*da* and the claw 28*c*, the charge lever 29 does not need to have the reverse preventive part 29*da*.

Features of the Embodiments

The features in the above-described embodiments are listed below. It is noted that the invention included in the above-described embodiments is not limited to below. Moreover, the components in parentheses after the respective configurations are specific examples of each configuration in order to facilitate the understanding of the characteristics. Each configuration should not be limited to these specific examples. Further, in order to obtain the effects described regarding each characteristic, the configuration other than the listed characteristics may be modified or deleted.

(1) A focal plane shutter device according to a first aspect comprises:

a shutter base plate (11) including an opening part (11*a*);

a front curtain (21) movably disposed between a first front curtain position (P11) at which the front curtain (21) covers the opening part (11*a*) and a second front curtain position (P12) at which the front curtain (21) is retracted from the opening part (11*a*);

a first elastic member (front-curtain running spring 25) for imparting the front curtain (21) with an elastic force so that the front curtain (21) moves from the first front curtain position (P11) to the second front curtain position (P12);

a rear curtain (31) movably disposed between a first rear curtain position (P21) at which the rear curtain (31) covers the opening part (11*a*) and a second rear curtain position (P22) at which the rear curtain (31) is retracted from the opening part (11*a*);

a second elastic member (rear-curtain running spring 35) for imparting the rear curtain (31) with an elastic force so that the rear curtain (31) moves from the second rear curtain position (P22) to the first rear curtain position (P21); and a charge mechanism (194) arranged to impart the first elastic member (front-curtain running spring 25) and the second elastic member (rear-curtain running spring 35) with a first biasing force resisting the elastic force of the first elastic member (front-curtain running spring 25) and a second biasing force resisting the elastic force of the second elastic member (rear-curtain running spring 35), wherein a timing at which the charge mechanism (194) completes imparting the first elastic member (front-curtain running spring 25) with the first biasing force is different from a timing at which the charge mechanism (194) completes imparting the second elastic member (rear-curtain running spring 35) with the second biasing force.

At the time of completion or about the time of completion of imparting the first elastic member (front-curtain running spring 25) with the first biasing force, a force required for imparting the first biasing force is at the maximum. Moreover, at the time of completion or about the time of completion of imparting the second elastic member (rear-curtain running spring 35) with the second biasing force, a force required for imparting the biasing force is at the maximum.

However, in the focal plane shutter device, the timing at which the charge mechanism (194) completes imparting the first elastic member (front-curtain running spring 25) with the first biasing force is different from the timing at which the charge mechanism (194) completes imparting the second elastic member (rear-curtain running spring 35) with the second biasing force. Thus, it is possible to reduce maximum values of a total of the first biasing force and the second biasing force. This can decrease a load of the charge mechanism (194).

Moreover, in the focal plane shutter device, it is possible to perform a slit exposure photography by the front curtain (21) and the rear curtain (31).

Therefore, with the focal plane shutter device, it is possible to perform the slit exposure photography using the front curtain (21) and the rear curtain (31), and moreover, it is possible to decrease a load of a drive source at the time of charging the front curtain (21) and the rear curtain (31).

(2) A focal plane shutter device according to a second aspect is the focal plane shutter device according to the first aspect, wherein the timing at which the charge mechanism (194) completes imparting the second elastic member (rear-curtain running spring 35) with the second biasing force is earlier than the timing at which the charge mechanism (194) completes imparting the first elastic member (front-curtain running spring 25) with the first biasing force.

With this focal plane shutter device, since the charge completion of the rear curtain (31) can be earlier, it is possible to speed up the electric front curtain photography.

(3) A focal plane shutter device according to a third aspect is the focal plane shutter device according to the first or second aspect, wherein the charge mechanism (194) holds the front curtain (21) at the second front curtain position (P12) while imparting the first elastic member (front-curtain running spring 25) with the first biasing force.

With this focal plane shutter device, the charge of the front curtain (21) can be performed in a state where the front curtain (21) is disposed at second front curtain position (P12). Therefore, the charge of the front curtain (21) can be performed while maintaining the live view state, and this allows a time lag of photography to be shorten.

(4) A focal plane shutter device according to a fourth aspect is the focal plane shutter device according to any one of the first to third aspects, wherein the charge mechanism (194) includes an actuator (motor 46) generating the first biasing force and the second biasing force; and a charge member (charge lever 29) arranged to transmit the first biasing force to the first elastic member (front-curtain running spring 25) and arranged to transmit the second biasing force to the second elastic member (rear-curtain running spring 35).

(5) A focal plane shutter device according to a fifth aspect is the focal plane shutter device according to the fourth aspect, wherein the actuator (motor 46) is capable of driving the charge member (charge lever 29) to a first charge completion position at which imparting the first elastic member (front-curtain running spring 25) with the first biasing force is completed, and to a second charge completion position which is different from the first charge completion position and at which imparting the second elastic member (rear-curtain running spring 35) with the second biasing force is completed.

(6) A focal plane shutter device according to a sixth aspect is the focal plane shutter device according to the fifth aspect, wherein the actuator (motor 46) is capable of driving the charge member (charge lever 29) to a first charge start position at which imparting the first elastic member (front-curtain running spring 25) with first biasing force is started, and to a second charge start position which is the same as or different from the first charge start position and at which imparting the second elastic member (rear-curtain running spring 35) with the second biasing force is started, and the second charge completion position is disposed between the second charge start position and the first charge completion position.

(7) A focal plane shutter device according to a seventh aspect is the focal plane shutter device according to the fifth or sixth aspect, further comprising:

a front-curtain drive member (front-curtain drive lever 28) for coupling the front curtain (21) to the shutter base plate (11) to be movable between the first front curtain position (P11) and the second front curtain position (P12); and a front-curtain set member (front-curtain set lever 24) arranged to transmit the elastic force of the first elastic member (front-curtain running spring 25) to the front-curtain drive member (front-curtain drive lever 28), wherein the charge member (charge lever 29) transmits the first biasing force to the first elastic member (front-curtain running spring 25) via the front-curtain set member (front-curtain set lever 24).

(8) A focal plane shutter device according to an eighth aspect is the focal plane shutter device according to the seventh aspect, wherein the charge member (charge lever 29) includes a front-curtain cam part (front-curtain set cam 29b) arranged to be contactable with the front-curtain set member (front-curtain set lever 24), and when the charge member (charge lever 29) is at the first charge completion position, the front-curtain cam part (front-curtain set cam 29b) is in contact with the front-curtain set member (front-curtain set lever 24).

(9) A focal plane shutter device according to a ninth aspect is the focal plane shutter device according to the eighth aspect, further comprising:

a rear-curtain drive member coupling the rear curtain (31) to the shutter base plate (11) to be movable between the first rear curtain position (P21) and the second rear curtain position (P22), and capable of transmitting the elastic force of the second elastic member (rear-curtain running spring 35) to the rear curtain (31), wherein the charge member (charge lever 29) transmits the second biasing force to the second elastic member (rear-curtain running spring 35) via the rear-curtain set member (rear-curtain set lever 34).

(10) A focal plane shutter device according to a tenth aspect is the focal plane shutter device according to the ninth aspect, wherein the charge member (charge lever 29) includes a rear-curtain cam part (rear-curtain set cam 29c) arranged to be contactable with the rear-curtain set member (rear-curtain set lever 34), and when the charge member (charge lever 29) is at the second charge completion position, the rear-curtain cam part (rear-curtain set cam 29c) is in contact with the rear-curtain set member (rear-curtain set lever 34).

(11) A focal plane shutter device according to an eleventh aspect is the focal plane shutter device according to the tenth aspect, wherein when the charge member (charge lever 29) is at the second charge start position, a gap is secured between the front-curtain cam part (front-curtain set cam 29b) and the front-curtain set member (front-curtain set lever 24).

(12) A focal plane shutter device according to a twelfth aspect is the focal plane shutter device according to any one of the seventh to eleventh aspects, further comprising a third elastic member (front-curtain set spring 27) for imparting the front-curtain drive member (front-curtain drive lever 28) with an elastic force smaller than the elastic force of the first elastic member (front-curtain running spring 25) so that the front curtain (21) moves from the second front curtain position (P12) to the first front curtain position (P11), wherein the charge member (charge lever 29) is capable of holding the front curtain (21) at the second front curtain position (P12) via the front-curtain drive member (front-curtain drive lever 28).

(13) A focal plane shutter device according to a thirteenth aspect is the focal plane shutter device according to the twelfth aspect, wherein when the charge member (charge lever 29) is at the first charge completion position, the charge member (charge lever 29) holds the front curtain (21) at the second front curtain position (P12) via the front-curtain drive member (front-curtain drive lever 28).

(14) A focal plane shutter device according to a fourteenth aspect is the focal plane shutter device according to the thirteenth aspect, wherein the actuator (motor 46) is capable of driving the charge member (charge lever 29) to a release position on the opposite side of the first charge start position relative to the first charge completion position, and when the charge member (charge lever 29) is at the release position, the charge member (charge lever 29) cancels the holding of the front curtain (21) at the second front curtain position (P12).

(15) A focal plane shutter device according to a fifteenth aspect is the focal plane shutter device according to the fourteenth aspect, wherein the charge member (charge lever 29) includes a front-curtain holding part (29d) for holding the front curtain (21) at the second front curtain position (P12) via the front-curtain drive member (front-curtain drive lever 28), the front-curtain drive member (front-curtain drive lever 28) includes a contacting portion (claw 28c) provided in a manner to abut the front-curtain holding part (29d), when the charge member (charge lever 29) is at the first charge completion position, the front-curtain holding part (29d) enters into a moving region (28d) where the contacting portion moves when the front curtain (21) moves from the second front curtain position (P12) to the first front curtain position (P11), and when the charge member (charge lever 29) is at the release position, the front-curtain holding part (29d) is retracted from the moving region (28d) of the contacting portion.

(16) A focal plane shutter device according to a sixteenth aspect is the focal plane shutter device according to any one of the seventh to fifteenth aspects, further comprising a return elastic member (charge lever return spring 30) for imparting the charge member (charge lever 29) with an elastic force so that the charge member (charge lever 29) returns to an original position obtained before imparting the first biasing force and the second biasing force is started, wherein the actuator (motor 46) is capable of driving the charge member (charge lever 29) to a restriction position, and when the charge member (charge lever 29) is at the restriction position, the front-curtain drive member (front-curtain drive lever 28) restricts the returning of the charge member (charge lever 29) to the original position.

(17) A focal plane shutter device according to a seventeenth aspect is the focal plane shutter device according to any one of the first to sixth aspects, further comprising:

a front-curtain drive member (front-curtain drive lever 28) for coupling the front curtain (21) to the shutter base plate (11) to be movable between the first front curtain position (P11) and the second front curtain position (P12); and a front-curtain set member (front-curtain set lever 24) arrange to transmit the elastic force of the first elastic member (front-curtain running spring 25) to the front-curtain drive member (front-curtain drive lever 28), wherein at the time of imparting the first elastic member (front-curtain running spring 25) with the first biasing force, the charge mechanism (194) imparts the first elastic member (front-curtain running spring 25) with the first biasing force via the front-curtain set member (front-curtain set lever 24).

(18) A focal plane shutter device according to an eighteenth aspect is the focal plane shutter device according to the seventeenth aspect, wherein when the front curtain (21) moves from the first front curtain position (P11) to the second front curtain position (P12), the front-curtain set member (front-curtain set lever 24) transmits the elastic force of the first elastic member (front-curtain running spring 25) to the front curtain (21) via the front-curtain drive member (front-curtain drive lever 28), and when the charge mechanism (194) imparts the first elastic member (front-curtain running spring 25) with the first biasing force, the front-curtain set member (front-curtain set lever 24) imparts the first elastic member (front-curtain running spring 25) with the first biasing force without intervention of the front-curtain drive member (front-curtain drive lever 28).

(19) A focal plane shutter device according to a nineteenth aspect is the focal plane shutter device according to any one of the first to eighteenth aspects, wherein a timing at which the charge mechanism (194) starts imparting the second elastic member (rear-curtain running spring 35) with the second biasing force is earlier than a timing at which the charge mechanism (194) starts imparting the first elastic member (front-curtain running spring 25) with the first biasing force.

(20) An imaging device according to a twentieth aspect comprises:

the focal plane shutter device according to any one of the fifth to sixteenth aspects;

an imaging element (CMOS image sensor 110) for converting an optical image of a subject into an image signal; and a controller (camera controller 140) for controlling the imaging element (CMOS image sensor 110) and the focal plane shutter device, wherein the imaging element (CMOS image sensor 110) includes an electronic front curtain photography function for sequentially resetting a pixel in a running direction (R) of the front curtain (21), and the controller (camera controller 140) establishes an electronic front curtain photography standby state at a time point when the charge mechanism (194) for controlling the actuator (motor 46) at the time of photographing by using the electronic front curtain photography function so that the charge member (charge lever 29) stops at the second charge completion position completes imparting the second elastic member (rear-curtain running spring 35) with the second biasing force and when the charge mechanism (194) does not complete imparting the first elastic member (front-curtain running spring 25) with the first biasing force.

(21) A focal plane shutter device according to a twenty-first aspect comprises:

a shutter base plate (11) including an opening part (11a);

a front curtain (21) disposed to be movable between a first front curtain position (P11) covering the opening part (11a) and a second front curtain position (P12) retracted from the opening part (11a);

a first elastic member (front-curtain running spring 25) for imparting the front curtain (21) with an elastic force so that the front curtain (21) moves from the first front curtain position (P11) to the second front curtain position (P12);

a rear curtain (31) disposed to be movable between the first rear curtain position (P21) covering the opening part (11a) and the second rear curtain position (P22) retracted from the opening part (11a);

a second elastic member (rear-curtain running spring 35) for imparting the rear curtain (31) with an elastic force so that the rear curtain (31) moves from the second rear curtain position (P22) to the first rear curtain position (P21);

an actuator (motor 46) for generating a first biasing force resisting the elastic force of the first elastic member (front-curtain running spring 25) and a second biasing force resisting the elastic force of the second elastic member (rear-curtain running spring 35); and a charge member (charge lever 29) arranged to transmit the first biasing force to the first elastic member (front-curtain running spring 25) and arranged to transmit the second biasing force to the second elastic member (rear-curtain running spring 35), wherein the charge member (charge lever 29) holds the front curtain (21) at the second front curtain position (P12) while imparting the first elastic member (front-curtain running spring 25) with the first biasing force.

In this focal plane shutter device, the front curtain (21) is held at the second front curtain position (P12) by the charge member (charge lever 29) while imparting the first elastic member (front-curtain running spring 25) with the first biasing force, and thus, an open state of the opening part (11a) is maintained at the time of charging the front curtain (21) and the rear curtain (31).

Moreover, in the focal plane shutter device, it is possible to perform a slit exposure photography by the front curtain (21) and the rear curtain (31).

Therefore, in the focal plane shutter device, it is possible to perform the slit exposure photography using the front curtain (21) and the rear curtain (31), and moreover, it is possible to maintain the open state of the opening part (11a) at the time of charging the front curtain (21) and the rear curtain (31).

(22) A focal plane shutter device according to a twenty-second aspect is the focal plane shutter device according to the twenty-first aspect, wherein the charge member (charge lever 29) holds the front curtain (21) at the second front curtain position (P12) after imparting the first elastic member (front-curtain running spring 25) with the first biasing force is completed.

(23) A focal plane shutter device according to a twenty-third aspect is the focal plane shutter device according to the twenty-first or twenty-second aspect, comprising:

a front-curtain drive member (front-curtain drive lever 28) for coupling the front curtain (21) to the shutter base plate (11) to be movable between the first front curtain position (P11) and the second front curtain position (P12); and a front-curtain set member (front-curtain set lever 24) arranged to transmit the elastic force of the first elastic member (front-curtain running spring 25) to the front-curtain drive member (front-curtain drive lever 28), wherein the charge member (charge lever 29) transmits the first biasing force to the first elastic member (front-curtain running spring 25) via the front-curtain set member (front-curtain set lever 24).

(24) A focal plane shutter device according to a twenty-fourth aspect is the focal plane shutter device according to the twenty-third aspect, further comprising a third elastic member (front-curtain set spring 27) for imparting the front-curtain drive member (front-curtain drive lever 28) with an elastic force smaller than the elastic force of the first elastic member (front-curtain running spring 25) so that the front curtain (21) moves from the second front curtain position (P12) to the first front curtain position (P11), wherein the charge member (charge lever 29) is capable of holding the front curtain (21) at the second front curtain position (P12) via the front-curtain drive member (front-curtain drive lever 28).

GENERAL INTERPRETATION OF TERMS

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of an imaging device equipped with the focal plane shatter device. Accordingly, these terms, as utilized to describe the present invention should be interpreted relative to an imaging device equipped with the focal plane shatter device.

The term "configured" as used herein to describe a component, section, or part of a device implies the existence of other unclaimed or unmentioned components, sections, members or parts of the device to carry out a desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A focal plane shutter device comprising:
    a shutter base plate defining an opening;
    a front curtain configured to move between a first front curtain position in which the front curtain covers the opening and a second front curtain position in which the front curtain is moved away from the opening;
    a first urging member configured to apply an urging force to the front curtain to move the front curtain from the first front curtain position to the second front curtain position;
    a rear curtain configured to move between a first rear curtain position in which the rear curtain covers the opening and a second rear curtain position in which the rear curtain is moved away from the opening;
    a second urging member configured to apply an urging force to the rear curtain to move the rear curtain from the second rear curtain position to the first rear curtain position; and
    a charge mechanism configured to apply a first biasing force to resist the urging force of the first urging member and a second biasing force to resist the urging force of the second urging member,
    the first biasing force terminating at a different time than the second biasing force.

2. The focal plane shutter device according to claim 1, wherein
the second biasing force being applied to the second urging member is terminated earlier than the first biasing force being applied to the first urging member.

3. The focal plane shutter device according to claim 1, wherein
the front curtain is held at the second front curtain position by the charge mechanism while the first biasing force is applied to the first urging member.

4. The focal plane shutter device according to claim 1, wherein
the charge mechanism includes an actuator that generates the first biasing force and the second biasing force and a charge member that transmits the first biasing force to the first urging member and the second biasing force to the second urging member.

5. The focal plane shutter device according to claim 4, wherein
the actuator is configured to drive the charge member to a first charge terminating position at which time the first biasing force being applied to the first urging member has ceased, the actuator is further configured to drive the charge member to a second charge terminating position different from the first charge terminating position at which time the second biasing force being applied to the second urging member has ceased.

6. The focal plane shutter device according to claim 5, wherein
the actuator is further configured to drive the charge member to a first charge starting position at which time the charge mechanism has started applying the first biasing force to the first urging member, and the actuator is further configured to drive the charge member to a second charge starting position which is the same as or different from the first charge starting position and at which time the charge mechanism has started applying the second biasing force to the second urging member, and
the second charge terminating position is disposed between the second charge starting position and the first charge terminating position.

7. The focal plane shutter device according to claim 5, further comprising
a front-curtain drive member that couples the front curtain to the shutter base plate so that the front curtain is movable between the first front curtain position and the second front curtain position; and
a front-curtain set member configured to transmit the urging force of the first urging member to the front-curtain drive member, wherein
the charge member is configured to transmit the first biasing force to the first urging member via the front-curtain set member.

8. The focal plane shutter device according to claim 7, wherein
the charge member includes a front-curtain cam part arranged to contact the front-curtain set member, and
when the charge member is at the first charge terminating position, the front-curtain cam part is in contact with the front-curtain set member.

9. The focal plane shutter device according to claim 8, further comprising
a rear-curtain drive member that couples the rear curtain to the shutter base plate so that the rear curtain is movable between the first rear curtain position and the second rear curtain position, the rear-curtain drive member being configured to transmit the urging force of the second urging member to the rear curtain, wherein
the charge member transmits the second biasing force to the second urging member via the rear-curtain set member.

10. The focal plane shutter device according to claim 9, wherein
the charge member includes a rear-curtain cam part arranged to contact the rear-curtain set member, and
when the charge member is at the second charge terminating position, the rear-curtain cam part is in contact with the rear-curtain set member.

11. The focal plane shutter device according to claim 10, wherein
when the charge member is at the second charge starting position, a gap is formed between the front-curtain cam part and the front-curtain set member.

12. The focal plane shutter device according to claim 7, further comprising
a third urging member configured to apply an urging force smaller than the urging force of the first urging member to the front-curtain drive member with so that the front curtain moves from the second front curtain position to the first front curtain position, wherein
the charge member is configured to hold the front curtain at the second front curtain position via the front-curtain drive member.

13. The focal plane shutter device according to claim 12, wherein
when the charge member is at the first charge terminating position, the front curtain is held at the second front curtain position by the charge member via the front-curtain drive member.

14. The focal plane shutter device according to claim 13, wherein
the actuator is configured to drive the charge member to a release position on the opposite side of the first charge starting position relative to the first charge terminating position, and
when the charge member is at the release position, the charge member releases the front curtain while the front curtain is at the second front curtain position.

15. The focal plane shutter device according to claim 14, wherein
the charge member includes a front-curtain holding part to hold the front curtain at the second front curtain position via the front-curtain drive member,
the front-curtain drive member includes a contact portion arranged to abut the front-curtain holding part, and
when the charge member is driven to the first charge terminating position, the front-curtain holding part passes through a substantially arc-shaped trajectory where the contact portion is moved when the front curtain moves from the second front curtain position to the first front curtain position, and
when the charge member is driven to the release position, the front-curtain holding part is moved away from the arc-shaped trajectory.

16. The focal plane shutter device according to claim 7, further comprising
a return urging member configured to apply an urging force to the charge member so that the charge member returns to an initial position before application of the first biasing force and the second biasing force by the charge mechanism, wherein
the actuator is configured to drive the charge member to a restriction position, and when the charge member is at the restriction position, the front-curtain drive member restricts the charge member from returning to the original position.

17. The focal plane shutter device according to claim 1, further comprising
a front-curtain drive member that couples the front curtain to the shutter base plate so that the front curtain is movable between the first front curtain position and the second front curtain position; and
a front-curtain set member configured to transmit the urging force of the first urging member to the front-curtain drive member, wherein
the charge mechanism imparts the first biasing force to the first urging member via the front-curtain set member.

18. The focal plane shutter device according to claim 17, wherein
when the front curtain moves from the first front curtain position to the second front curtain position, the front-curtain set member transmits the urging force of the first urging member to the front curtain via the front-curtain drive member, and
when the charge mechanism applies the first biasing force to the first urging member, the front-curtain set member applies the first biasing force to the first urging member without intervention of the front-curtain drive member.

19. The focal plane shutter device according to claim 1, wherein
the charge mechanism applies the second biasing force to the second urging member at an earlier time than when the charge mechanism applies the first biasing force to the first urging member.

20. An imaging device comprising:
the focal plane shutter device according to claim 5;
an imaging element configured to convert an optical image of a subject into an image signal, the imaging element including an electronic front curtain photography function that sequentially resets a pixel in a running direction of the front curtain; and
a controller configured to control the imaging element and the focal plane shutter device,
the controller being configured to establish an electronic front curtain photography standby state when the charge mechanism stops applying the second biasing force to the second urging member and before the charge mechanism stops applying the first biasing force to the first urging member, the charge mechanism controlling the actuator during photographing by using the electronic front curtain photography function so that the charge member stops at the second charge terminating position.

21. A focal plane shutter device comprising:
a shutter base plate defining an opening;
a front curtain movably disposed between a first front curtain position to cover the opening and a second front curtain position to uncover the opening;
a first urging member configured to apply an urging force to the front curtain so that the front curtain moves from the first front curtain position to the second front curtain position;
a rear curtain movably disposed between the first rear curtain position to cover the opening and the second rear curtain position retracted from the opening;
a second urging member configured to apply an elastic force to the rear curtain so that the rear curtain moves from the second rear curtain position to the first rear curtain position;
an actuator configured to generate a first biasing force that resists the urging force of the first urging member and a second biasing force resisting the urging force of the second urging member; and
a charge member configured to transmit the first biasing force to the first urging member and to transmit the second biasing force to the second urging member,
the front curtain being held by the charge member at the second front curtain position while the first biasing force is applied to the first urging member.

22. The focal plane shutter device according to claim 21, wherein
the front curtain is held by the charge member at the second front curtain position after the charge mechanism has stopped applying the first biasing force to the first urging member.

23. The focal plane shutter device according to claim 21, further comprising
a front-curtain drive member that couples the front curtain to the shutter base plate so that the front curtain is movable between the first front curtain position and the second front curtain position; and
a front-curtain set member configured to transmit the urging force of the first urging member to the front-curtain drive member, wherein
the charge member transmits the first biasing force to the first urging member via the front-curtain set member.

24. The focal plane shutter device according to claim 23, further comprising
a third urging member configured to apply an urging force smaller than the urging force of the first urging member to the front-curtain drive member so that the front curtain moves from the second front curtain position to the first front curtain position, wherein
the charge member is configured to hold the front curtain at the second front curtain position via the front-curtain drive member.

* * * * *